(12) United States Patent
Vickery et al.

(10) Patent No.: US 11,564,386 B2
(45) Date of Patent: Jan. 31, 2023

(54) METHODS AND SYSTEMS OF PEST MANAGEMENT

(71) Applicant: VM PRODUCTS, INC., Colleyville, TX (US)

(72) Inventors: Ethan Vickery, Colleyville, TX (US); Ron Fox, Colleyville, TX (US); Ronen Amicahi, Colleyville, TX (US); Armando Landeros, Colleyville, TX (US)

(73) Assignee: VM PRODUCTS, INC., Colleyville, TX (US)

( * ) Notice: Subject to any disclaimer, the term of this patent is extended or adjusted under 35 U.S.C. 154(b) by 77 days.

(21) Appl. No.: 16/640,621

(22) PCT Filed: Aug. 22, 2018

(86) PCT No.: PCT/US2018/047571
§ 371 (c)(1),
(2) Date: Feb. 20, 2020

(87) PCT Pub. No.: WO2019/040648
PCT Pub. Date: Feb. 28, 2019

(65) Prior Publication Data
US 2021/0022333 A1    Jan. 28, 2021

Related U.S. Application Data

(60) Provisional application No. 62/548,961, filed on Aug. 22, 2017.

(51) Int. Cl.
*A01M 31/00* (2006.01)
*A01M 23/30* (2006.01)
*A01M 25/00* (2006.01)

(52) U.S. Cl.
CPC .......... *A01M 31/002* (2013.01); *A01M 23/30* (2013.01); *A01M 25/004* (2013.01)

(58) Field of Classification Search
CPC ................ A01M 31/002; A01M 23/30; A01M 25/004
See application file for complete search history.

(56) References Cited

U.S. PATENT DOCUMENTS

| 4,517,557 A | 5/1985 | Agron et al. |
| 5,154,017 A | 10/1992 | Disalvo |

(Continued)

FOREIGN PATENT DOCUMENTS

| EP | 0954964 | 11/1999 |
| EP | 1059031 | 12/2000 |

(Continued)

OTHER PUBLICATIONS

International Search Report and Written Opinion issued in International Patent Application No. PCT/US2018/47571, dated Nov. 6, 2018.

*Primary Examiner* — Mohamed Barakat
(74) *Attorney, Agent, or Firm* — Norton Rose Fulbright US LLP

(57) ABSTRACT

This disclosure describes devices, systems, and methods associated with pest (e.g., rodent) management. An example of a pest-management apparatus includes a detector device having a housing, a magnetic switch coupled to the housing, and circuitry disposed within a cavity of the housing. The detector device is configured to be coupled to a trap having a base and a capture element pivotally coupled to the base such a portion of the capture element is biased toward a capture portion of the base. The circuitry is configured to detect operation of the trap based on a change in state of the magnetic switch responsive to a magnet coupled to the trap. In a particular implementation, the detector device is coupled to the trap via a platform. In another particular (Continued)

implementation, the detector device includes multiple magnetic switches and is configured to concurrently be coupled to multiple traps.

20 Claims, 31 Drawing Sheets

(56) References Cited

U.S. PATENT DOCUMENTS

| | | | |
|---|---|---|---|
| 5,477,635 A | 12/1995 | Orsano | |
| 5,528,853 A * | 6/1996 | Dufaux | A01M 23/30 43/81 |
| 5,974,726 A | 11/1999 | Creeger et al. | |
| 6,052,066 A | 4/2000 | Su | |
| 6,202,340 B1 | 3/2001 | Nieves | |
| 6,445,301 B1 | 9/2002 | Farrell et al. | |
| 6,493,363 B1 | 12/2002 | Shuman et al. | |
| 6,724,312 B1 | 4/2004 | Barber et al. | |
| 6,766,251 B2 | 7/2004 | Mafra-Neto et al. | |
| 6,775,946 B2 | 8/2004 | Wright | |
| 6,847,892 B2 | 1/2005 | Zhou et al. | |
| 6,914,529 B2 | 7/2005 | Barber et al. | |
| 6,937,156 B2 | 8/2005 | Gardner, Jr. et al. | |
| 7,026,942 B2 | 4/2006 | Cristofori et al. | |
| 7,212,112 B2 | 5/2007 | Barber et al. | |
| 7,212,129 B2 | 5/2007 | Barber et al. | |
| 7,262,702 B2 | 8/2007 | Barber et al. | |
| 7,286,056 B2 | 10/2007 | Kates | |
| 7,317,399 B2 | 1/2008 | Chyun | |
| 7,348,890 B2 | 3/2008 | Barber et al. | |
| 7,504,956 B2 | 3/2009 | Kates | |
| 7,509,770 B2 | 3/2009 | Gardner, Jr. et al. | |
| 7,656,300 B2 | 2/2010 | Ronnau | |
| 7,719,429 B2 | 5/2010 | Barber et al. | |
| 8,026,822 B2 | 9/2011 | Borth et al. | |
| 8,111,155 B2 | 2/2012 | Barber et al. | |
| 8,156,683 B2 | 4/2012 | Slotnick | |
| 8,194,571 B2 | 6/2012 | Hermann et al. | |
| 8,388,222 B2 | 3/2013 | Potter et al. | |
| 8,490,323 B2 * | 7/2013 | Nathan | A01M 23/24 43/77 |
| 8,599,026 B2 | 12/2013 | Lloyd et al. | |
| 8,635,806 B2 | 1/2014 | Gardner, Jr. et al. | |
| 8,830,071 B2 | 9/2014 | Borth et al. | |
| 8,862,393 B2 | 10/2014 | Zhou et al. | |
| 8,933,812 B2 | 1/2015 | Clifford | |
| 9,003,691 B2 | 4/2015 | Arlichson | |
| 9,015,987 B2 | 4/2015 | Moran et al. | |
| 9,179,665 B2 | 11/2015 | Frojmovics | |
| 9,332,749 B2 | 5/2016 | Cleaver | |
| 9,380,775 B2 | 7/2016 | Frojmovics | |
| 9,439,412 B2 | 9/2016 | Kittelson | |
| 9,542,835 B2 | 1/2017 | Borth et al. | |
| 10,357,027 B2 * | 7/2019 | Othon | A01M 23/20 |
| 2003/0160699 A1 | 8/2003 | Trompen | |
| 2004/0020100 A1 | 2/2004 | O'Brien et al. | |
| 2004/0216364 A1 | 11/2004 | Gosselin | |
| 2005/0097808 A1 | 5/2005 | Vorhies et al. | |
| 2005/0151653 A1 | 7/2005 | Chan et al. | |
| 2006/0265941 A1 | 11/2006 | Newton | |
| 2008/0204253 A1 | 8/2008 | Cottee et al. | |
| 2010/0134301 A1 * | 6/2010 | Borth | A01M 1/2011 340/573.2 |
| 2011/0072709 A1 * | 3/2011 | Patterson | A01M 23/30 43/131 |
| 2011/0083358 A1 | 4/2011 | Slotnick | |
| 2013/0342344 A1 | 12/2013 | Kramer et al. | |
| 2014/0071276 A1 | 3/2014 | Seifer et al. | |
| 2014/0279600 A1 | 9/2014 | Chait | |
| 2014/0325892 A1 | 11/2014 | Borth et al. | |
| 2015/0150236 A1 | 6/2015 | Grant | |
| 2016/0021867 A1 | 1/2016 | Frojmovics | |
| 2016/0192635 A1 | 7/2016 | Rich et al. | |
| 2016/0219858 A1 | 8/2016 | Cink | |
| 2017/0035041 A1 | 2/2017 | Othon | |
| 2017/0035042 A1 | 2/2017 | Ben-Dashan et al. | |
| 2017/0105388 A1 | 4/2017 | Pfeiff | |
| 2017/0195824 A1 | 7/2017 | Borth et al. | |
| 2017/0231214 A1 * | 8/2017 | Vaisblat | A01M 31/002 43/60 |
| 2018/0325095 A1 * | 11/2018 | Vickery | A01M 23/245 |

FOREIGN PATENT DOCUMENTS

| | | |
|---|---|---|
| EP | 1350430 | 10/2003 |
| EP | 1115280 | 3/2005 |
| EP | 1229787 | 11/2005 |
| EP | 1489904 | 3/2006 |
| EP | 1635633 | 3/2008 |
| EP | 2286662 | 2/2011 |
| EP | 2355538 | 8/2011 |
| EP | 1484964 | 7/2016 |
| EP | 2323478 | 3/2017 |
| EP | 2693872 | 5/2019 |
| WO | WO 2012/120263 | 9/2012 |
| WO | WO 2015/052694 | 4/2015 |
| WO | WO 2015/185063 | 12/2015 |
| WO | WO 2016/028219 | 2/2016 |
| WO | WO 2016/073429 | 5/2016 |
| WO | WO 2017/011916 | 1/2017 |
| WO | WO 2017/078547 | 5/2017 |
| WO | WO 2017/116985 | 7/2017 |

* cited by examiner

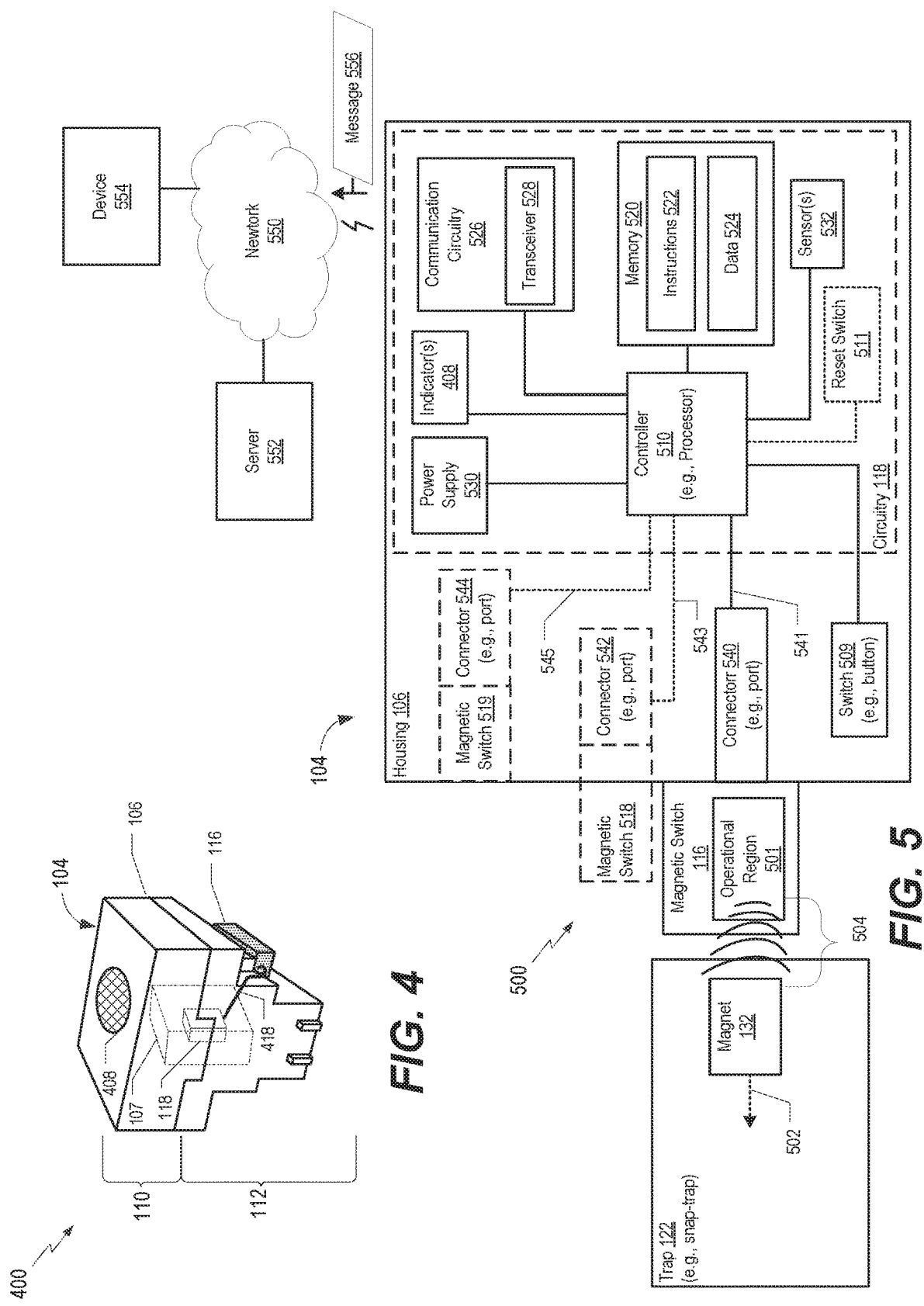

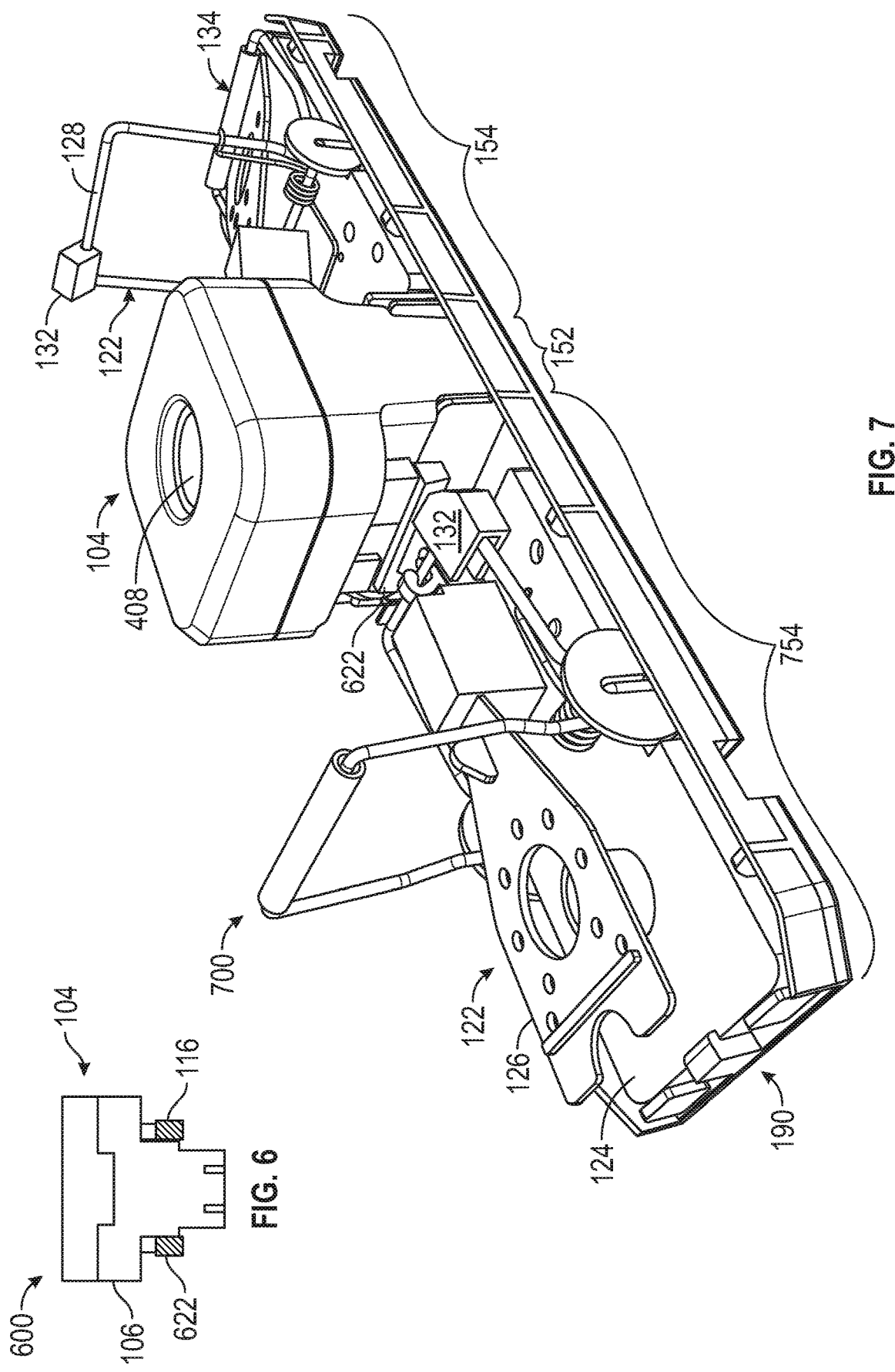

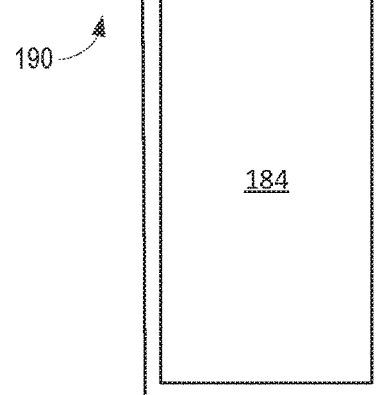
FIG. 10
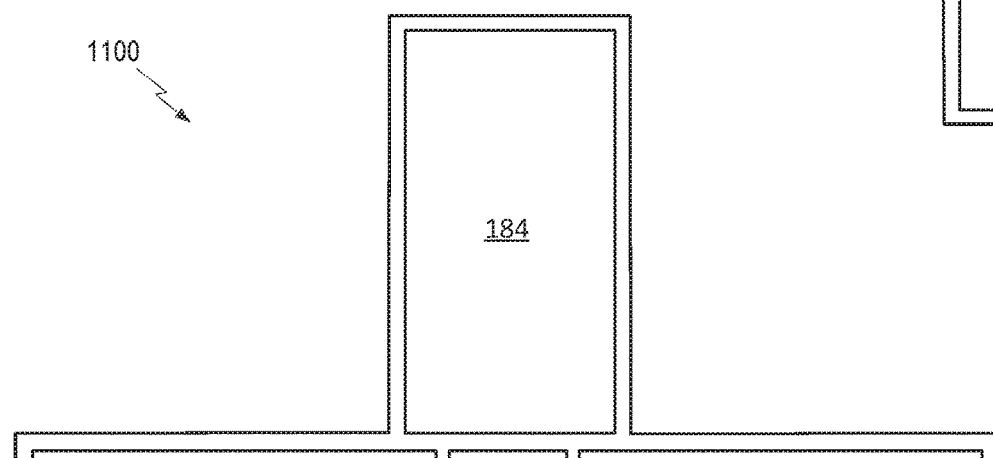
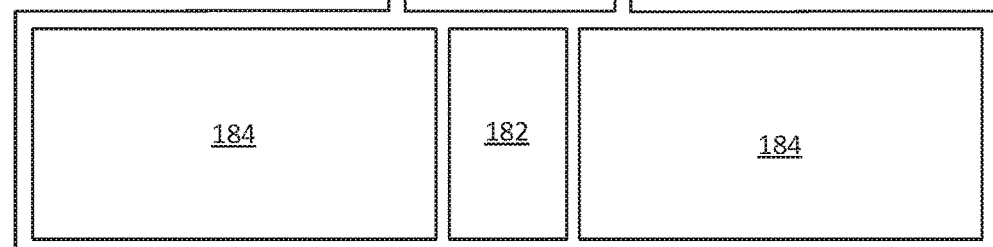
FIG. 11

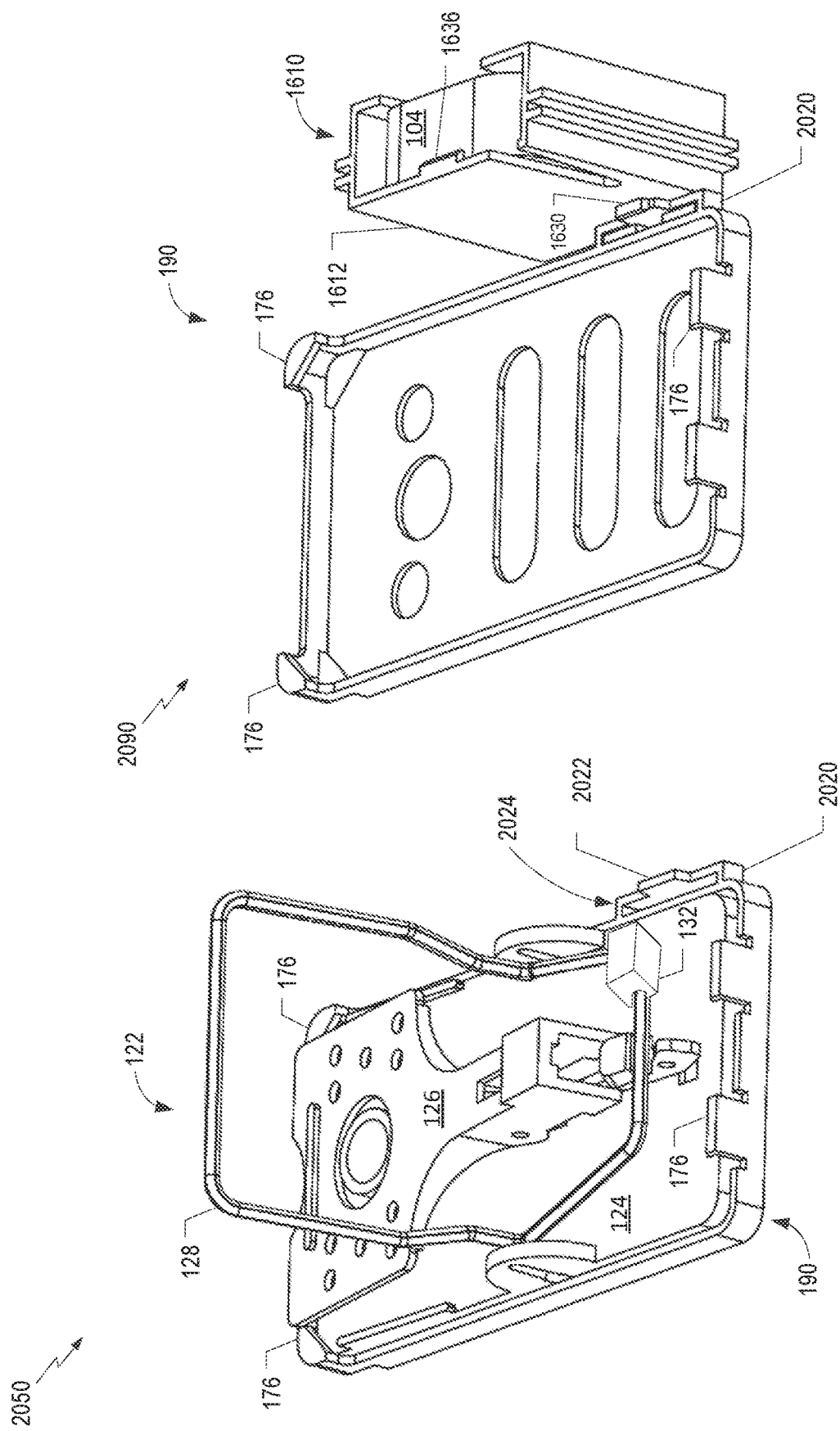

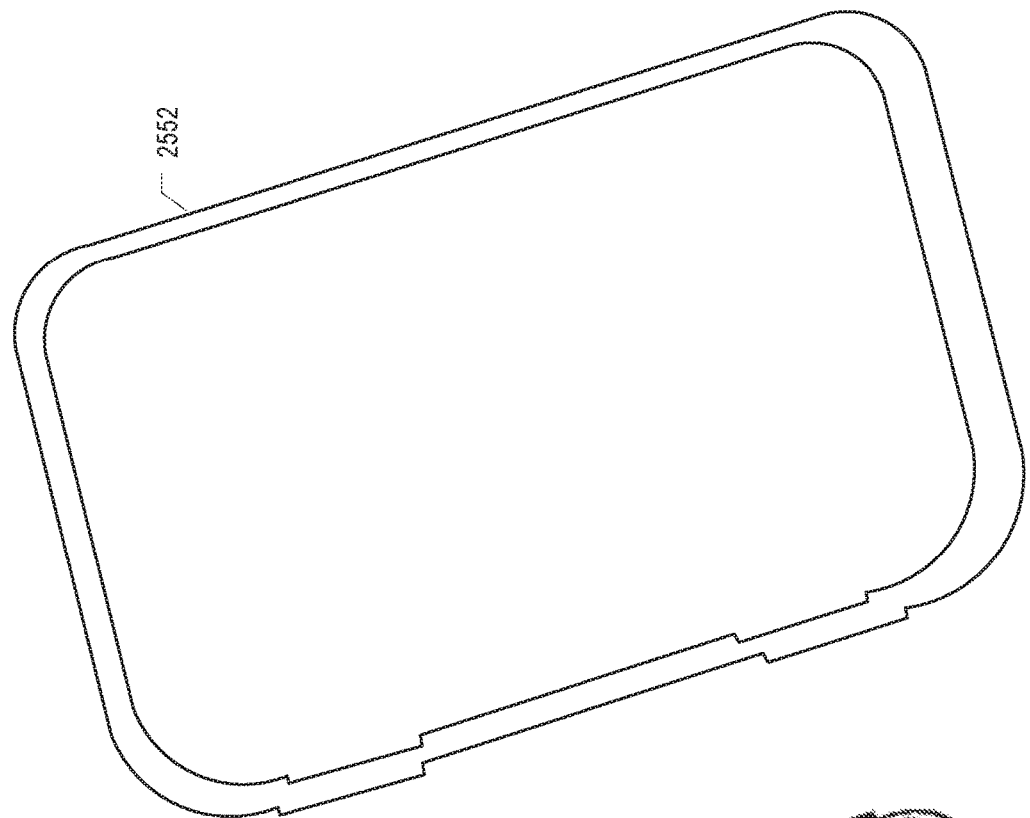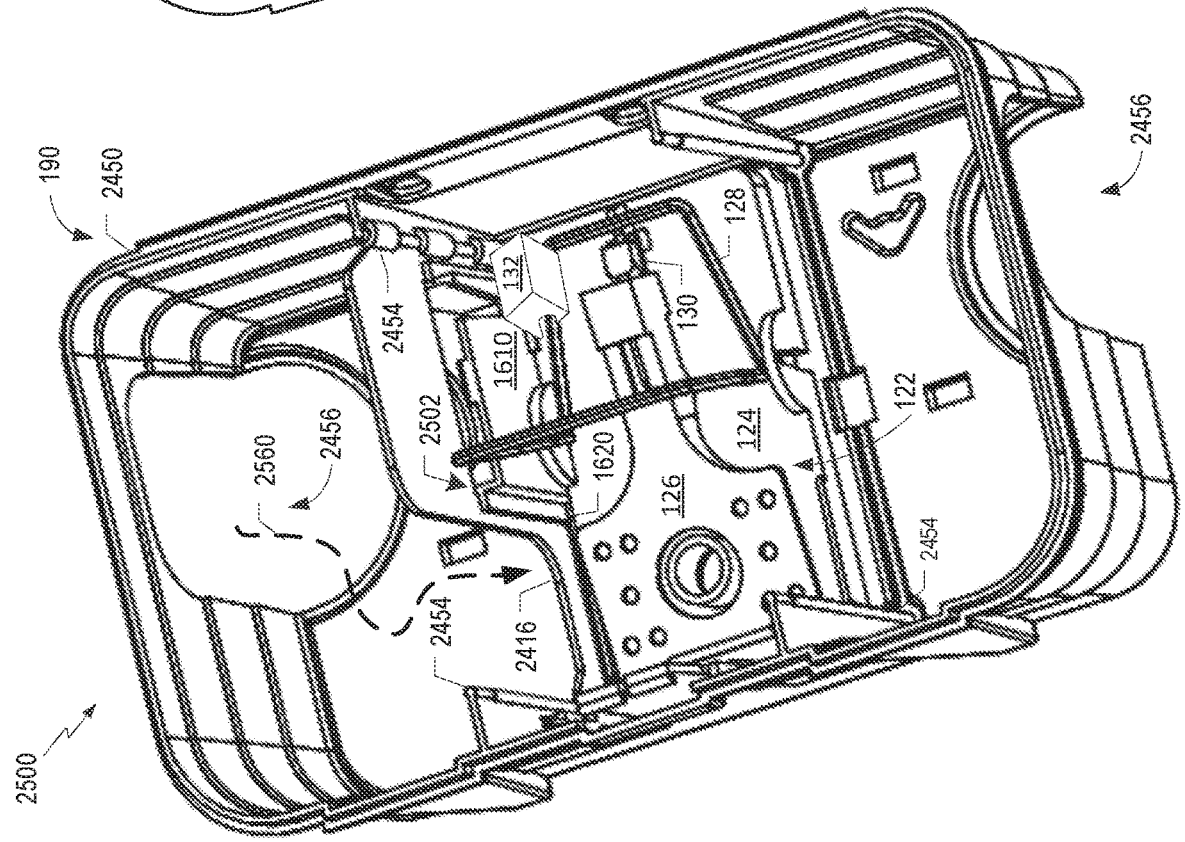
FIG. 25

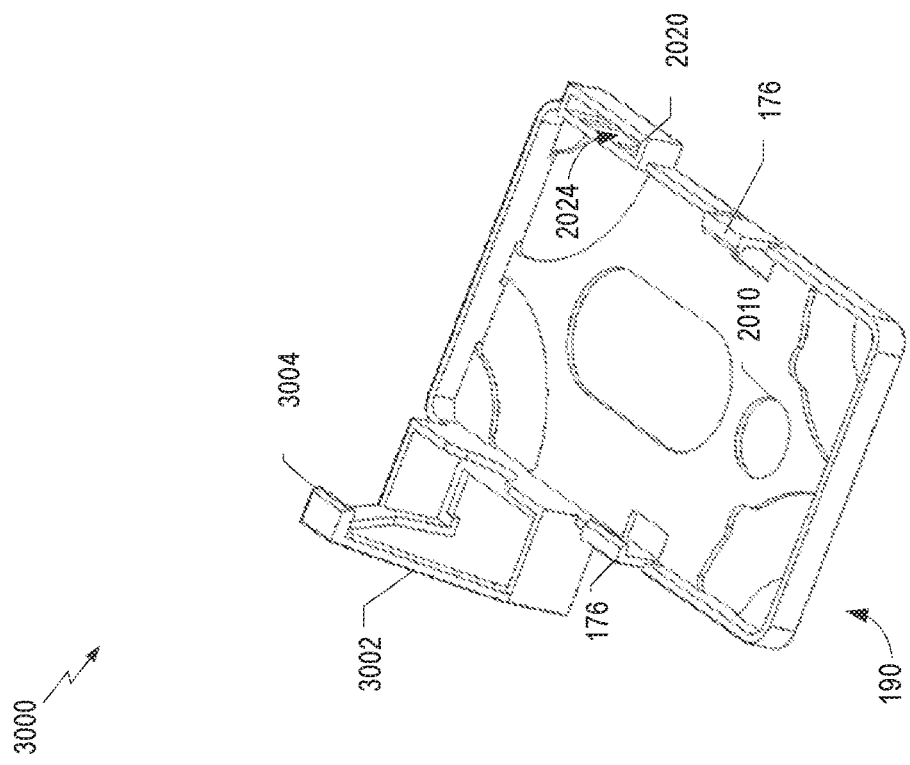
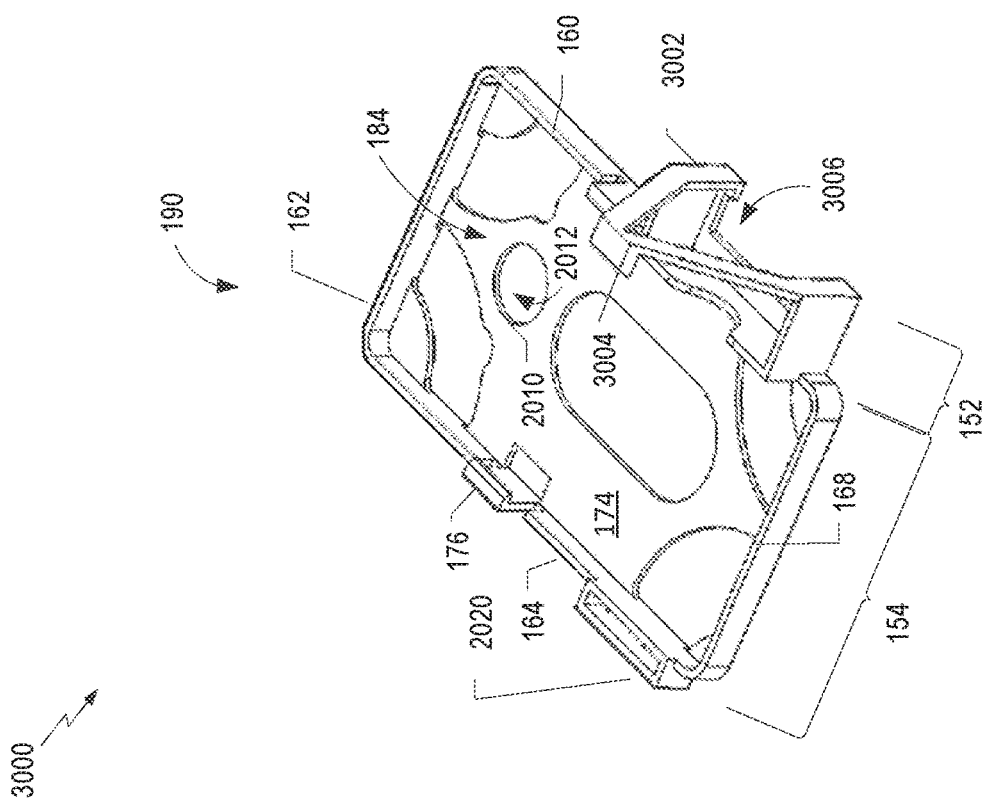

METHODS AND SYSTEMS OF PEST MANAGEMENT

This application is a national phase under 35 U.S.C. § 371 of International Application No. PCT/US2018/047571, filed Aug. 22, 2018, which claims the benefit of priority to U.S. provisional patent application Ser. No. 62/548,961, filed Aug. 22, 2017, the entire contents of each of which are hereby incorporated by reference in their entirety.

BACKGROUND

1. Field of the Disclosure

The present disclosure is generally related to devices, systems, and methods for pest (e.g., rodent) management.

2. Description of Related Art

Pest-management devices, such as rodent snap-traps, are designed to capture unwanted pests, such as rodents. Such devices often fail to provide an indication, independent of manual inspection by a user, that a particular device has operated. When multiple pest-management devices, such as hundreds or thousands of pest management devices, are deployed, manual inspection of each device becomes time intensive and costly.

To address a lack of remote notification of pest-management devices, a detection and communication system can be purchased and installed to existing pest-management devices. However, such detection and communication systems can be difficult and time consuming to install. Additionally, if a detection component is not properly installed on a particular pest-management device, a user may not be remotely informed of operation of the particular pest-management device. Further, such add-on detection and communication systems typically have several wires that remain exposed to environmental conditions and to pests after installation. Exposed wires can deteriorate due to environmental conditions and can be chewed on by pests thus resulting in damage or failure of the detection and communication system.

Other attempts to address remote notification of operation of a pest management device have included all-in-one products that include a detection and communication system are integrated in the pest management device. Such devices suffer from an increased cost of an all-in-one design and are difficult or impossible to repair if a one or more components fail. In the event of a failure of a single component, a user is forced to discard a broken device and purchase a new device.

SUMMARY

This disclosure describes devices, systems, and methods associated with pest (e.g., rodent) management. An example of a pest-management apparatus includes a detector device having a housing, a magnetic switch (e.g., a reed switch) coupled to the housing, and circuitry disposed within a cavity of the housing. In some implementations, the detector device has no exposed wires outside of the housing. The detector device is configured to be coupled to a trap, such as a rodent snap-trap, having a base and a capture element pivotally coupled to the base such a portion of the capture element is biased toward a capture portion of the base. The circuitry is configured to detect operation of the trap based on a change in state of the switch responsive to a magnet coupled to the trap. In response to detection of the operation of the trap, the circuitry may activate an indicator device, initiate transmission (e.g., wired and/or wireless transmission) of a notification, or both.

In some implementations, the detector device includes a switch (e.g., an activation switch or a control switch) operable to activate and/or deactivate the detector device, enable programming of detector device, and/or enable wireless coupling of the detector device to another device. Additionally, or alternatively, the detector device may have one or more modes of operation, such as an active mode and a standby mode (e.g., a low power mode). To illustrate, the detector device may be activated and enter the active mode in which the detector device may be configured. After configuration of the detector device, the detector device may enter a standby mode (e.g., a low power mode). Responsive to detection of operation of the trap, the detector device may enter the active mode in which the detector device provides an indication associated with operation of the trap. The detector device may also be configure to periodically wake from the standby mode into the active mode to provide an indication of status of the detector device, a power supply level of a power source associated with the detector device, or both.

In a particular implementation, the detector device is coupled to the trap via a platform, a holder, or both. In other implementations, the housing is configured to be directly coupled to the trap. In another particular implementation, the detector device includes multiple magnetic switches and is configured to concurrently be coupled to multiple traps.

Another example of a pest-management apparatus includes a platform that is configured to be removably coupled to a base of a trap (e.g., a rodent snap-trap) and to a detector device that includes a magnetic switch, such as a reed switch. For example, the platform may be configured to be concurrently coupled to the base and the detector device such that operation of the portion of the capture element from a set position toward the capture portion of the rodent snap-trap changes a state of the first magnetic switch detectable by the detector device.

The above-described aspects include the benefit of increased speed and ease of deployment of a pest-management apparatus and a reduction in time and manpower to identify pest-management apparatuses that have operated. To illustrate, components and devices of the pest-management apparatus are configured to be removably coupled from each other and, when coupled, enable proper function and interaction between different components. In this manner, the present disclosure provides a pest-management system with "plug and play" components that provide a high degree of user customization. For example, a user may easily arrange one or more components to form a multi-trap pest-management apparatus that includes individual trap operation detection as well as remote notification of individual trap operation. Furthermore, the above-described aspects provide components that can be combined with a variety of other components to enable a user to achieve different pest-management device configurations. Additionally, the above-described aspects provide a pest-management apparatus, such as a bait station, that includes components or devices that can repaired or replaced without having to discard the entire pest-management apparatus resulting in cost saving. Additionally, the above-described aspects include a pest-management apparatus with no exposed wires that can degrade or deteriorate because of environmental conditions or that can be chewed on and damaged by a pest.

Some embodiments of the present monitoring systems are for a rodent snap-trap having a base and a capture element pivotally coupled to the base such that a portion of the capture element is biased toward a capture portion of the base, the capture element configured to be pivoted away from the capture portion to a set position in which the portion of the capture element, upon release of the capture element from the set position, travels toward the capture portion. Some such embodiments of the present monitoring systems comprise: a housing that defines a cavity; a magnetic switch physically coupled to the housing, the magnetic switch having an operational region bounded by a portion of the magnetic switch and configured to operate responsive to a magnetic field of a magnet; and circuitry disposed in the cavity and electrically coupled to the magnetic switch, the circuitry configured to detect operation of the rodent snap-trap responsive to an operation of the magnetic switch; where the housing is configured to be coupled to the base of the rodent snap-trap such that, upon the release of the capture element from the set position, the magnetic field causes the operation of the magnetic switch.

In some of the foregoing embodiments of the present monitoring systems, the housing includes at least a first portion removably coupled to a second portion such that the first portion and the second portion cooperate to define the cavity. In some embodiments, the housing includes one or more brackets configured to engage the base of the rodent snap-trap. In some embodiments, the housing includes one or more brackets configured to be coupled to a platform that is configured to be engaged with the base of the rodent snap-trap. Some embodiments further comprise: a holder that is configured to receive at least a portion of the housing; where the holder is configured to be coupled to the rodent snap-trap. In some embodiments, the holder is disposed in a chamber defined by a base portion of a bait station that also includes a lid movable relative to the base portion to cover the chamber.

Some of the foregoing embodiments of the present monitoring systems further comprise: an electrical wire connected to the magnetic switch and to the circuitry; where the electrical wire is inaccessible from outside the housing when the magnetic switch is physically coupled to the housing. In some embodiments, the magnetic switch is incorporated into the housing. In some embodiments, the magnetic switch is included within the cavity. In some embodiments, the magnetic switch is electrically conductive when the operational region of the magnetic switch receives the magnet field of the magnet. In some embodiments, the magnetic switch comprises a reed switch.

In some of the foregoing embodiments of the present monitoring systems, the circuitry comprises: a memory storing instructions; and a processor coupled to the memory and to the magnetic switch, the processor configured to execute the instructions to detect the release of the capture element from the set position, activate an indicator responsive to detection of the release, or both. In some embodiments, the circuitry comprises one or more components selected from the group of components consisting of: a power supply, a processor, a memory, communication circuitry, a transmitter, a sensor device, and an indicator device. Some embodiments further comprise: an indicator device coupled to the circuitry; where the indicator device comprises one or more light emitting diodes, an audio speaker, a display device, or a combination thereof. In some embodiments, the indicator device is incorporated into the housing. Some embodiments further comprise: an electrical connection port incorporated into the housing, where the magnetic switch is physically coupled to the housing via the electrical connection port, and where the magnetic switch is removably coupled to the housing. Some embodiments further comprise: a second magnetic switch physically coupled to the housing, where the circuitry is further configured to detect operation of a second rodent snap-trap responsive to an operation of the second magnetic switch.

Some of the foregoing embodiments of the present monitoring systems further comprise: an indicator device coupled to the circuitry, where the magnetic switch and the second magnetic switch are coupled in parallel to the circuitry, and the circuitry is configured to activate the indicator responsive to a first signal from the magnetic switch, a second signal from the second magnetic switch, or both. In some embodiments, the housing is configured to be concurrently coupled to the rodent snap-trap and to the second rodent snap-trap such that, when each of a first capture element of the rodent snap-trap and a second capture element of the second rodent snap-trap is in a set position, the magnetic switch is electrically conductive responsive to a first magnet of the rodent snap-trap and the second magnetic switch is electrically conductive responsive to a second magnet of the second rodent snap-trap. Some embodiments further comprise a third magnetic switch physically coupled to the housing, where the circuitry is further configured to detect operation of a third rodent snap-trap responsive to an operation of the third magnetic switch.

Some embodiments of the present apparatuses comprise: a platform configured to be removably coupled to: a base of a rodent snap-trap having a capture element pivotally coupled to the base such that a portion of the capture element is biased toward a capture portion of the base; and a detector device including a first magnetic switch; where the platform is configured to be concurrently coupled to the base and the detector device such that operation of the portion of the capture element from a set position toward the capture portion of the rodent snap-trap changes a state of the first magnetic switch detectable by the detector device. In some embodiments, operation of the portion of the capture element from the set position toward the capture portion of the rodent snap-trap changes the state of the first magnetic switch from an open state to a closed state. In some embodiments, operation of the portion of the capture element from the set position toward the capture portion of the rodent snap-trap changes the state of the first magnetic switch from a closed state to an open state. In some embodiments, the platform is configured to be removably coupled to a holder configured to be coupled to the detector device, and the platform is configured to be coupled to the detector device via the holder. In some embodiments, the platform includes a holder configured to be coupled to the detector device and includes at least one bracket configured to maintain the detector device within a cavity defined by the holder.

Some of the foregoing embodiments of the present apparatuses further comprise: one or more components selected from the group of components consisting of: the rodent snap-trap, the detector device, and a holder that includes at least one bracket configured to maintain the detector device within a cavity defined by the holder. In some embodiments, the platform comprises a single structure. Some embodiments further comprise: a canopy coupled to the platform, where the canopy, when coupled to the platform, is configured to define an opening though which the rodent snap-trap is accessible to a rodent. In some embodiments, the platform is further configured to be removably coupled to a second base of a second rodent snap-trap having a second capture element pivotally coupled to the second base such that a portion of the second capture element is biased toward a capture portion of the second base. In some embodiments, the platform is configured to be concurrently coupled to the base, the second base, and the detector device such that the detector device is interposed between the base and the second base. In some embodiments, the platform is further configured to be removably coupled to a third base of a third rodent snap-trap having a third capture element pivotally coupled to the third base such that a portion of the third capture element is biased toward a capture portion of the third base. In some embodiments, the platform is further configured to be removably coupled to a fourth base of a fourth rodent snap-trap having a fourth capture element pivotally coupled to the fourth base such that a portion of the fourth capture element is biased toward a capture portion of the fourth base, the platform configured to be concurrently coupled to the base, the second base, the third base, the fourth base, and the detector device. Some embodiments further comprise: a bait station including a base portion and a lid portion coupled to the base portion, the base portion including the platform. Some embodiments further comprise: a cover configured to be removably coupled to the platform, where, to removably couple the detector device to the platform, the detector device is configured to be included within a cavity of the cover and positioned between the cover and the platform. In some embodiments, the cover includes one or more tabs configured to engage one or more opening of the platform.

Some embodiments of the present pest-management apparatuses comprise: a first rodent snap-trap having a base and a capture element pivotally coupled to the base such that a portion of the capture element is biased toward a capture portion of the base; a second rodent snap-trap having a base and a capture element pivotally coupled to the base such that a portion of the capture element is biased toward a capture portion of the base; and a detector device including: a first magnetic switch, where the detector device is configured to be coupled to the first rodent snap-trap such that operation of the portion of the capture element of the first rodent snap-trap from a first set position toward the capture portion of the first rodent snap-trap changes a state of the first magnetic switch, a second magnetic switch, where the detector device is configured to be coupled to the second rodent snap-trap such that operation of the portion of the capture element of the second rodent snap-trap from a second set position toward the capture portion of the second rodent snap-trap changes a state of the first magnetic switch; and circuitry configured to detect a change in the state of the first magnetic switch, the second magnetic switch, or both. Some embodiments further comprise a platform configured to concurrently be removably coupled to the base of the first rodent snap-trap, the base of the second rodent snap-trap, and the detector device.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any aspect of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Some details associated with the aspects of the present disclosure are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures. Views identified as schematics are not drawn to scale.

FIG. 4 is a diagram that illustrates an isometric view of a first example of a monitoring system for a pest-management system.

FIG. 5 is a block diagram that illustrates aspects of an illustrative pest-management system.

FIG. 6 is a diagram that illustrates an isometric view of a second example of a monitoring system for a pest-management system.

FIG. 7 is a diagram that that illustrates an isometric view of another example of a pest-management system.

FIG. 10 is top view of a first example of a layout of a pest-management system.

FIG. 11 is top view of a second example of a layout of a pest-management system.

FIG. 20B is a diagram that that illustrates an isometric view of the base of FIG. 20A coupled to a trap.

FIG. 20C is a diagram that that illustrates an isometric view of the base of FIG. 20A coupled to the holder of FIG. 20A that is coupled to a detector device of the pest-management system.

FIG. 25 is a diagram that illustrates an aspect of the bait station of FIG. 24.

FIG. 30A is a diagram that that illustrates a perspective view of an example of the pest-management apparatus.

FIG. 30B is a diagram that that illustrates another perspective view of the example of the pest-management apparatus of FIG. 30A.

DETAILED DESCRIPTION OF ILLUSTRATIVE EMBODIMENTS

Figure 1:
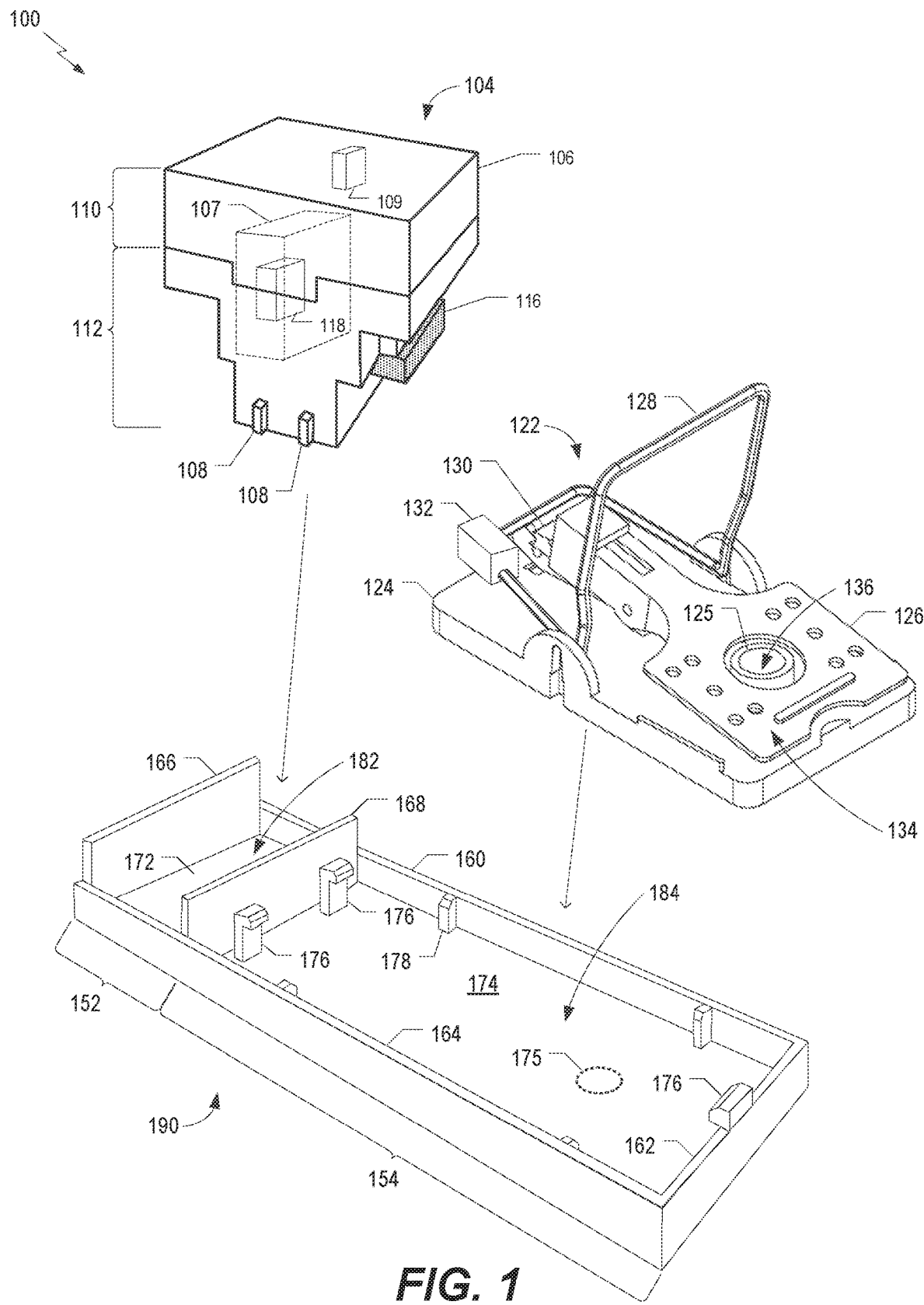
FIG. 1 is a diagram that that illustrates an isometric view of an example of a pest-management system.

Referring now to the figures, and more particularly to FIG. 1, an isometric view of an example 100 of a pest-management apparatus (e.g., a pest-management system) is depicted. Example 100 includes a detector device 104, a trap 122 (e.g., a snap-trap), and a platform 190. Platform 190 is configured to be removably couplable to each of detector device 104 and trap 122, as described further herein.

Detector device 104 (e.g., a monitoring system) includes a switch 116 (e.g., a sense switch), circuitry 118, and a housing 106 that defines a cavity 107. In some implementations, detector device 104 may also include a switch 109 (e.g., an activation switch). The housing 106 includes a first portion 110 and a second portion 112. First portion 110 is removably coupled to second portion 112 such that first portion 110 and second portion 112 cooperate to define cavity 107. In some implementations, first portion 110 and second portion 112 may be configured to be coupled via one or more fasteners, such as a screw, a clip, or a combination thereof, as illustrative, non-limiting examples. Second portion 112 includes one or more protrusions 108. The one or more protrusions 108 are configured to stabilize or secure detector device 104 when detector device 104 is coupled to platform 190, trap 112, etc. In some implementations, housing 106 does not include the one or more protrusions 108.

Switch 109 includes an activation switch, such as a toggle switch, push button, a slide switch, or a rotary switch, as illustrative, non-limiting examples. Switch 109 is coupled (e.g., electrically coupled) to circuitry 118 and is configured to activate and/or deactivate circuitry 118 to perform one or more operations, as described herein. Additionally, or alternatively, switch 109 may be configured for use in programming and/or configuring detector device 104. In some implementations, switch 109 may be positioned within cavity 107. In some such implementations, switch 109 may be accessible and/or visible via an opening of the housing 106 when first portion 110 is coupled to second portion 112. For example, when first portion 110 is coupled to second portion 112, the opening may be defined by first portion 110, second portion 112, or a combination of first portion 110 and second portion 112. In other implementations, switch 109 may be coupled to or integrated in housing Switch 116 includes a magnetic switch, such as a reed switch, as an illustrative, non-limiting example. Switch 116 includes an operational region bounded by a portion of switch 116, as described further herein with reference to FIG. 5. Switch 116 is configured to operate responsive to a magnetic field, such as a magnetic field generated by a magnet (e.g., a permanent magnet or an electromagnet) or a another device. To illustrate, an operational region of switch 116, such as a reed switch, is configured such that magnet 132 (coupled to trap 122) having a designated magnetic field strength can operate switch 116 when magnet 132 is within a threshold distance to the operational region. For example, when magnet 132 is within the threshold distance and switch 116 receives the designated magnetic field strength of the magnet field, switch 116 is in or transitions to an electrically conductive state (i.e., an on state or a closed state). When magnet 132 is not within the threshold distance and switch 116 does not receive the designated magnetic field strength of the magnet field, switch 116 is in or transitions to a non-electrically conductive state (i.e., an off state or an open state).

As shown, switch 116 is physically coupled to housing 106. In other implementations, switch 116 is integrated in housing 106 (e.g., integrated in first portion 110, second portion 112, or both), or is included within housing 106, such as within cavity 107. In some implementations, switch 116 is removably coupled to housing 106. For example, an electrical connection (e.g., a port) can be incorporated into housing 106, and switch 116 can be physically coupled to housing 106 via the port.

Circuitry 118 is disposed in cavity 107 and is electrically coupled to switch 116. Circuitry 118 is configured to detect operation of trap 122 responsive to an operation of magnetic switch 116. For example, in a particular implementation, circuitry 118 is configured to detect operation of trap 122 responsive to an operation in which switch 116 transitions from an active state to a deactivated state. Alternatively, in another particular implementation, circuitry 118 is configured to detect operation of trap 122 responsive to an operation in which switch 116 transitions from a deactivated state to an active state.

Circuitry 118 may be connected to switch 116 by an electrical wire, as described further herein with reference FIGS. 4-5. In some implementations in which switch 116 is coupled to circuitry 118 by an electrical wire (e.g., a wire conductor), the electrical wire is inaccessible from outside housing 106 when switch 116 is physically coupled to housing 106.

Trap 122, such as a snap-trap (e.g., a rodent snap-trap), includes a base 124, a capture element 128 (e.g., a hammer, a bar, a jaw, etc.), a trigger 126, a latch 130 (e.g., a release catch), and a magnet 132. In some implementations, base 124 includes an opening 125 that defines a channel 136. It is noted that in other implementations, base 124 may not include the opening 125 that defines channel 136 Capture element 128, also referred to herein as a capture bar or jaw, is pivotally coupled to base 124 such that a portion of capture element 128 is biased toward a capture portion 134 of base 124. Capture element 128 may be biased toward the capture position via a biasing member (not shown), such as, for example, a spring.

As shown, capture element 128 is in a set position in which capture element 128 is held in position by latch 130. For example, capture element 128 is configured to be pivoted away from the capture portion 134 to the set position in which the portion of capture element 128, upon release (by latch 130) of capture element 128 from the set position, travels toward capture portion 134. To illustrate, latch 130 is configured to retain capture element 128 in the set position such that movement of trigger 126 may cause latch 130 to release, thereby enabling movement of capture element 128 toward capture portion 134. In other implementations, trap 122 include an electric trap, an adhesive mat, or another a pest-capture device. Base 124 of trap 122 is configured to be coupled to housing 106 such that, upon the release of capture element 128 from the set position, the magnetic field (of magnet 132) causes an operation of magnetic switch 116. For example, base 124 is configured to be coupled to housing 106 via platform 190 (as described further herein with reference to at least FIGS. 1, 3, 7, 8, 10-15), via a holder (as described with reference to at least FIGS. 19A-19D, 20A, 20C, 21, 22), or directly to housing 106 (as described with reference to at least FIG. 19E). With respect to housing 106 being directly coupled to platform 190, in a particular implementation, detector device 104 (e.g., housing 106) includes one or more brackets, as described with reference to FIG. 19E, that are configured to engage platform 190, such that detector device 104 is directly, and removably, coupled to platform 190.

Figure 2:
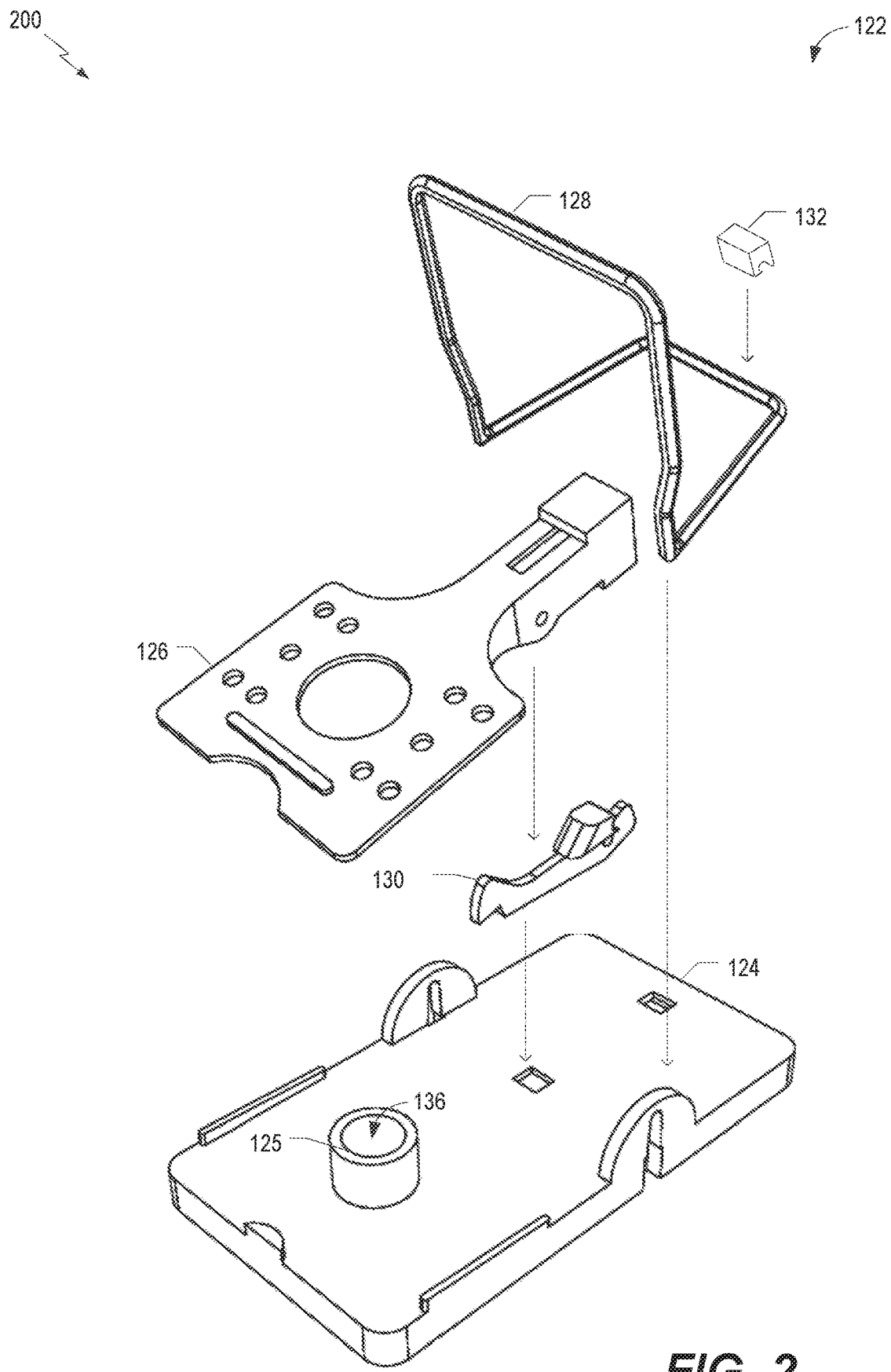
FIG. 2 is an assembly drawing of a trap of the pest-management system of FIG. 1.

Referring to FIG. 2, an assembly drawing of an example of trap 122 is depicted and generally designated 200. Magnet 132 is coupled to capture element 128. For example, magnet 132 may be directly coupled to capture element 128 (e.g., in direct physical contact), may be coupled to capture element 128 via an attachment means, such as an adhesive or the like, or may be included in a holder that configured to be coupled to capture element 128. Although magnet 132 is described herein as being coupled to capture element 128, in other implementations, magnet 132 may be include (e.g., incorporated) in capture element 128 such that at least a portion of capture element 128 is magnetic and generates a magnetic field. Capture element 128 is pivotably coupled to base 124. Trigger 126 is coupled to latch 130 and latch 130 is coupled to base 124. As shown, base 124 includes opening 125 that defines channel 136 through which a screw or other device (e.g., one or more fasteners) may be inserted to anchor trap 122. It is noted that in other implementations, base 124 may not include opening 125 that defines channel 136 and, additionally or alternatively, trap 122 may be secured or otherwise anchored in another manner, such as an adhesive, as an illustrative, non-limiting example. It is also noted that one or more components (e.g., a spring, a pin, a rivet, etc.) of trap 122 have been omitted from FIG. 2 for ease of illustration and that FIG. 2 is not to be considered limiting with respect to trap 122.

Referring to FIG. 1, platform 190 is configured to be removably coupled to base 124 of trap 122 and detector device 104. For example, platform 190 is configured to be concurrently coupled to base 124 and detector device 104 such that operation of the portion of the capture element 128 from the set position toward the capture portion 134 of the trap 122 changes a state of the switch 116 (the change in state of switch 116 detectable by circuitry 118).

Platform 190 includes a layer having a surface 172, 174, walls 160, 162, 164, 166, 168, one or more brackets 176 (e.g., clips or retention features), and one or more protrusions 178. Brackets 176 are configured to retain trap 122 in a coupled position with respect to platform 190 and protrusions 178 are configured to stabilize and position trap 122 with respect to platform 190. Additionally, an angled surface of protrusions 178 may configured to facilitate (e.g., guide) the trap 122 into being coupled with the platform 190. Although described as having one or more brackets 176, in other implementations, platform 190 may not include the one or more brackets.

In some implementations, platform 190 may include one or more through holes, such as a representative through hole 175. Through hole 175 may be configured to align with opening 125 such that a screw or other device (e.g., one or more fasteners) may be inserted to anchor trap 122 to platform 190. In other implementations, trap 122 and/or platform 190 may be secured or otherwise anchored in another manner, such as a screw, an adhesive, a tie (e.g., a zip tie), a strap, or a combination thereof, as an illustrative, non-limiting examples. To illustrate, trap 122 and/or platform 190 may include one or more openings to enable trap and/or platform 190 to be secured or otherwise anchored to a floor, trap box, or pipe using a tie or screw. Additionally, or alternatively, it is noted that holder 104 and/or housing 106 may also include one or more openings to enable holder 104, trap 122, and/or platform 190 to be secured or otherwise anchored.

Platform includes a first portion 152 associated with detector device 104 and a second portion 154 associated with trap 122. For example, first portion 152 corresponds to a region 182 defined by surface 172 and at least a portion of walls 160, 164, 166, 168. The detector device 104 is removably coupled to platform via region 182. Second portion corresponds to a region 184 defined by surface 174, at least a portion of walls 160, 162, 164, 168, one or more brackets 176, one or more protrusions 178, or a combination thereof. Although platform 190 is described as being removably couplable to each of detector device 104 and trap 122, in other implementations, platform 190 is removably couplable to one of detector device 104 or trap 122, but not to the other. For example, in a particular implementation, detector device 104 is integrated in platform 190 and trap 122 is removably couplable with platform 190. In another particular implementation, trap 122 is integrated in platform 190 and detector device 104 is removably couplable with platform 190.

In some implementations, a portion of one or more of walls 160, 162, 164, 166, 168 may be omitted. For example, in a particular implementation, a portion of wall 164 corresponding to second portion 154 may be omitted. Additionally, or alternatively, an entirety of wall 162 may be omitted.

During operation, each of detector device 104 and trap 122 is coupled to platform 190. For example, detector device 104 is coupled to first portion 152 of platform 190 via region 182 and trap 122 is coupled to second portion 154 of platform 190 via region 184. Detector device 104 is activated (e.g., turned on) via switch 109. Capture element 128 is configured in the set position such that a magnetic field of magnet 132 causes switch 116 to be in an active state. In response to trigger 126 being operated, such as by a rodent applying a force to trigger 126, latch 130 releases capture element 128 from the set position. Capture element 128 (including magnet 132) travels towards capture portion 134, also referred to herein as a capture zone. As magnet 132 travels with capture element 128, a strength of a magnetic field (of magnet 132) received by switch 116 dissipates and switch 116 transitions from the active state to a deactivated state in response to a received magnetic field strength being less than an operating characteristic of switch 116. Circuitry 118 detects the change in state of switch 116 indicating operation of the trap 122.

As shown, platform 190 is a single structure. Alternatively, platform 190 may include multiple structures. For example, first portion 152 (e.g., region 182) may include or correspond to a holder, such a holder as described at least with reference to at least FIG. 16, that is coupled to platform 190 that includes or corresponds to the second portion 154 (e.g., region 184), as described with reference to at least FIGS. 20A, 20C, 21, 22. To illustrate, platform 190 may be configured to be removably coupled to a holder that is configured to be coupled to detector device 104. Accordingly, that platform 190 can be configured to be coupled to detector device 104 via the holder.

In an implementation of an aspect of a pest-management apparatus (e.g., a pest-management system), a monitoring system, such as detector device 104, for trap 122 includes housing 106 that defines cavity 107, switch 116 physically coupled to housing 106, and circuitry 118 disposed in cavity 107 and electrically couplable to switch 116. Switch 116 has an operational region bounded by a portion of the switch 116 and configured to operate responsive to a magnetic field of magnet 132. To illustrate, housing 106 is configured to be coupled to base 124 of trap 122 such that, upon the release of capture element 128 from the set position, the magnetic field causes the operation of switch 116. Housing 106 is configured to be coupled to trap 122 directly or via platform 190 that is configured to be coupled to housing 106 and to be coupled to base 124 of trap 122. Circuitry 118 is configured to detect operation of the trap 122 responsive to an operation of switch 116. Circuitry 118 includes one or more components selected from the group of components consisting of a power supply, a processor, a memory, communication circuitry, a transmitter, a sensor device, and an indicator device (e.g., one or more light emitting diodes, an audio speaker, a display device, or a combination thereof). In some implementations of the pest-management apparatus, the pest-management apparatus includes one or more components selected from the group of components consisting of trap 122, detector device 104, and a holder that includes at least one bracket configured to maintain detector device 104 within a cavity defined by the holder.

Thus, FIG. 1 describes a pest-management apparatus that provides increased speed and ease of deployment and a reduction in time and manpower for identification of an operated pest-management apparatus. To illustrate, components and devices of the pest-management apparatus are configured to be removably coupled from each other and, when coupled, enable proper function and interaction between different components. In this manner, the present disclosure provides a pest-management system with "plug and play" components that are individually replaceable in a case of a failure. Additionally, the above-described aspects include a pest-management apparatus with no exposed wires that can degrade or deteriorate because of environmental conditions or that can be chewed on and damaged by a pest.

Figure 3:
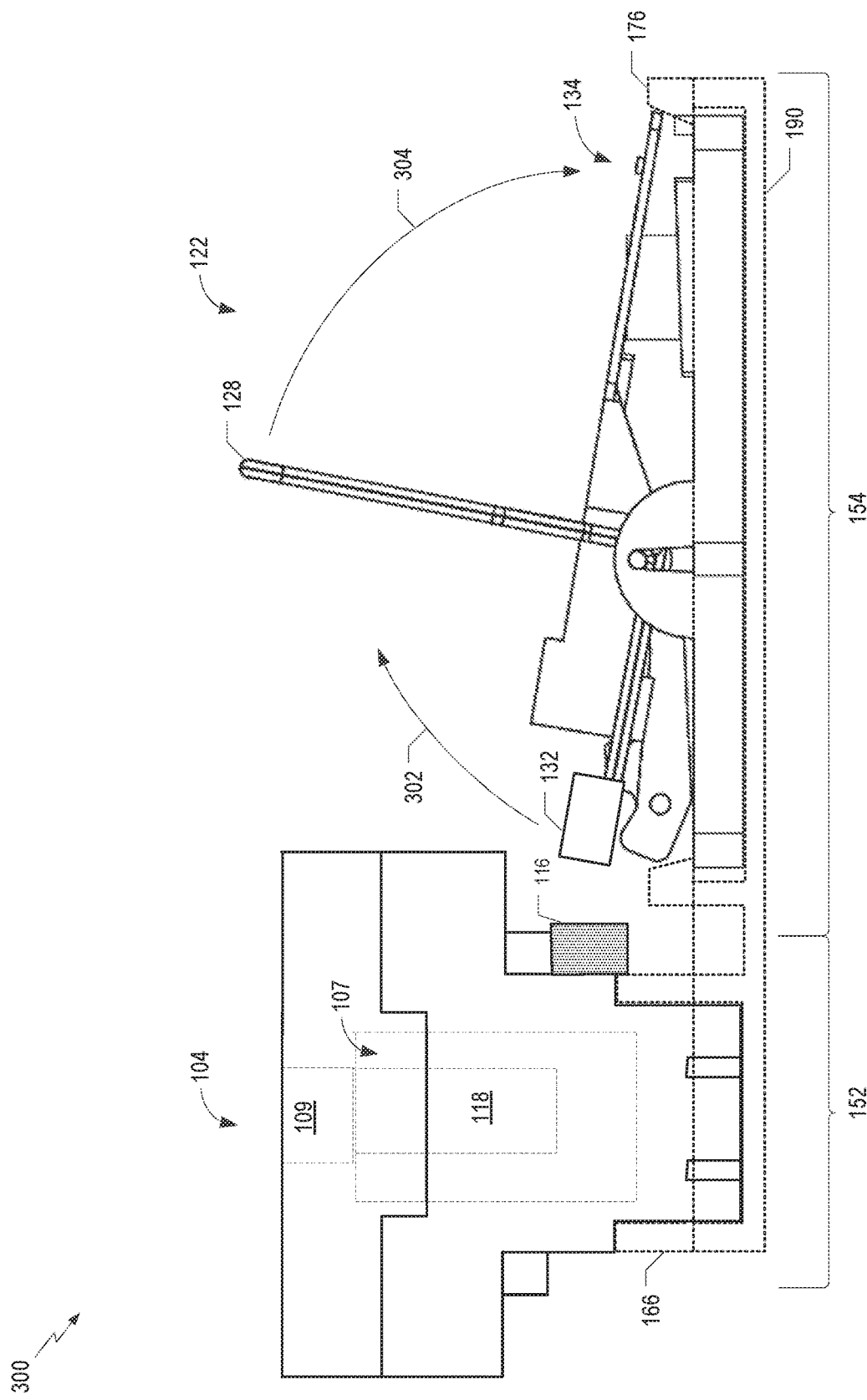
FIG. 3 is a diagram of the pest-management system of FIG. 1.

Referring to FIG. 3, a diagram of an example 300 of a pest-management apparatus (e.g., a pest-management system) is depicted that includes detector device 104 coupled to trap 122 via platform 190. In example 300, platform 190 is represented by dotted lines for clarity of illustration and to show coupling of trap 122 and platform 190 by brackets 176.

As shown, trap 122 is configured such that capture element 128 is in the set position. Capture element 128 is pivotally coupled to base 124 such that a portion of capture element 128 is biased toward capture portion 134 of base 124. To configure capture element 128 in the set position, capture element 128 is configured to be pivoted away (opposite the direction indicated by arrows 302, 304) from the capture portion 134 to the set position. Upon release of capture element 128 from the set position, capture element 128 travels toward capture portion 134 in the direction indicated by arrows 302, 304. To illustrate, when detector device 104 and trap 122 are coupled to platform 190, release of capture element 128 from the set position causes magnet 132 to travel such that a magnetic field of magnet 132 is removed from an operational region bounded by a portion of the switch 116, thus causing switch 116 to experience a state transition. For example, operation of the portion of capture element 128 from the set position toward capture portion 134 of trap 122 changes the state of the switch 116 from an open state to a closed state, or from a closed state to an open state. Thus, FIG. 3 describes a pest-management apparatus that provides the same or similar advantages as identified above with reference to FIG. 1.

Referring to FIG. 4, a perspective view of an example 400 of detector device 104 (e.g., a monitoring system) for a pest-management system is depicted. As shown, an electrical wire 418 is connected to switch 116 and to circuitry 118. Accordingly, electrical wire 418 electrically couples switch 116 and circuitry 118. In other implementations, electrical wire 418 may be replaced by, or used in conjunction with, a connector, a conductive bar, or a port, as illustrative, non-limiting examples.

In example 400, detector device 104 includes an indicator device 408. Indicator device 408 is configured to indicate (e.g., visually indicate) a state of trap 122 to a user. For example, indicator device 408 may indicate whether trap 122 is in the set position or has been tripped (e.g., actuated). As shown, indicator device 408 is incorporated into housing 106. Indicator device 408 is coupled to circuitry 118 (not shown). Indicator device 408 includes a light emitting diode (LED), an audio speaker, a display device, or a combination thereof. In an implementation where indicator device 408 includes the LED, the LED may change in color, intensity, blinking frequency, or a combination thereof, in response to detection by circuitry 118 of an operation of trap 122.

Additionally, or alternatively, indictor device 408 may include or be coupled to switch 109. For example, indicator device 408 may provide an indication in response to switch 109 being operated to activate circuitry 118. In some implementations, indicator device 408 may be configured to provide one or more indications as part of a configuration routine of device 104. For example, indicator device 408 may be configured to provide a first set of one or more indications responsive to device 104 being activated, a second set of one or more indications responsive to device 104 being wirelessly coupled to another device, and/or a third set of one or more indications in response to detection of operation of trap 122, as illustrative, non-limiting examples.

Thus, FIG. 4 describes a monitoring system of a pest-management apparatus that provides increased speed and ease of deployment and a reduction in time and manpower for identification of an operated pest-management apparatus. To illustrate, the monitoring system (e.g., the detector device 104) can be quickly coupled to other components by a user to easily enable proper function and interaction between different components. In this manner, the present disclosure provides a pest-management system with a "plug and play" component that is individually replaceable in a case of a failure without having to discard an entirety of a pest management system.

Referring to FIG. 5, a block diagram of an example 500 of an illustrative pest-management system is depicted that includes trap 122 and detector device 104 having housing 106. Detector device 104 is wirelessly coupled to a network 550. Network 550 is coupled to a server 552 and/or a device 554 (e.g., an electronic device, such as a computer, mobile device, smart phone, etc.) via a wired connection, a wireless connection, or both. Each of server 552 and device 554 may include a memory storing one or more instructions, and a processor coupled to the memory and configured to execute the one or more instructions to perform corresponding operations as described herein. For example, device 554 may include one or more instructions (e.g., software), such as a mobile application, to enable device 554 to configure detector device 104.

Trap 122 includes magnet 132 configured to generate a magnetic field 504. As described above, magnet 132 may be coupled to or included in capture element 128 and may travel as indicated by dashed arrow 502.

Detector device 104 may include one or more switches (e.g., one or more magnetic switches), such as switch 116, a second switch 518, and a third switch 519, each of which is coupled to housing 106. As shown, switch 116 is physically coupled to an exterior of housing 106, second switch 518 is integrated in housing 106, and third switch 518 is within housing 106 (e.g., within cavity 107 of housing 106). Each of the switches 116, 518, 519 may be configured to be selectively, magnetically coupled to a corresponding trap 122. Although example 500 shows detector device 104 having three switches, in other implementations, detector device 104 can include more than three switches or fewer than three switches.

Switch 116 may be considered representative of each of switches 518, 519. Switch 116 includes an operational region 501 bounded by a portion of the switch 116 and configured to operate responsive to magnetic field 504 of magnet 132. In a particular implementation, switch 116 includes a reed switch. Operational region 501 is configured such that magnet 132 having a designated magnetic field strength can operate switch 116 when magnet 132 is within a threshold distance to operational region 501. To illustrate, when magnet 132 is within the threshold distance and switch 116 receives the designated magnetic field strength of magnetic field 504, switch 116 is in, or transitions to, an electrically conductive state. When magnet 132 is not within the threshold distance and switch 116 does not receive the designated magnetic field strength of magnet field 504, switch 116 is in, or transitions to, a non-electrically conductive state.

In a particular implementation, switch 116 is in an active state responsive to magnetic field 504 when capture element 128 of trap 122 is in the set position. Upon release of capture element 128, magnet 132 travels (with capture element 128) and switch 116 transitions to an inactive state as a strength of magnetic field 504 experienced by switch 116 dissipates. In another particular implementation, switch 116 is in an inactive state when capture element 128 of trap 122 is in the set position. Upon release of capture element 128, magnet 132 travels (with capture element 128) such that magnetic field 504 traverses operational region 501 with the designated magnetic field strength to activate switch 116. As capture element 128 continues to travel with magnet 132, switch 116 transitions to an inactive state as a strength of magnetic field 504 experience by switch 116 dissipates. Accordingly, operation of trap 122 may temporarily activate switch 116 such that circuitry 118 may detect operation of trap 122 based on the temporary activation of switch 116. To illustrate, circuitry 118 may apply a voltage to switch 116 and measure a current through switch 116 to determine whether switch 116 is in an open state or a closed state.

As shown, switch 116 is coupled to circuitry 118 via connector 540 and an electrical wire 541, such as electrical wire 418 of FIG. 4. In some implementations, connector 540 (e.g., a port) is incorporated into housing 106 such that switch 116 is physically coupled to housing 106 via connector 540 (e.g., an electrical connection terminal), and magnetic switch 116 is removably coupled to the housing.

Likewise, second switch 518 is coupled to circuitry 118 via connector 542 and wire 543, and third switch 519 is coupled to circuitry via connector 544 and wire 545. Alternatively, switch 116 may be coupled to circuitry 118 via connector 540 and not electrical wire 541, or via electrical wire 541 and not connector 540. Similarly, second and third switches 518, 519 may be coupled to circuitry 118 via a corresponding connector, a corresponding wire, or both.

Device 104 may also include a switch 509, such as activation switch and/or a control switch. For example, switch 509 may include or correspond to switch 109. Switch 509 is coupled to circuitry 118 and configured to activate one or more components of circuitry 118, initiate one or more operations by circuitry 118, or a combination thereof.

As shown, circuitry 118 includes one or more components, such as controller 510, memory 520, one or more indicator devices 408, power supply 530, one or more sensors 532, and/or communication circuitry. In some implementations, circuitry 118 may include more components or fewer components. For example, circuitry 118 may not include the one or more sensors 532. As another example, in some implementations, circuitry 118 includes one or more components selected from the group of components consisting of power supply 530, controller 510 (e.g., a processor), memory 520, communication circuitry 526, a transmitter, a sensor 532, and an indicator device 408. In some implementations, circuitry 118 may include switch 116 and/or switch 509. Additionally, or alternatively, detector device 104 may include a reset switch 511, as described further with reference to at least FIG. 30C.

Memory 520 is configured to store instructions 522 and/or data 524. Instructions 522 may be executable by controller 510 (e.g., a processor) that is coupled to memory 520 and to switch(es) 116, 518, 519. For example, controller 510 may be configured to execute the instructions to perform one or more operations, such as described further herein with reference to FIG. 31. Data 524 may include information about detector device 104, such as a device identifier (ID), location information of detector device 104, or one or more thresholds, such as a power threshold or a sensor value threshold, as illustrative, non-limiting examples.

Communication circuitry 526 includes a transceiver 528 and is configured to generate notifications or messages, such as representative message 556, for wireless communication. Although communication circuitry 526 is described as including transceiver 528, in other implementations, communication circuitry 526 includes a transmitter but not a receiver. Additionally, or alternatively, communication circuitry 526 may include one or more interfaces to enable detector device 104 to be coupled (via a wired connection and/or a wireless connection) to another device. Power supply 530 includes a battery, such as a rechargeable battery, or other power source. Sensor(s) 532 include one or more sensors, such as a moisture sensor, a heat sensor, a vibration sensor, a power sensor, etc.

Controller 510 is configured to execute instructions 522 to detect the release of the capture element 128 from the set position, activate an indicator device 408 responsive to detection of the release, or both. For example, circuitry 118 may detect release of capture element 128 based on activation or deactivation of switch 116. Additionally, or alternatively, in response to detection of the release of the capture element 128, controller 510 may initiate communication circuitry 526 to transmit message 556 indicating operation of trap 122. Communication circuitry 526 may transmit message 556 to server 552 or to device 554, such as a computer, tablet, phone, etc.

In a particular implementation, housing 106 is physically coupled to second switch 518 (e.g., a second magnetic switch) and circuitry 118 is further configured to detect operation of a second trap, such as a second rodent snap-trap, responsive to an operation of the second switch 518. Additionally, housing 106 may be physically coupled to third switch 519 (e.g., a third magnetic switch) and circuitry 118 is further configured to detect operation of a third trap (e.g., a third rodent snap-trap) responsive to an operation of third switch 519. In some implementations, switch 116 and second switch 518 are coupled in parallel to circuitry 118, such that circuitry 118 is configured to activate the indicator device 408 responsive to a first signal from switch 116, a second signal from second switch 518, or both. When detector device 104 includes multiple switches 116, 518, 519, controller 510 may be configured to activate the one or more indicator devices 408 to identify which trap had a detected operation. For example, each trap (e.g., each switch 116, 518, 519) may correspond to a different indicator or to a different indicator output.

In some implementations, controller 510 is configured to identify when an output of a sensor 532 satisfies a threshold and, in response, to initiate a communication (e.g., a message). For example, when sensor 532 is a power supply sensor, controller 510 may identify when power supply 530 is in a low power condition, such as when a battery needs to be changed or charged. As another example, when sensor 532 is a moisture sensor, controller 510 may identify when one or more traps are underwater and are in need of physical inspection. As another example, when sensor 532 is a vibration sensor, controller 510 may identify activation of a particular trap based on a signal of a corresponding switch indicating operation of the particular trap and based on the output of the vibration sensor being greater than or equal to a threshold during a particular time period associated with the controller 510 receiving the signal from the switch.

Thus, FIG. 5 describes a monitoring system of a pest-management apparatus that provides increased speed and ease of deployment and a reduction in time and manpower for identification of an operated pest-management apparatus. To illustrate, the monitoring system (e.g., the detector device 104) of the present disclosure provides a pest-management system with a "plug and play" component including one or more magnetic switches. Accordingly, a user can use the detector device 104 to form a multi-trap pest-management apparatus that includes individual trap operation detection and notification.

Referring to FIG. 6, a diagram of an example 600 of detector device 104 (e.g., a monitoring system) for a pest-management system is depicted. Example 600 includes housing 106 and includes switch 116 and a second switch 622 physically coupled to housing 106. Second switch 622 may include or correspond to second switch 518 or third switch 519 of FIG. 5. Second switch 622 may operate as describe above with reference to switch 116. Each of switch 116, 622 may be coupled to an exterior of housing 106, incorporated in housing 106, or included in cavity 107 (not shown) defined by housing 106.

Housing 106 is configured to be concurrently coupled to a first trap 122 (e.g., a first rodent snap-trap) and to a second trap 122 (e.g., a second rodent snap-trap). In a particular implementation, when each of a first capture element 128 of the first trap 122 and a second capture element 128 of the second trap 122 is in a set position, the switch 116 is electrically conductive responsive to a first magnet 132 of the first trap 122 and the second switch 622 is electrically conductive responsive to a second magnet 132 of the second trap 122.

Thus, FIG. 6 describes a monitoring system of a pest-management apparatus that provides increased speed and ease of deployment and a reduction in time and manpower for identification of an operated pest-management apparatus. To illustrate, the monitoring system (e.g., the detector device 104) can be quickly coupled to other components by a user to easily enable proper function and interaction between different components. In this manner, the present disclosure provides a pest-management system with a "plug and play" component that is individually replaceable in a case of a failure without having to discard an entirety of a pest management system. Additionally, because the detector device 104 includes multiple magnetic switches, a user can use the detector device 104 to form a multi-trap pest-management apparatus that includes individual trap operation detection as well as remote notification of individual trap operation. Additionally, the above-described aspects include a pest-management apparatus with no exposed wires that can degrade or deteriorate because of environmental conditions or that can be chewed on and damaged by a pest.

Referring to FIG. 7, a diagram of an example 700 of a pest-management apparatus (e.g., a pest-management system) is depicted. Example 700 includes housing 106 including two switches 116, 622, two traps 122, and platform 190.

Platform 190 is configured to be removably coupled to a base 124 of a first trap 122 and to a base 124 of a second trap. Each of the first and second traps 122 includes a corresponding capture element 128 pivotally coupled to a corresponding base 124 such that a portion of the capture element 128 is biased toward a capture portion 134 of base 124. In a particular implementation, platform 190 is configured to be concurrently coupled to a first base (of a first trap), a second base (of a second trap), and detector device 104. For example, first portion 152 of platform is coupled to detector device 104, second portion 154 is coupled to the first trap 122, and a third portion 754 of platform 190 is coupled to the second trap 122. In such an implementation, detector device 104 is interposed between the first base and the second base, as show in example 700. Detector device 104 may detect operation of the first trap, the second trap, or both, as described above at least with reference to FIG. 5. As shown, first trap 122 coupled to second portion 154 is in a tripped position and second trap 122 coupled to third portion 754 is in a set position.

Thus, FIG. 7 describes a pest-management apparatus that includes monitoring of multiple traps. The pest-management apparatus also provides increased speed and ease of deployment and a reduction in time and manpower for identification of an operated pest-management apparatus. To illustrate, components and devices of the pest-management apparatus are configured to be removably coupled from each other and, when coupled, enable proper function and interaction between different components. In this manner, the present disclosure provides a pest-management system with "plug and play" components that are individually replaceable in a case of a failure. Additionally, the above-described aspects include a pest-management apparatus with no exposed wires that can degrade or deteriorate because of environmental conditions or that can be chewed on and damaged by a pest.

Figure 8:
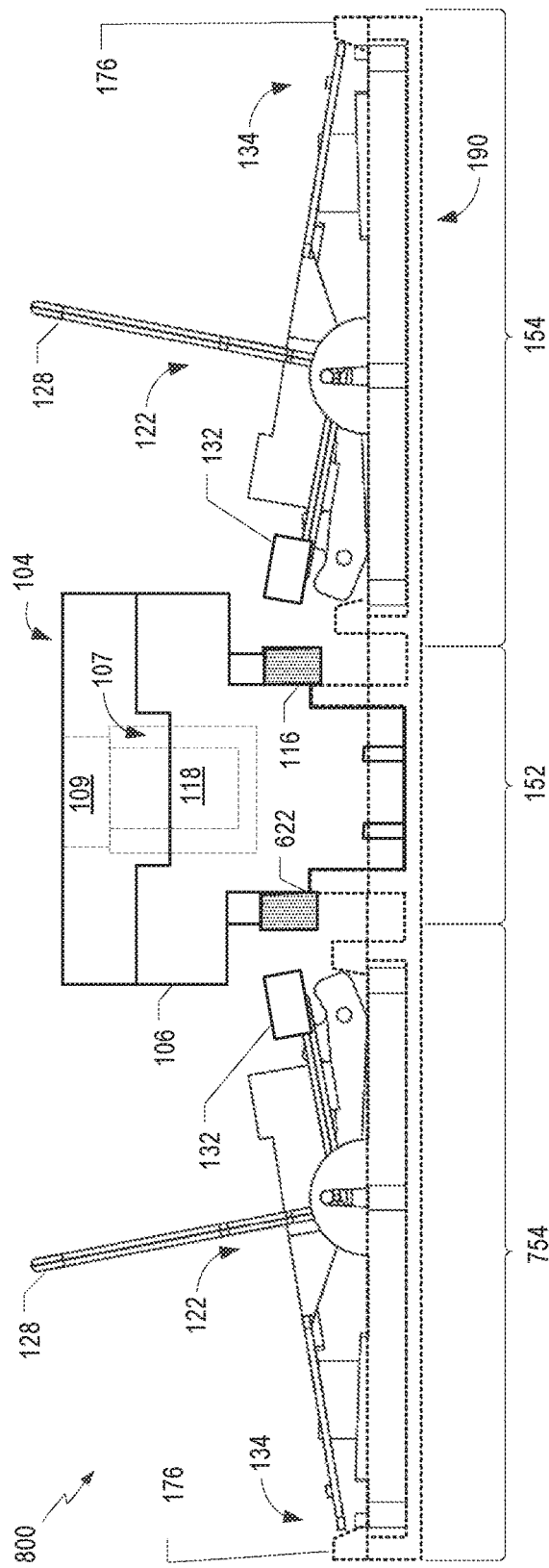
FIG. 8 is a diagram of the pest-management system of FIG. 8.

Referring to FIG. 8, a diagram of an example 800 of a pest-management apparatus (a pest-management system) is depicted. Example 800 includes detector device 104 (associated with first portion 152) coupled to first trap 122 (associated with second portion 154) via platform 190 and coupled to second trap (associated with third portion 754) via platform 190. In example 800, platform 190 is represented by dotted lines for clarity of illustration and to show coupling of the traps 122 and platform 190 by brackets 176.

As shown, a pest-management apparatus includes a first trap 122 (corresponding to second portion 154); a second trap (corresponding to third portion 754), detector device 104, and platform 190. Each of the first and second traps 122 having a corresponding base 124 and a corresponding capture element 128 pivotally coupled to the base 124 such that a portion of the capture element 128 is biased toward a capture portion 134 of the base 124. Detector device 104 includes first switch 116, second switch 622, and circuitry 118. Detector device 104 is configured to be coupled to first trap 122 such that operation of the portion of the capture element 128 of the first trap from a first set position toward the capture portion 134 of the first trap changes a state of first switch 116. Detector device 104 is configured to be coupled to second trap 122 such that operation of the portion of the capture element 128 of the second trap 122 from a second set position toward capture portion 134 of the second trap 122 changes a state of second switch 622. Circuitry 118 is configured to detect a change in the state of first switch 116, the second switch 622, or both. Platform 190 is configured to concurrently be removably coupled to base 124 of first trap 122 (corresponding to second portion 154), base 124 of the second trap 122 (corresponding to third portion 754), and the detector device 104. Additionally, as shown, each of first and second traps 122 is configured such that a corresponding capture element 128 is in the set position. Upon release of a particular capture element 128 from the set position, the capture element 128 travels toward a corresponding capture portion 134. Thus, FIG. 8 describes a pest-management apparatus that provides the same advantages as identified above with reference to FIG. 7.

Figure 9:
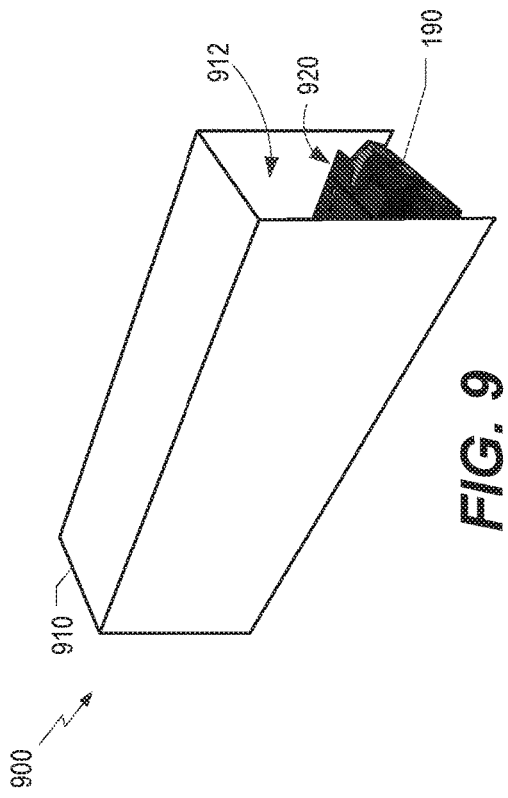
FIG. 9 is a diagram that illustrates and example of a canopy coupled to a pest management system.

Referring to FIG. 9, a diagram of an example 900 of a canopy 910 coupled to a pest-management apparatus 920 is depicted. Pest-management apparatus 920 includes platform 190, detector device 104, and one or more traps 122. For example, pest-management apparatus 920 may include any of examples 100, 300, 700, 800. Canopy 910 is coupled to platform 190 and is configured to, when coupled to platform 190, define one or more openings 912 through which a trap 122 is accessible to a rodent. Although canopy 910 is described as being coupled to platform 190, in other implementations, canopy 910 may be coupled to a pest-management apparatus that does not include platform 190, such as a pest-management apparatus in which detector device 104 is configured to be removably coupled to base 124 of one or more traps 122. In such implementations, canopy 910 may be coupled to detector device 104, at least one trap 122, or a combination thereof. Thus, FIG. 9 describes a canopy 910 that may be coupled to a pest-management apparatus, such as detector device 104 coupled to trap 122, to convert the apparatus into a station having an opening to direct a pest toward a capture portion of trap 122. Canopy 910 can be designed for a multitude of pest-management apparatus configurations and can be easy for a user to install and replace.

Referring to FIGS. 10-15, examples of a layout of a pest-management apparatus are depicted. In FIGS. 10-15, the examples include top views of platforms 190 configured to be coupled to detector device 104 and one or more traps 122. For example, each of the examples of FIGS. 10-15 includes a first region 182 (for coupling platform 190 to detector device 104) and multiple second regions 184 (for coupling platform 190 to one or more traps 122). To illustrate, each of the platforms of FIGS. 10-15 may include one or more through holes (e.g., 175), one or more brackets (e.g., 176), another means for fastening, or a combination thereof, to coupled one or more traps 122 to the platform. In each of the examples of FIGS. 10-15, the platform 190 is configured such that, when coupled to detector device 104, each switch 116 of detector device 104 corresponds to a different trap 122 and is configured to be selectively activated or deactivated responsive to operation of a corresponding trap 122. In this manner, each of the examples of a platform in FIGS. 10-15 facilitates proper placement of a switch 116 with respect to a corresponding trap 122 to enable detector device 104 to detect operation of each of one or more traps 122.

Referring to FIG. 10, an example 1000 of platform 190 is depicted. As shown, platform 190 in example 1000 has a generally "L" shape and is configured to concurrently be coupled to up to two traps 122. Accordingly, detector device 104 coupled to platform 190 may include at least two switches 116. As compared to examples 700, 800, example 1100 can advantageously be used to stage two traps 122 in a corner.

Referring to FIG. 11, an example 1100 of platform 190 is depicted. As shown, platform 190 in example 1100 has a generally "+" shape and is configured to concurrently be coupled to up to four traps 122, such as first, second, third, and fourth traps 122, and detector device 104. Accordingly, detector device 104 coupled to platform 190 may include four switches 116. To illustrate, platform 190 of example 1100 can be coupled to a first trap 122, a second trap 122, a third trap 122, and a fourth trap 122, where each trap includes a corresponding base 124 and a corresponding capture element 128 pivotally coupled to the base 124 such the a portion of the capture element is biased toward a capture portion 134 of the base. As compared to examples 700, 800, 1000, example 1100 can advantageously be used to stage four traps, as compared to two traps, in a pest-management system.

Figure 12:
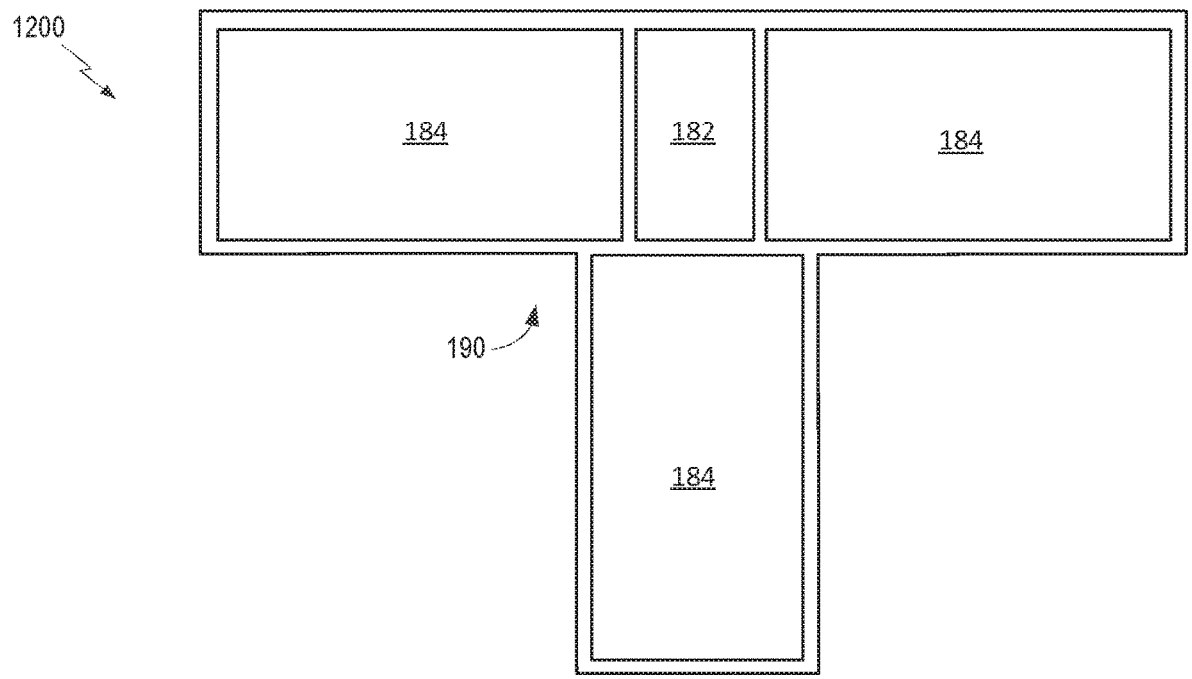
FIG. 12 is top view of a third example of a layout of a pest-management system.
Figure 13:
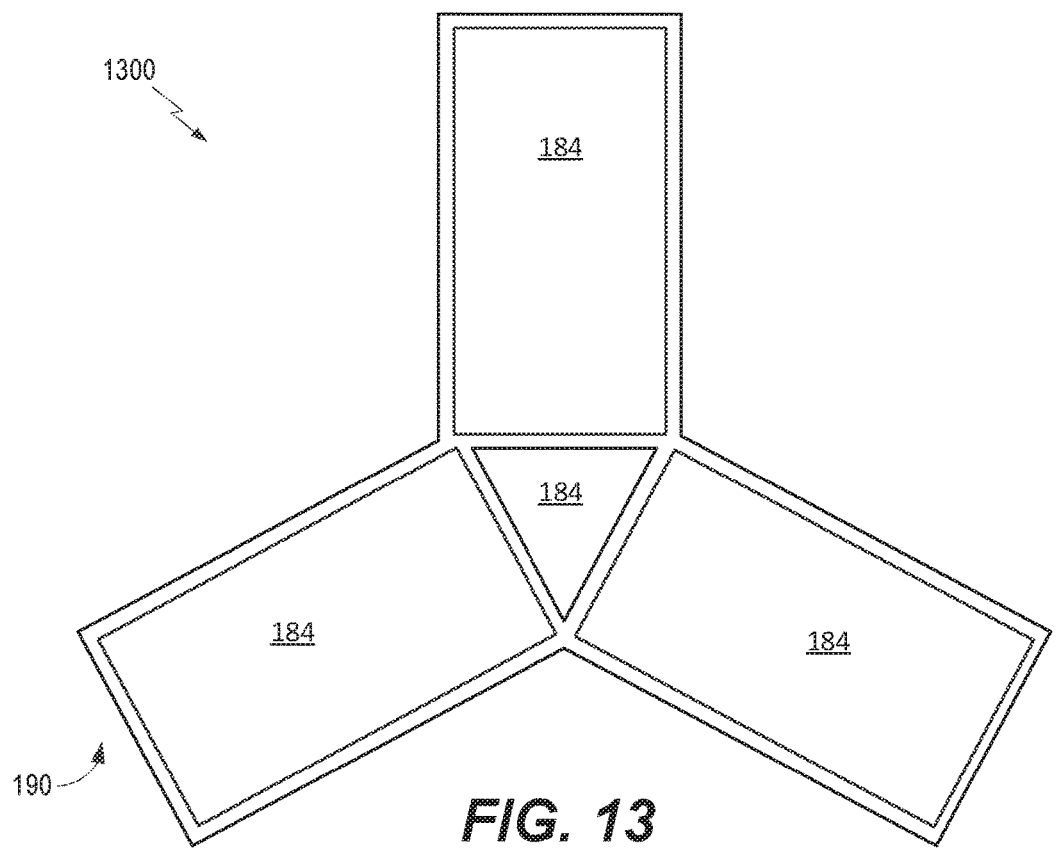
FIG. 13 is top view of a fourth example of a layout of a pest-management system.

Referring to FIG. 12, an example 1200 of platform 190 is depicted in which platform 190 has a generally "T" shape and is configured to concurrently be coupled to up to three traps 122 and detector device 104. Referring to FIG. 13, an example 1300 of platform 190 is depicted in which platform 190 has a generally "Y" shape and is configured to concurrently be coupled to up to three traps 122 and detector device 104. In each of examples 1200, 1300, detector device 104 may include three switches. As compared to examples 700, 800, 1000, each of examples 1200, 1300 can advantageously be used to stage three traps, as compared to two traps, in a pest-management system.

Figure 14:
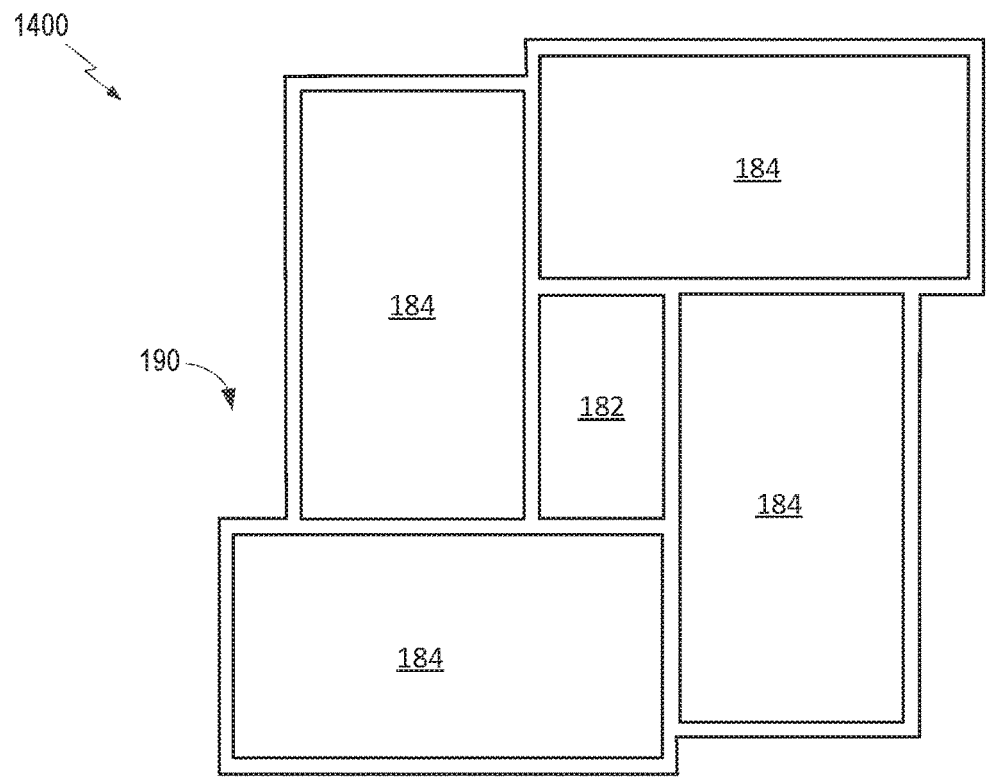
FIG. 14 is top view of a fifth example of a layout of a pest-management system.

Referring to FIG. 14, an example 1400 of platform 190 is depicted in which platform 190 in example 1100 has a generally rectangular shape and is configured to concurrently be coupled to up to four traps 122. Accordingly, detector device 104 coupled to platform 190 may include four switches 116. As compared to examples 700, 800, 1000, 1200, 1300, example 1400 can advantageously be used to stage four traps, as compared to two traps or three traps, in a pest-management system.

Figure 15:
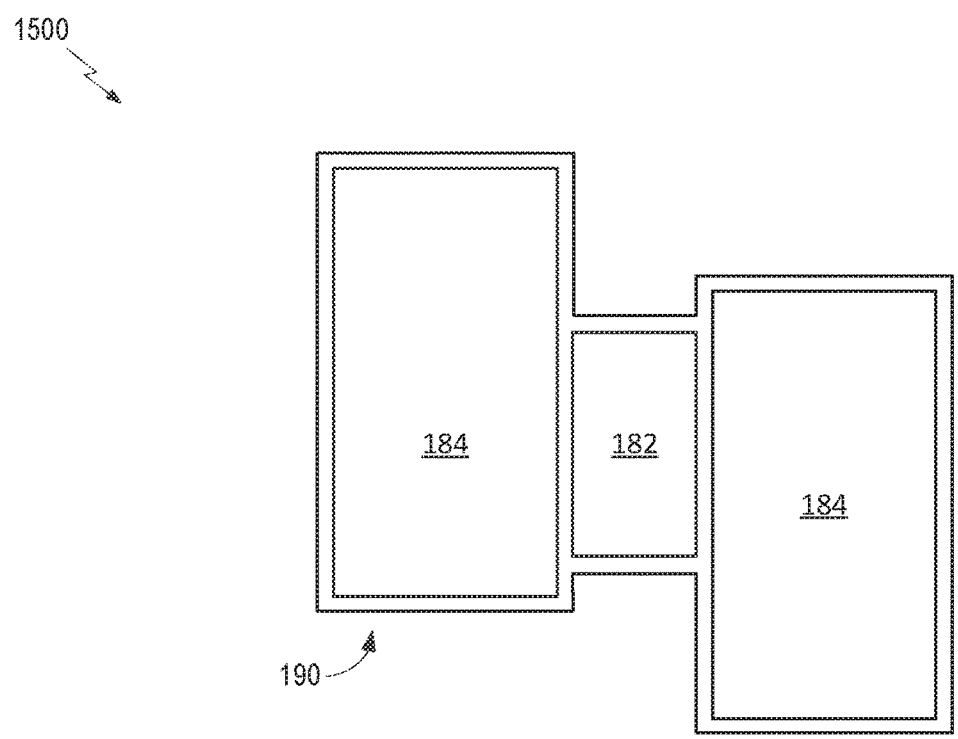
FIG. 15 is top view of a sixth example of a layout of a pest-management system.

Referring to FIG. 15, an example 1500 of platform 190 is depicted in which platform 190 enables detector device 104 to be positioned between two parallel positioned traps 122. As compared to examples 700, 800, 1100, example 1500 advantageously has a more compact design while still enabling detector device 104 to be concurrently coupled to two traps 122.

It is understood, that FIGS. 10-15 are intended to provide examples and are not intended to be limiting. Accordingly, other layouts of platform 190 are possible, such as a layout having a generally pentagram shape and configured to concurrently be removably coupled to five traps 122.

Figure 16:
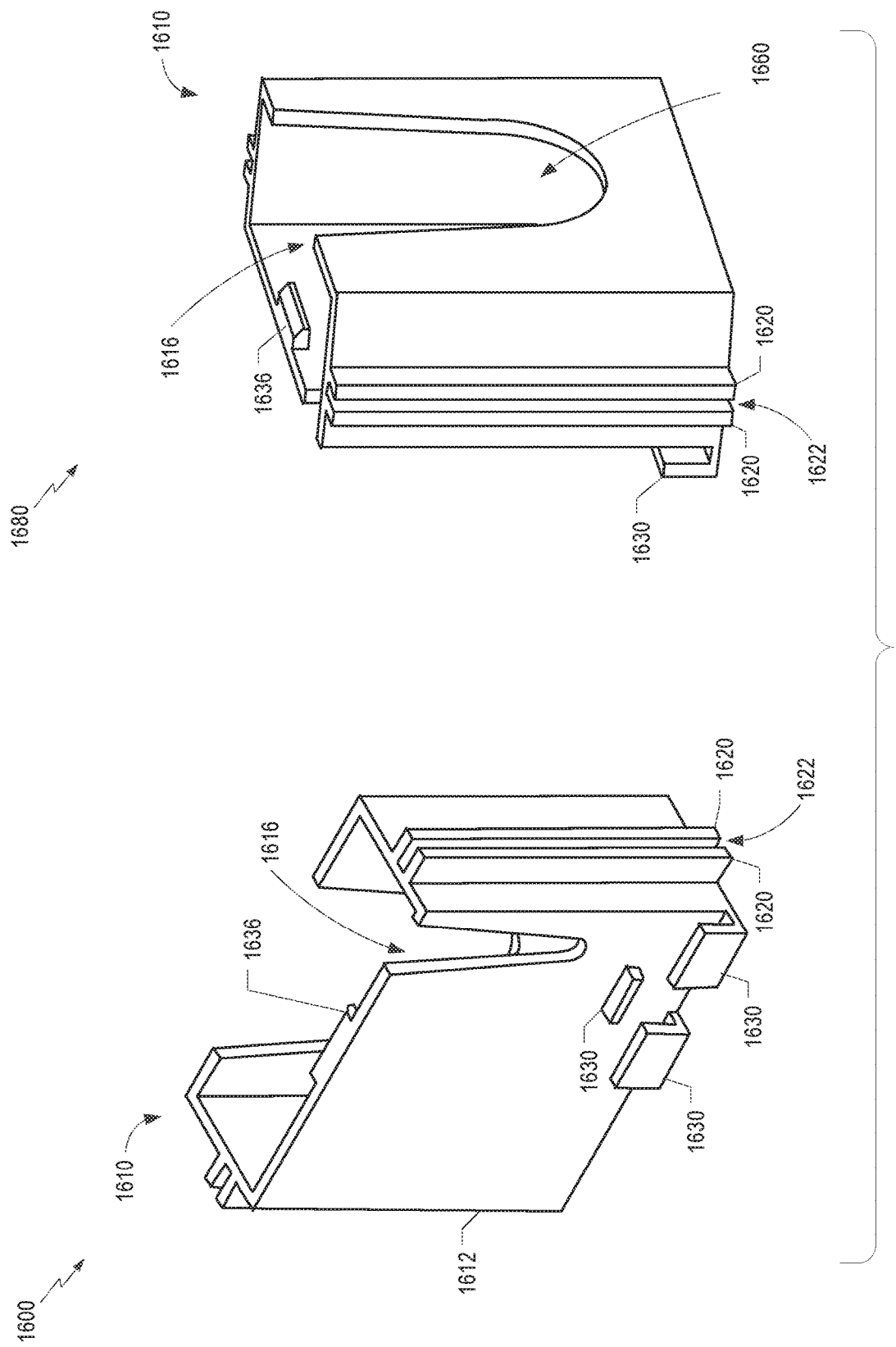
FIG. 16 is a diagram that includes isometric views of a first example of a holder associated with a monitoring system of a pest-management system.

Referring to FIG. 16, a diagram is depicted that includes examples 1600, 1680 of perspective views of a holder 1610 associated with detector device 104 of a pest-management system. For example, holder 1610 includes a structure 1612 that defines a cavity 1616 configured to receive at least a portion of housing 106 of detector device 104. Holder 1610 may include one or more brackets 1636 (e.g., clips) for retaining detector device 104 at least partially within holder 1610.

As shown, holder 1610 includes brackets 1630 configured to enable holder 1610 to be removably coupled to trap 122. In some implementations, brackets 1630 enable holder 1610 to be removably coupled directly to base 124 of trap 122, as described with reference to at least FIGS. 19A-19D. In other implementation, brackets 1630 enable holder 1610 to be removably coupled to base 124 of trap 122 via platform 190, as described with reference to at least FIGS. 20A, 20C, 21, 22. Additionally, or alternatively, holder 1660 may include an opening 1660. For example, opening 1660 may enable access to an indicator (e.g., 408), an activation switch (e.g., 109, 509), or both, of a detector device (e.g., 104) coupled to holder 1610.

As shown, holder 1610 includes fins 1620 that define slot 1622. One or more slots 1622 can enable holder 1610 to be coupled to a trap 122 via a platform 190, one or more separators, or a combination thereof, as described with reference to at least FIGS. 24, 25. It is noted that in some implementations, holder 1610 may include fins 1620 and not brackets 1630, or vice versa.

Figure 17:
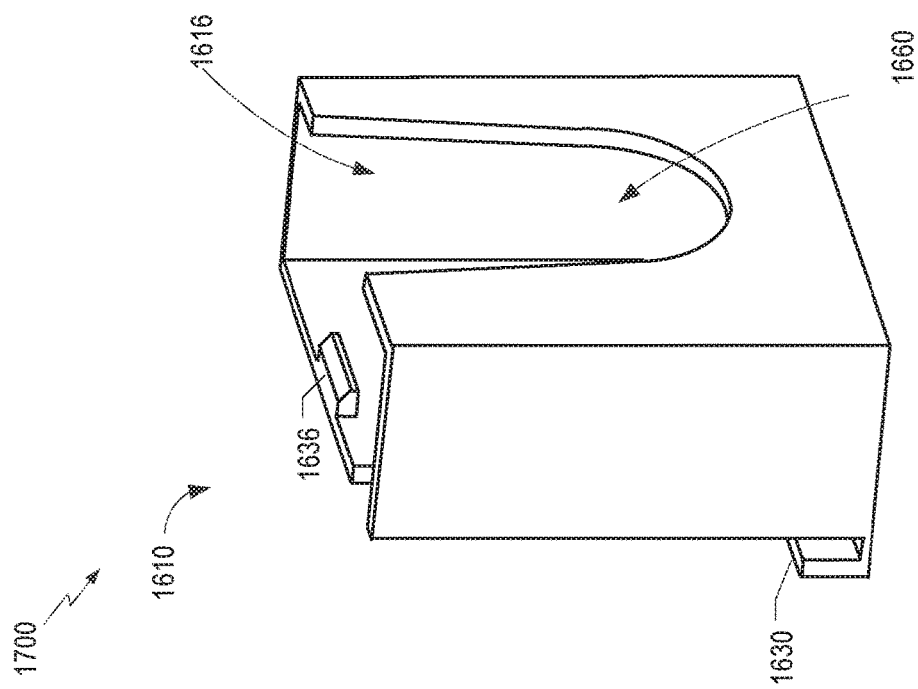
FIG. 17 is a diagram that includes an isometric view of a second example of a holder associated with a monitoring system of a pest-management system.

Referring to FIG. 17, a diagram of a perspective view of another example 1700 of holder 1610 is depicted. As compared to examples 1600, 1680 of FIG. 16, holder 1610 of example 1700 includes brackets 1630 but does not include fins 1620. Accordingly, holder 1610 of example 1700 may be easier and less expensive to manufacture as compared to holder 1610 of FIG. 16.

Figure 18:
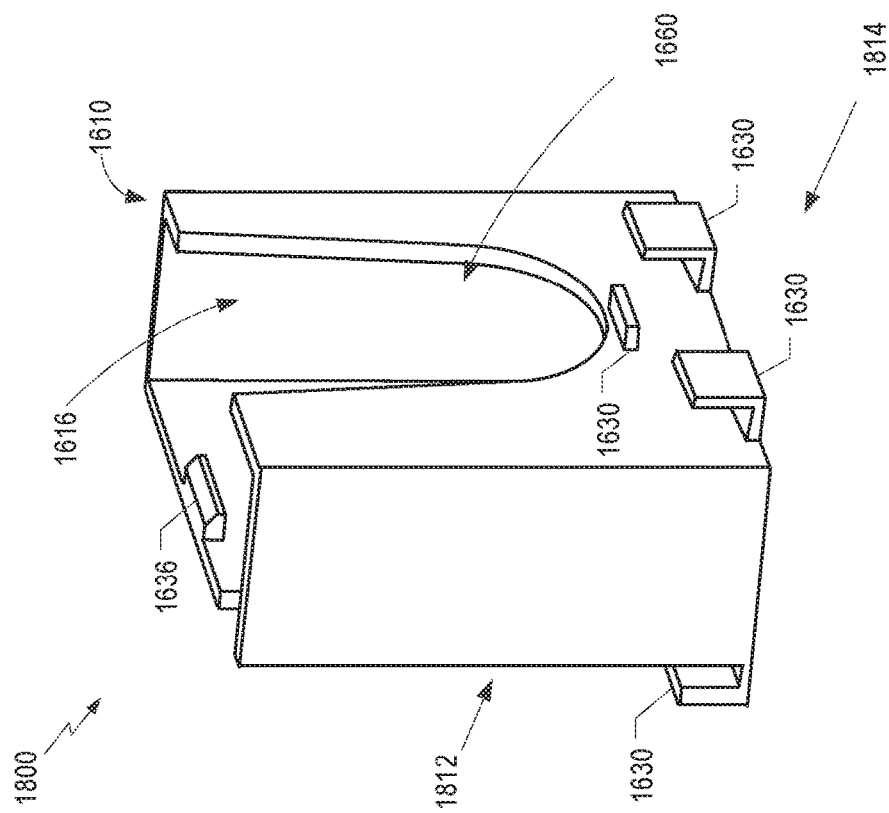
FIG. 18 is a diagram that includes an isometric view of a third example of a holder associated with a monitoring system of a pest-management system.

Referring to FIG. 18, a diagram of a perspective view of another example 1800 of holder 1610 is depicted. As compared to example 1700, holder 1610 of example 1800 includes a first set of brackets 1630 on a first side 1812 of holder 1610 and includes a second set of brackets 1630 on a second side 1814 of holder 1610. It is noted that although the second set of brackets 1630 is described as being on second side 1814 which is opposite first side 1812, in other implementations, the second set of brackets 1630 can be on a side of holder 1610 that is adjacent to first side 1812. Additionally, or alternatively, although example 1800 describes two sets of brackets 1630, in other implementation, holder 1610 can have more than two sets of brackets 1630 to enable holder 1610 to be able to be concurrently coupled to two or more platforms 190, to two or more traps, or to at least one platform and at least one trap 122.

Figure 19A:
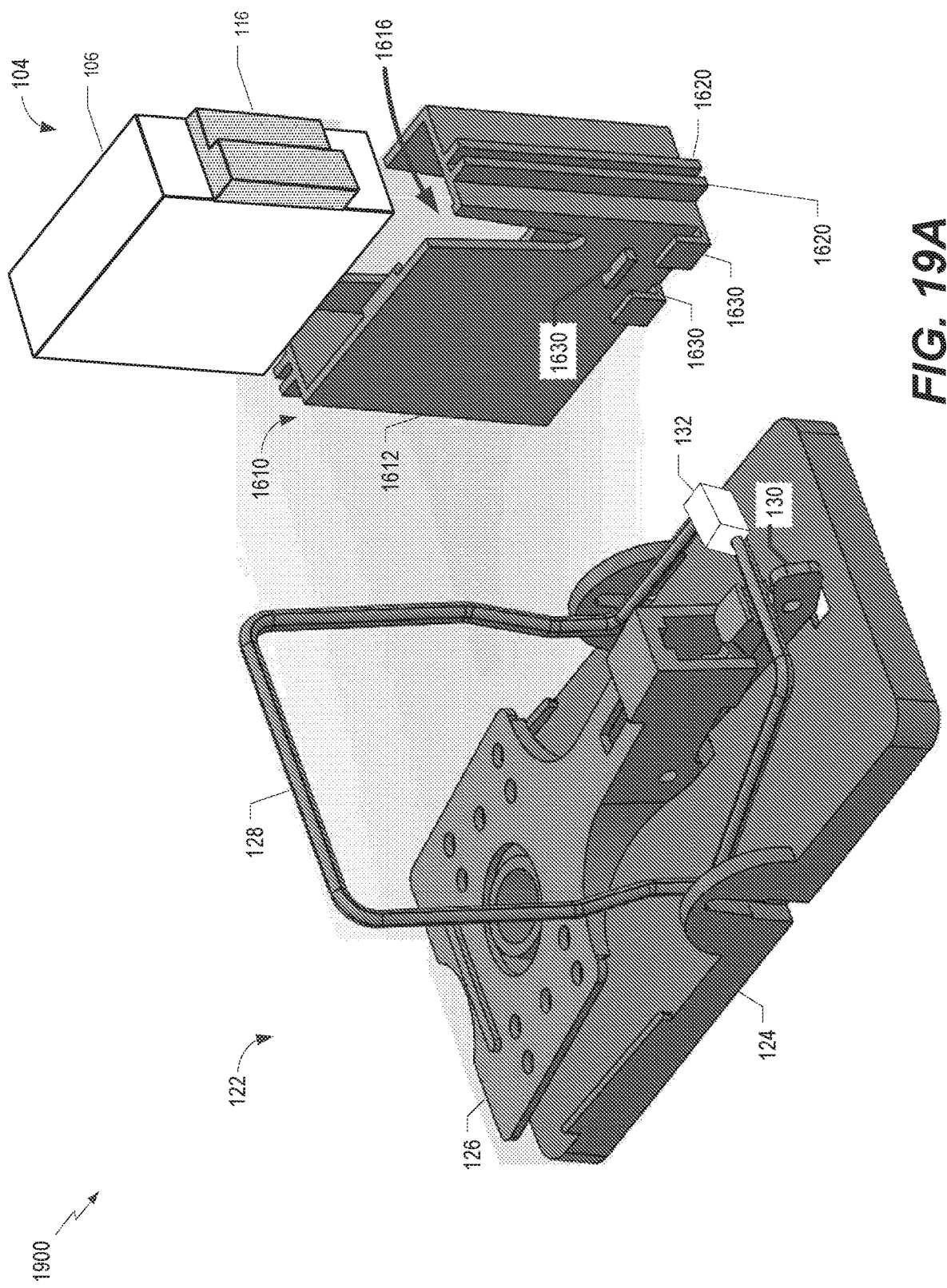
FIG. 19A is a diagram that that illustrates an isometric view of another example of a pest-management system.
Figure 19B:
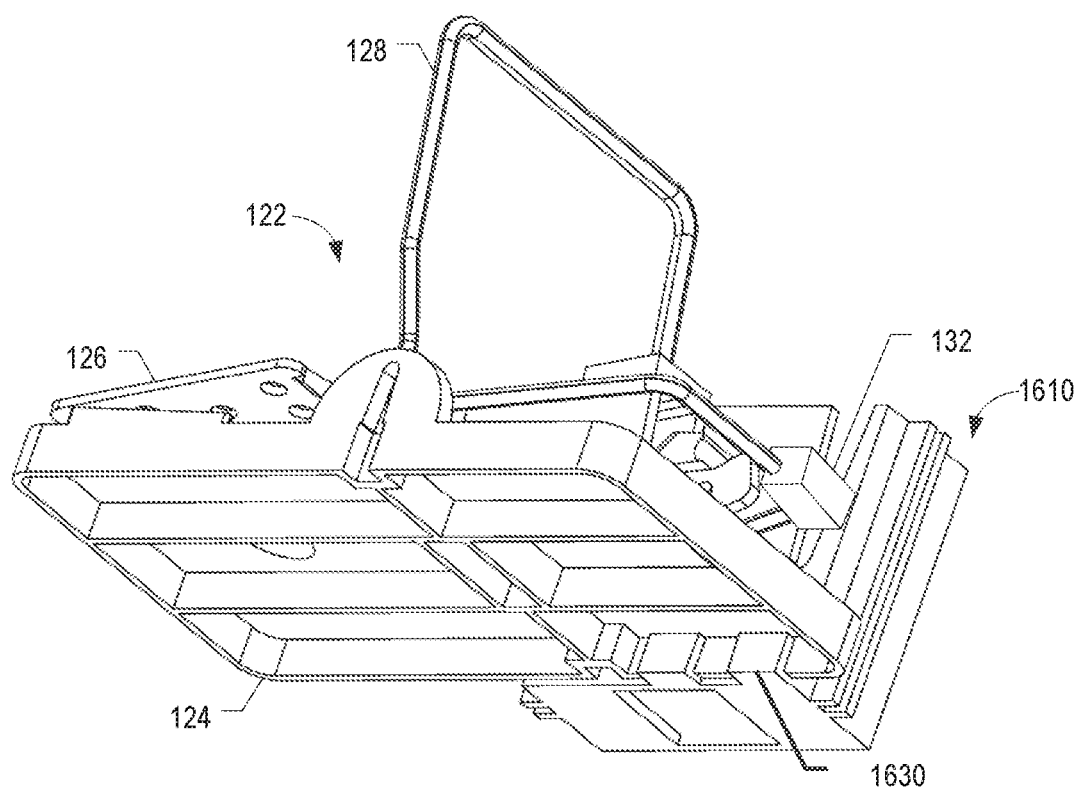
FIG. 19B is a diagram that illustrates an aspect of the pest-management system of FIG. 19A.
Figure 19C:
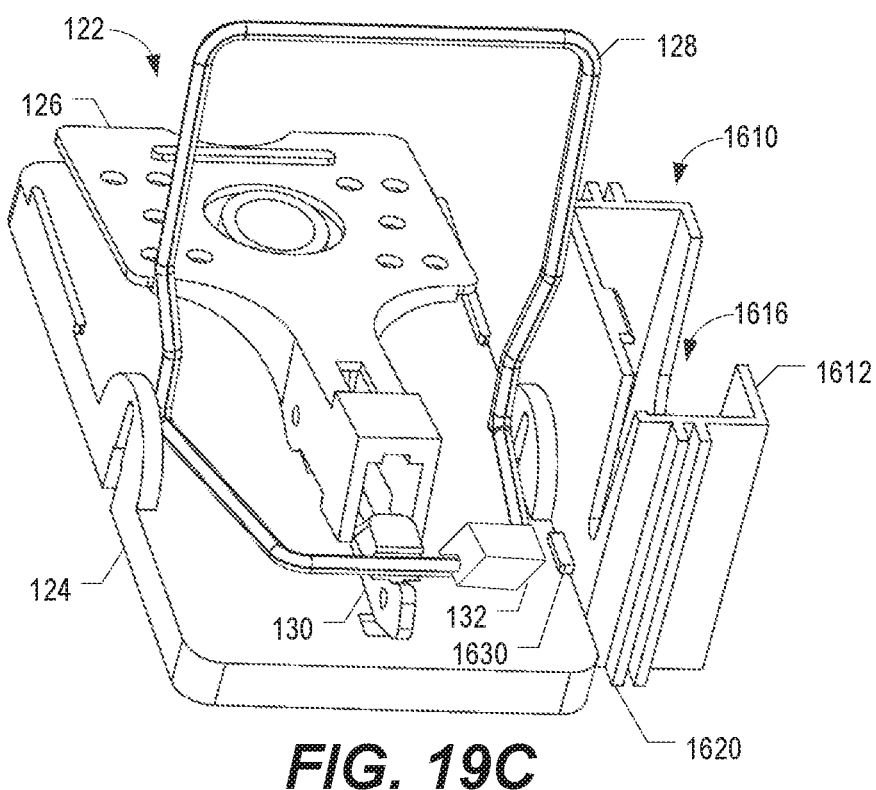
FIG. 19C is a diagram that illustrates an aspect of the pest-management system of FIG. 19A.
Figure 19D:
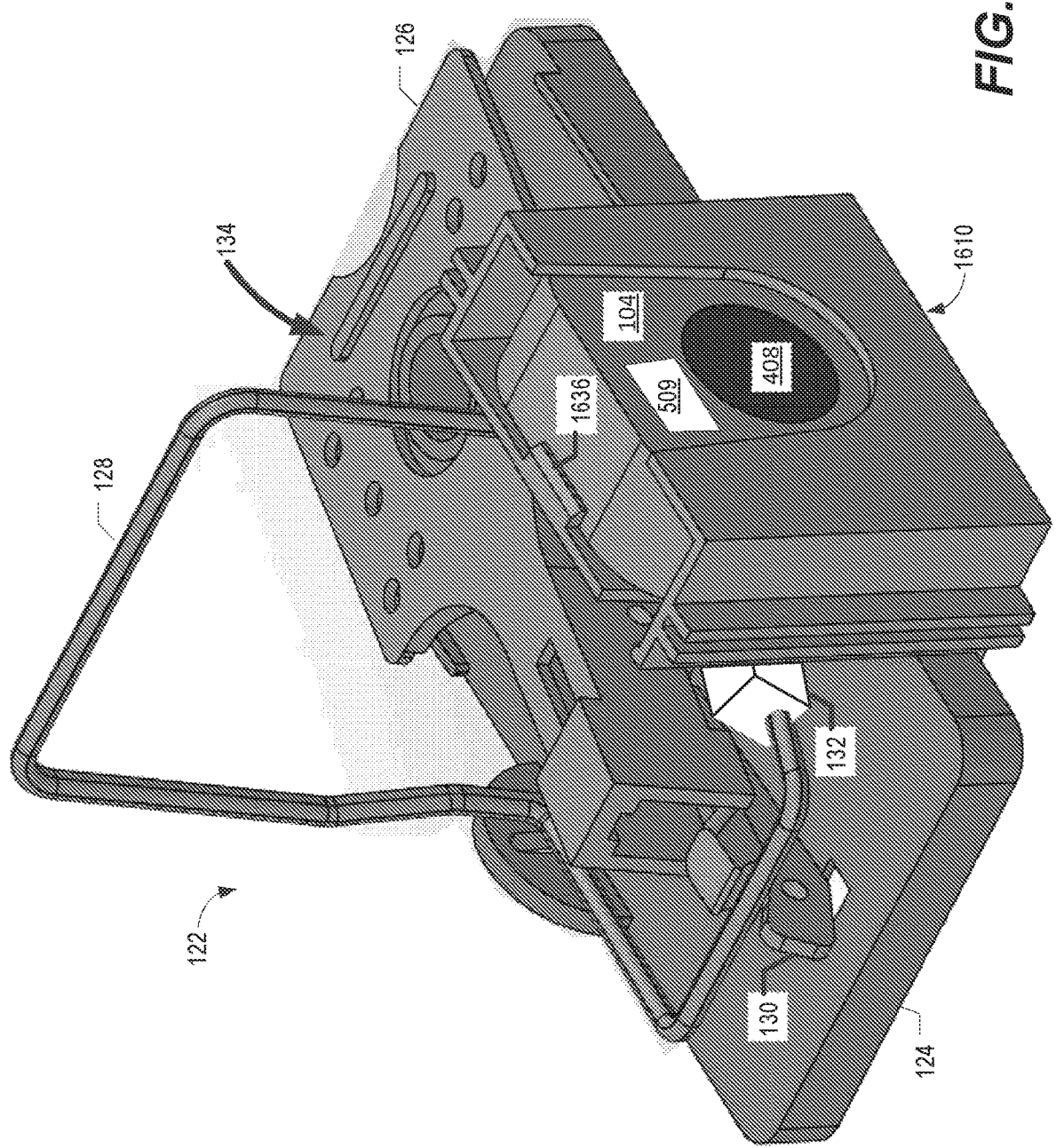
FIG. 19D is a diagram that illustrates an aspect of the pest-management system of FIG. 19A.
Figure 19E:
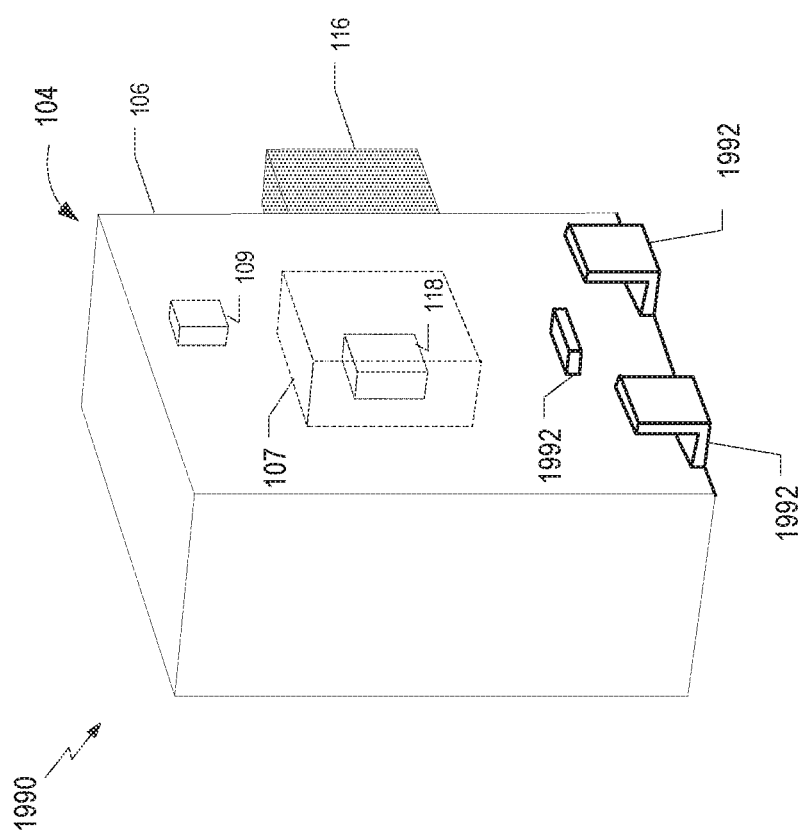
FIG. 19E is a diagram that illustrates a detector device couplable to a trap of the pest-management system of FIG. 19A.

Referring to FIGS. 19A-19E, FIG. 19A depicts is a diagram that that illustrates a perspective view of an example 1900 of a pest-management system, FIG. 19B depicts a diagram that illustrates an aspect of the pest-management system of FIG. 19A, FIG. 19C depicts a diagram that illustrates another aspect of the pest-management system of FIG. 19A, FIG. 19D depicts a diagram that illustrates another aspect of the pest-management system of FIG. 19A, and FIG. 19E depicts an example 1990 of detector device 104 couplable directly to trap 122.

Referring to FIG. 19A, example 1900 includes trap 122, holder 1610, and detector device 104. Holder 1610 is configured to be coupled to detector device 104. To illustrate, detector device 104 may be inserted into cavity 1616 and retained within cavity 1616 by bracket 1636. Holder 1610 is configured to be directly coupled to trap 122 by engaging brackets 1630 with base 124, as described further with reference to FIGS. 19B and 19C.

Referring to FIG. 19B, an isometric view from a bottom perspective of holder 1610 coupled to trap 122 is depicted. As shown in FIG. 19B, at least one bracket 1630 engages a wall of base 124. Referring to FIG. 19C, an isometric view from a top perspective of holder 1610 coupled to trap 122 is depicted. As shown in FIG. 19C, at least one bracket 1630 engages a top surface of base 124. Referring to FIG. 19D, an isometric view of holder 1610, including detector device 104, coupled to trap 122 is depicted. As shown in FIG. 19D, bracket 1636 engages a surface of detector device 104 to secure detector device 104 within cavity 1616 of holder 1610. Accordingly, as depicted with reference to FIGS. 19A-19D, holder 1610 enables detector device 104 to be removably coupled to trap 122. Additionally, detector device 104 is easy to install within cavity 1616 of holder 1610 and does not require additional components. Further, holder 1610 couples directly to base 124 such that, when holder 1610 includes detector device 104, switch 116 of detector device 104 is automatically positioned to enable detector device 104 to identify operation of trap 122 (e.g., release of capture element 128 from the set position) based on an interaction of a magnetic field of magnet 132 and switch 116.

Referring to FIG. 19E, an example 1990 of detector device 104 (e.g., housing 106) that includes one or more brackets 1992 is depicted. For example, one or more brackets 1992 are configured to engage base 124 of trap 122 in a similar manner as brackets 1630 of holder 1610. As compared to FIGS. 19A-19D, example 1990 of detector device 104 may be coupled directly to base 124 of trap 122 without use of holder 1610. Additionally, brackets 1992 may also enable detector device 104 to be coupled directly to platform 190 (without use of holder 1610) as depicted in FIGS. 20A-20C, 21, 22. Coupling detector device 104 directly to trap 122 (without using holder 1610) may reduce a cost associated with use of the pest-management system and may simplify installation of the pest-management system.

Figure 20A:
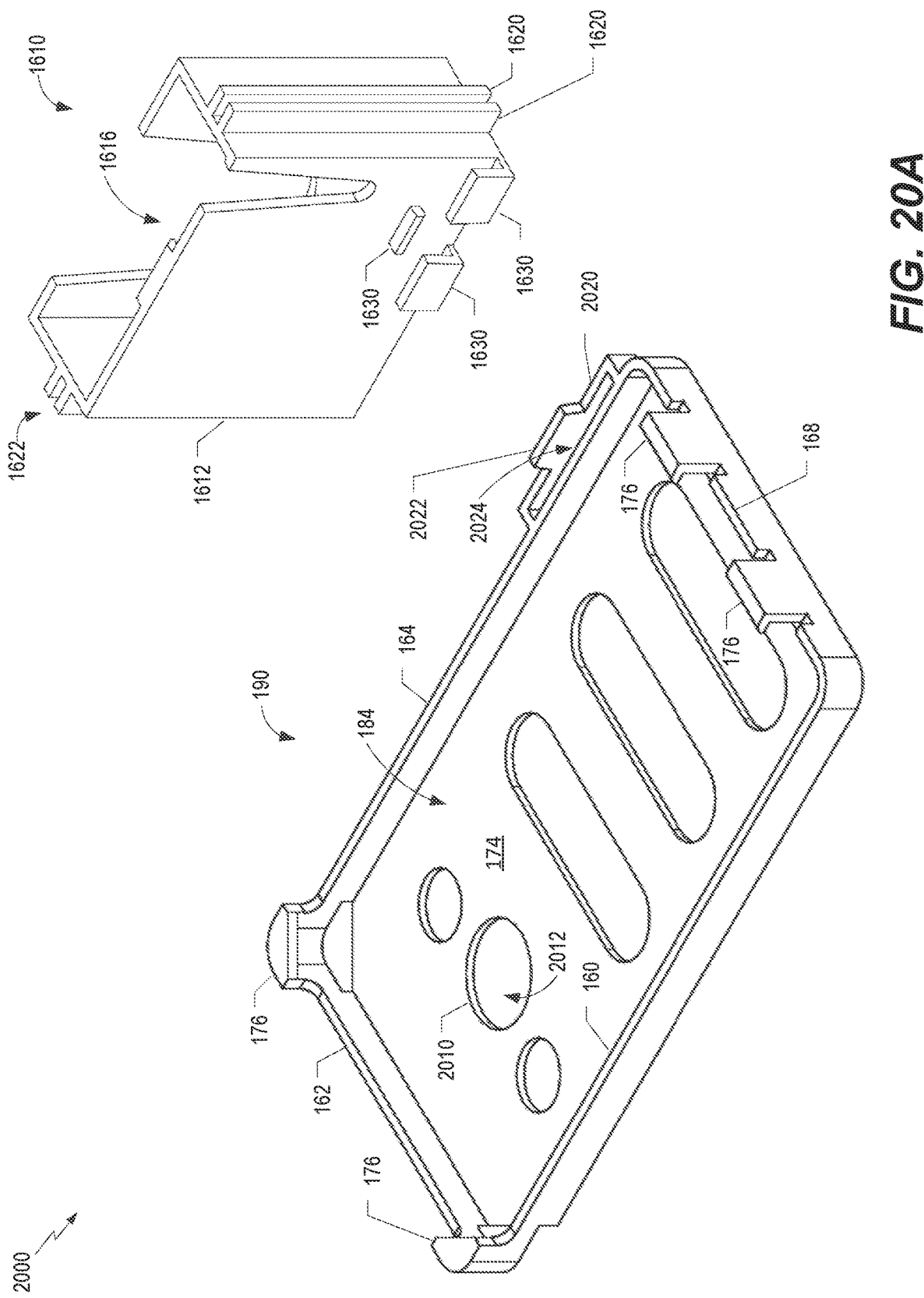
FIG. 20A is a diagram that that illustrates an isometric view of a base and a holder of another example of a pest-management system.

Referring to FIGS. 20A-20C, FIG. 20A depicts is an isometric view of an example 2000 of platform 190 and holder 1610 of a pest-management system, FIG. 20B depicts an example 2050 of platform 190 of FIG. 20A coupled to trap 122, and FIG. 20C depicts an example 2090 of platform 190 of FIG. 20A coupled to holder 1610.

Referring to FIG. 20A, platform 190 includes walls 160, 162, 164, 168, brackets 176, and surface 174. Platform 190 includes region 184 configured to be coupled to trap 122. Surface 174 includes an opening 2010 that defines a channel 2012 through which a screw or other fastener can be inserted to secure trap 122 to platform 190 or to secure platform 190 to another structure. For example, opening 2010 and channel 2012 may include or correspond to through hole 175.

Platform 190 also includes bracket 2020 that includes protrusion 2022 configured to engage at least one bracket 1630 of holder 1610. Bracket 2020, in conjunction with wall 164 defines an opening 2024 to receive one or more brackets 1630 of holder 1610. As shown, platform 190 is configured to be removably coupled to holder 1610, which is configured to be coupled to detector device 104. In some implementations, platform 190 may be considered to include holder 1610 such that cavity 1616 of holder 1610 corresponds to region 182 associated with platform 190. Additionally, although bracket 2020, protrusion 2022, and opening 2024 are described as being configured to engage brackets 1630 of holder 1610, in other implementations, bracket 2020, protrusion 2022, and opening 2024 can engage brackets 1992 of example 1900 of detector device 104 described with reference to FIG. 19E.

Referring to FIG. 20B, platform 190 is coupled to trap 122. As shown, brackets 176 are configured to engage a surface of base 124 to maintain trap 122 in a coupled relationship with platform 190. Referring to FIG. 20C, platform is coupled to holder 1610, which includes detector device 104 within cavity 1616. To couple holder 1610 and platform 190, brackets 1630 of holder 1610 are engaged with bracket 2020 and protrusion 2022 of platform 190.

Figure 21:
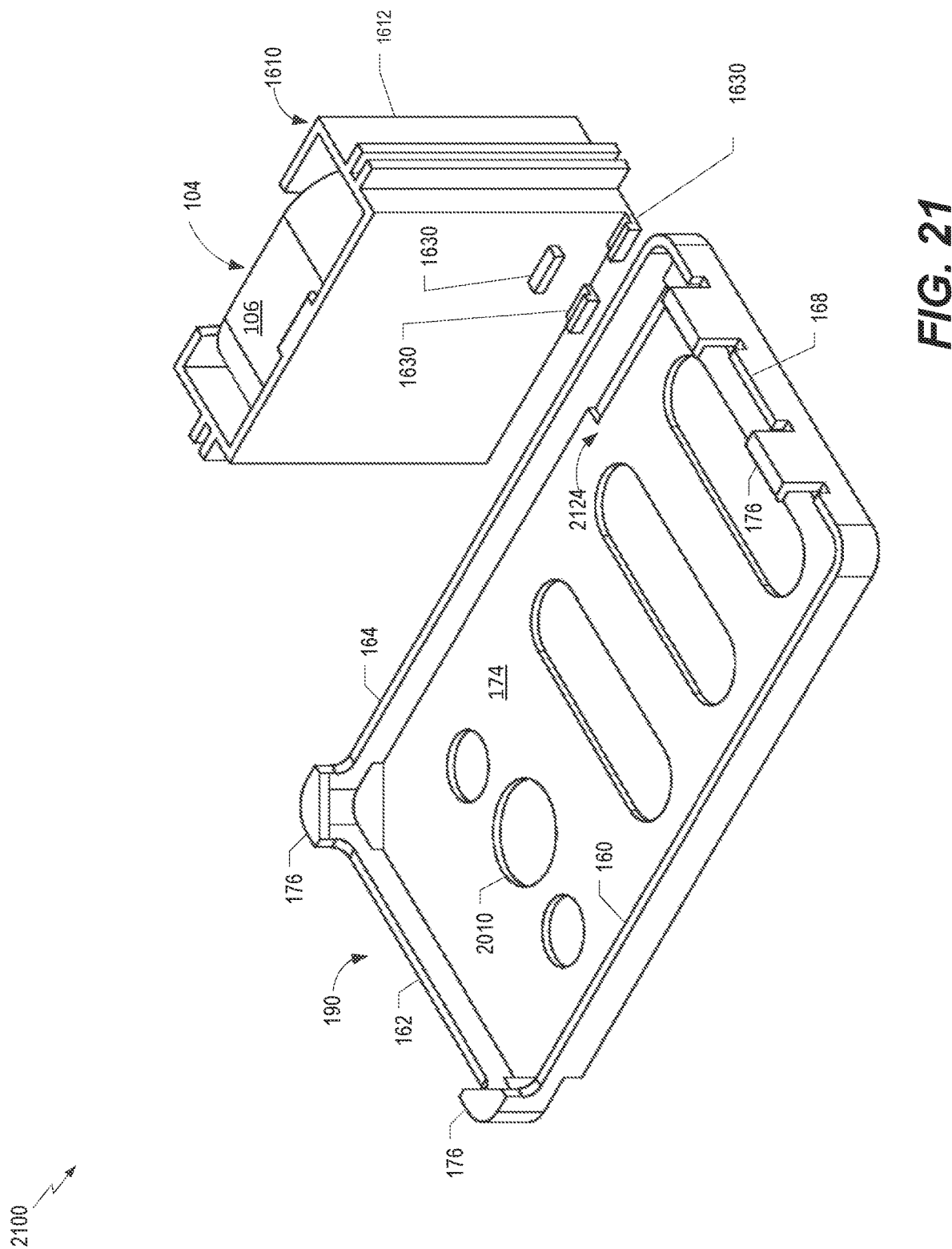
FIG. 21 is a diagram that that illustrates an isometric view of a base, a holder, and a detector device of another example of a pest-management system.

Referring to FIG. 21, a diagram of another example 2100 of an aspect of a pest-management system is depicted. Example 2100 includes platform 190, holder 1610, and detector device 104. Detector device 104 is included within cavity 1616 of holder 1610. As compared to platform 190 of FIGS. 20A-20C, platform 190 of FIG. 21 does not include bracket 2020 and protrusion 2022. As shown, platform 190 includes an opening 2124 defined by wall 164 and surface 174. Opening 2124 and wall 164 are configured to engage bracket 1630 of holder 1610 to removably couple platform 190 to holder 1610. For example, brackets 1630 may engage opening 2124 and wall 164 in a manner similar as described with reference to FIGS. 20A, 20C. Additionally, platform 190 may engage trap 122 in a manner similar as described with reference to FIG. 20B. In some implementations, platform 190 may be considered to include holder 1610 such that cavity 1616 of holder 1610 corresponds to region 182 associated with platform 190. Although opening 2124 and wall 164 are described as being configured to engage brackets 1630 of holder 1610, in other implementations, opening 2124 and wall 164 can engage brackets 1992 of example 1900 of detector device 104 described with reference to FIG. 19E.

Figure 22:
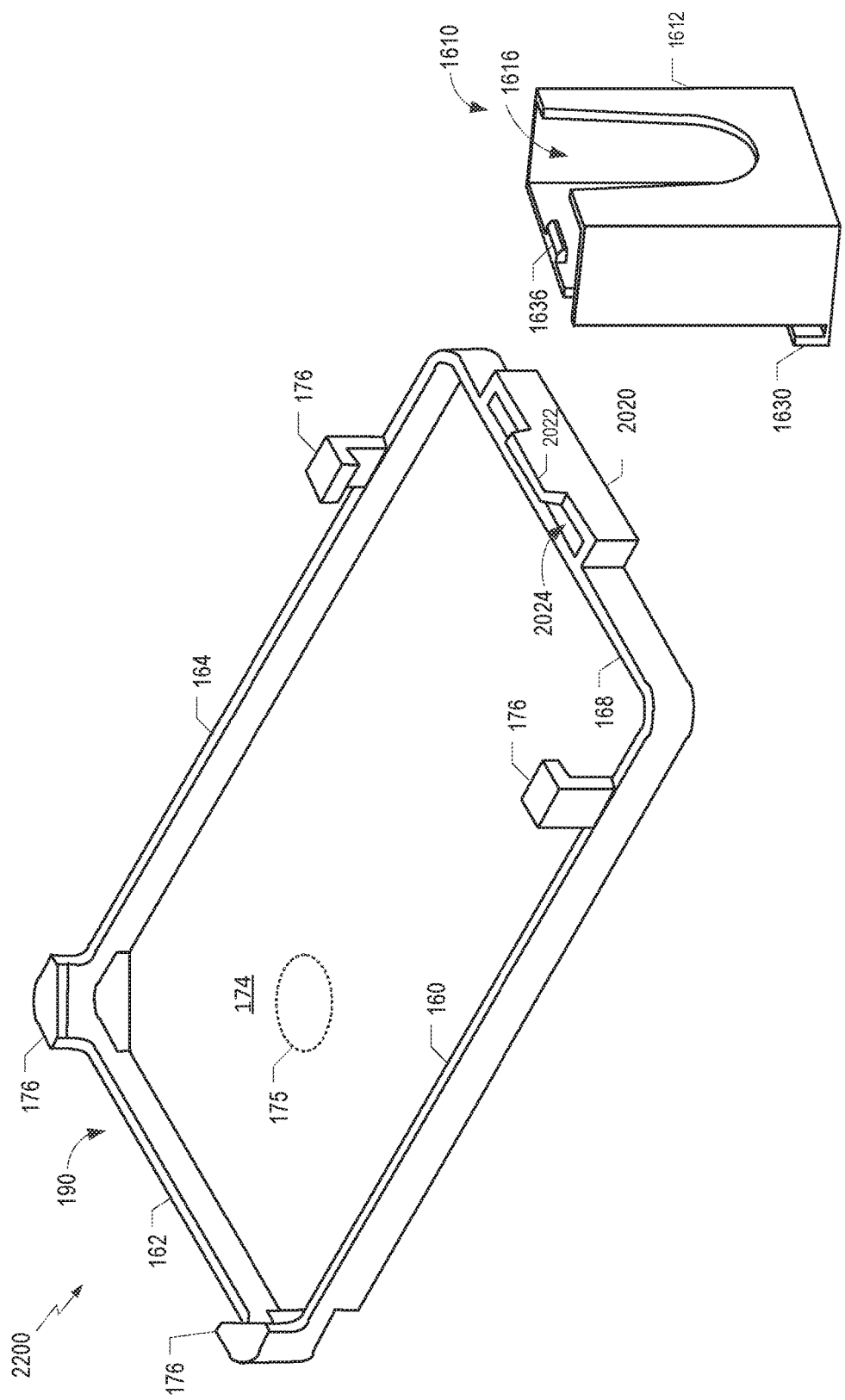
FIG. 22 is a diagram that that illustrates an isometric view of a base and a holder of another example of a pest-management system.

Referring to FIG. 22, another example 2200 platform 190 and holder 1610 of a pest-management system is depicted. As compared to platform 190 of FIGS. 20A-20C, platform 190 of example 2200 includes bracket 2020, protrusion 2022, and opening 2024 adjacent to wall 168. To illustrate, opening 2024 is defined by bracket 2020, protrusion 2022, and wall 168. Platform 190 of example 2200 may be removably coupled to holder 1610 in a similar manner as described with reference to FIGS. 20A, 20C. In some implementations, example 2200 may include through hole 175. In an alternative implementation, bracket 2020, protrusion 2022, and opening 2024 of platform 190 of example 2200 can engage brackets 1992 of example 1900 of detector device 104 described with reference to FIG. 19E.

Figure 23:
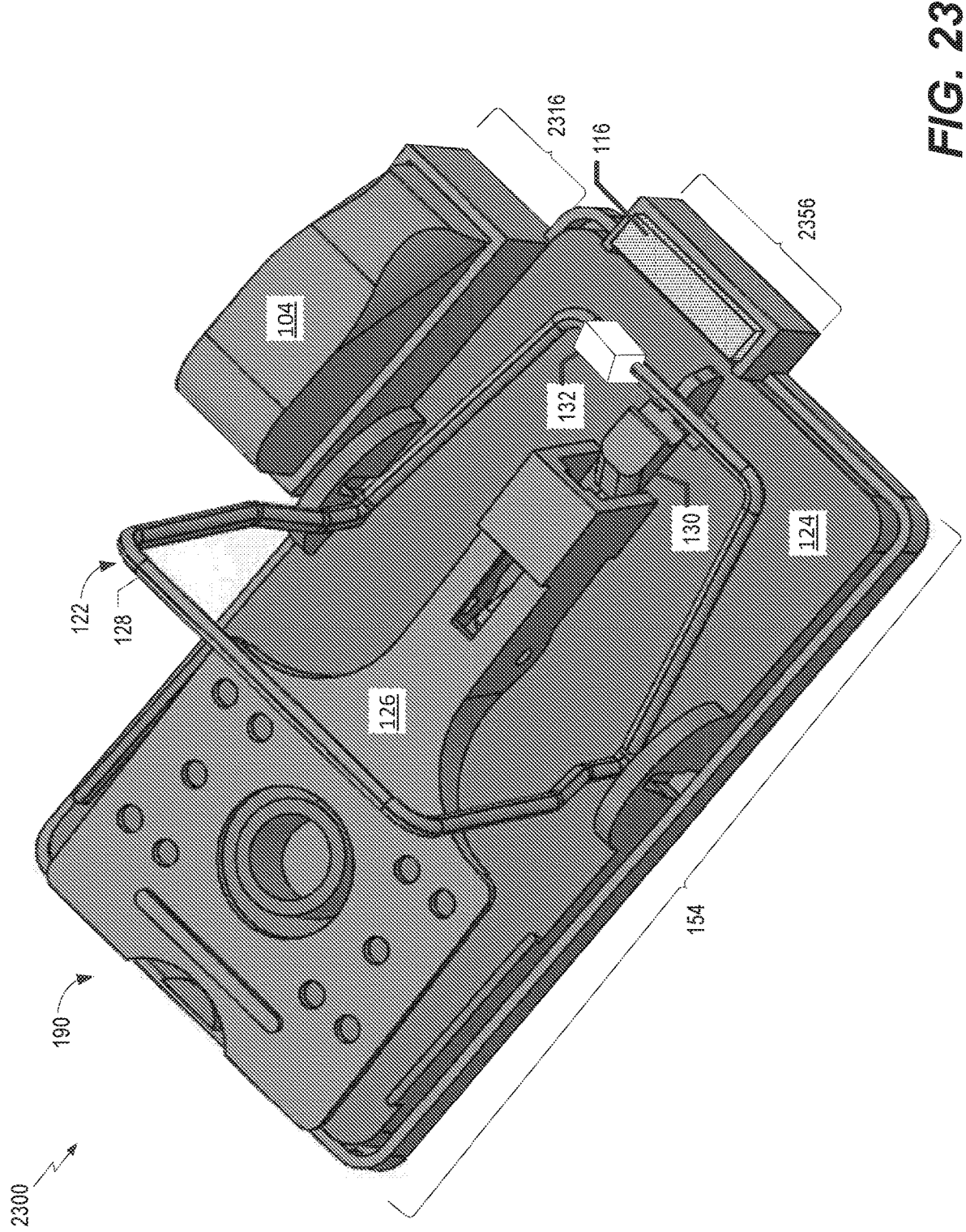
FIG. 23 is a diagram that that illustrates an isometric view of another example of a pest-management system.

Referring to FIG. 23, an example 2300 of platform 190 of a pest-management system is depicted. In example 2300, platform 190 includes portion 154 associated with region 184 configured to be coupled to trap 122. Platform 190 further includes portions 2316, 2356. Portion 2356 is configured to be coupled to switch 116 and portion 2316 is configured to be coupled to detector device 104. It is noted that detector device 104 of FIG. 23 is not physically coupled to switch 116, rather, detector device 104 is electrically coupled to switch 116 via one or more electrical wires, electrical contact, or both. In example 2300, it is noted that the one or more electrical wires, electrical contacts, or both are not accessible from an exterior of platform 190 as shown.

Figure 24:
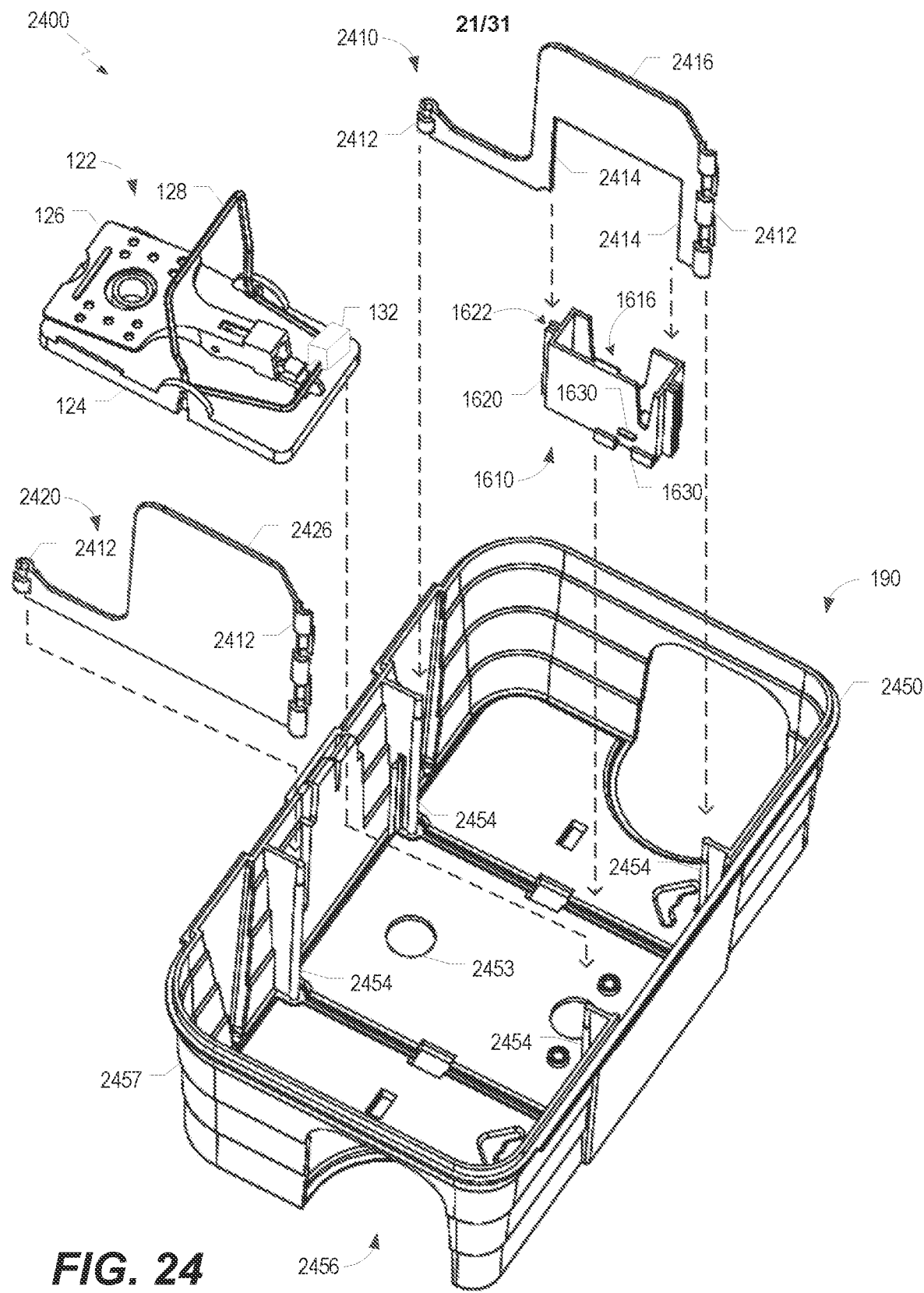
FIG. 24 is an assembly drawing of an example of a bait station associated with a pest-management system.

Referring to FIG. 24, an assembly drawing of an example 2400 of a station, such as a bait station, associated with a pest-management system is depicted. Example 2400 includes trap 122, separators 2410, 2420, holder 1610, and platform 190. In some implementations, trap 122 may be coupled to platform 190 of FIG. 24 via another platform (e.g., 190 of FIGS. 1, 20A, 22, 23, 29A, 30A). It is noted that one or more components, such as detector device 104 and a lid of the station, have been omitted for ease of illustration and description.

Platform 190 includes a base portion (e.g., base 2450) and a lid portion (e.g., a lid—not shown). For example, the lid is movable relative to base 2450 to cover a chamber (e.g., an interior chamber) of platform 190. Base 2450 includes walls 2457 and posts 2454. Base 2450 also includes one or more openings 2456 to enable a pest, such as rodent, to enter an interior chamber of platform 190 when the lid is coupled to base 2450. Additionally, or alternatively, base 2450 includes a through hole 2453, which may include or correspond to through hole 175. Separator 2420 includes wall portion 2426 and clips 2412. Separator 2410 includes wall portion 2416 and clips 2412. Clips 2412 are configured to be coupled to posts 2454 of base 2450. Wall portion 2416 includes edges 2414 that are spaced apart and configured to engage slots 1622 of holder 1610. It is noted that detector device 104 is to be coupled to holder 1610 (e.g., inserted into cavity 1616) prior to edges 2414 being engaged with slots 1622. In other implementations, holder 1610 may be replaced by detector device 104 that includes fins and slots (similar to fins 1620 and slots 1622) coupled to housing 106.

When holder 1610 (including detector device 104), separator 2410, trap 122, and separator 2420 are positioned in base 2450 and the lid is coupled to base 2450, separators 2410, 2420 guide a rodent that enters opening 2456 of platform 190 to capture portion 134 of trap 122. For example, referring to FIG. 25, an example 2500 of the station of FIG. 24 is depicted. In example 2500, edge 2414 is engaged with slot 1622 as indicted by arrow 2502. In example 2500, one or more components, such as separator 2420, have been omitted for ease of illustration and clarity. Example 2500 includes lid 2552 that is couplable with base 2450. Dashed line 2560 depicts a path that a rodent may travel within the chamber of the platform 190 after entering opening 2456.

Thus, FIGS. 24 and 25 describe a pest-management apparatus, such as a bait station, that provides increased speed and ease of deployment and a reduction in time and manpower for identification of an operated pest-management apparatus. To illustrate, components and devices of the pest-management apparatus are configured to be removably coupled from each other and, when coupled, enable proper function and interaction between different components. In this manner, the present disclosure provides a pest-management system with "plug and play" components that are individually replaceable in a case of a failure without having to discard the entire pest-management apparatus, thus resulting in cost saving. Additionally, the above-described aspects include a pest-management apparatus with no exposed wires that can degrade or deteriorate because of environmental conditions or that can be chewed on and damaged by a pest.

Figure 26:
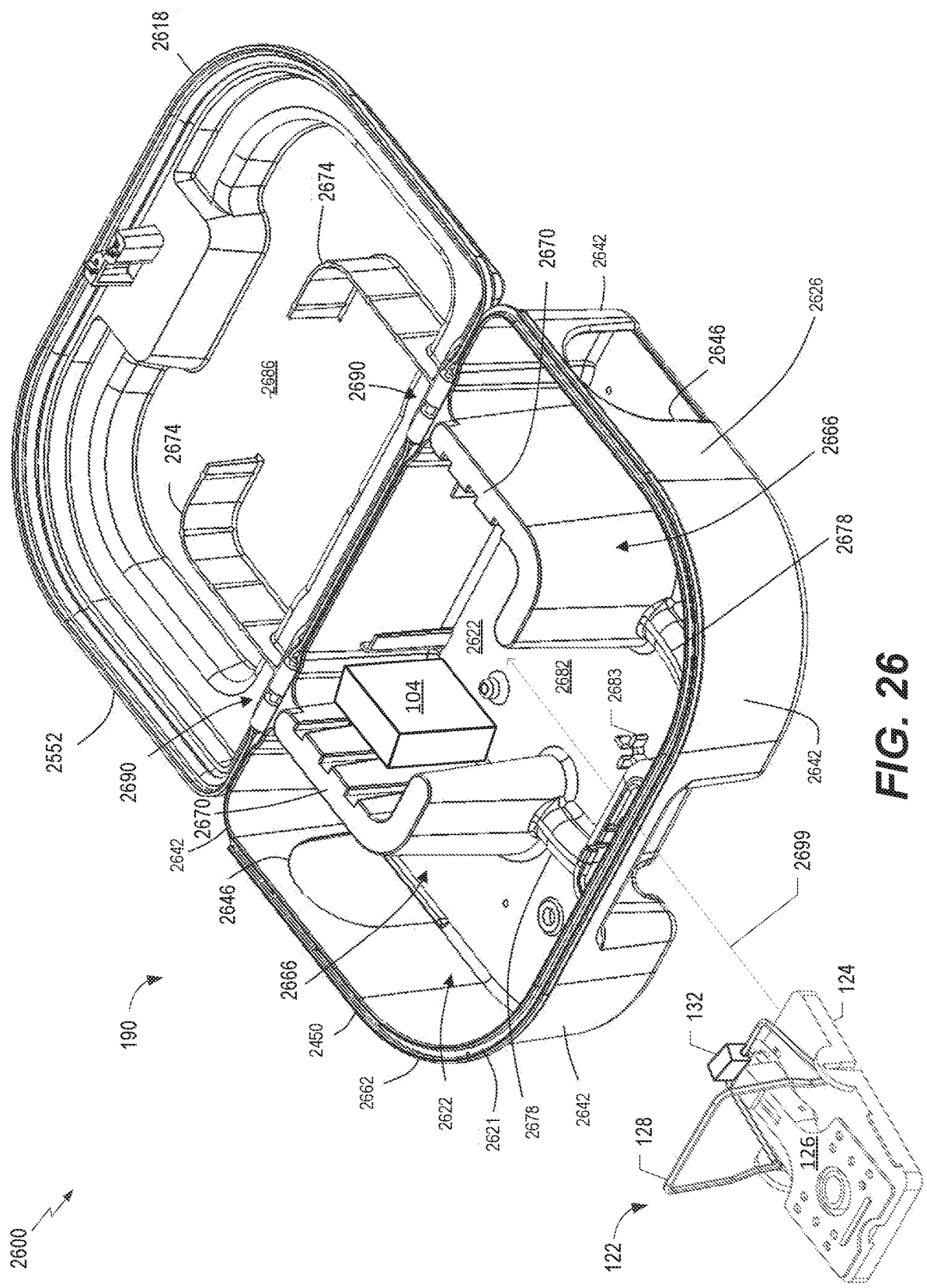
FIG. 26 is a diagram that that illustrates an isometric view of another example of a bait station.

Referring to FIG. 26, an example 2600 of a pest-management apparatus is depicted that includes detector device 104, trap 122, and platform 190. In FIG. 26, platform 190 is configured as a station, such as a bait station, that includes base 2450 and lid 2552. Base 2450 and lid 2552 are configured to be coupled together such that lid 2552 is movable (e.g., including removable) relative to base 2450 between an open position and a closed position in which base 2450 and lid 2552 cooperate to define a chamber 2622. Each of base 2450 and lid 2552 may be separately molded from a suitable (e.g., plastic) material. In other implementations, the base and lid may be integrally formed from a suitable (e.g., plastic) material. Trap 122 may be positioned within chamber 2622 (e.g., a subchamber 2682) of platform 190 as indicated by dashed arrow 2699. In some implementations, trap 122 may be coupled to platform 190 of FIG. 26 via another platform (e.g., 190 of FIGS. 1, 20A, 22, 23, 29A, 30A).

As shown, base 2450 includes a sidewall 2626 that defines an external perimeter of the station. Sidewall 2626 of base 2450 includes corner portions 2642 across which the sidewall may change direction. Corner portions 2642 may include any appropriate shape (e.g., to guide a rodent exterior to base 2450 toward opening(s) 2646). For example, one or more corner portions 2642 may be curved or flat. As shown, at least one corner portion 2642 (e.g., two corner portions closest to lid 2552) includes a first radius of curvature and at least one other corner portion (e.g., two corner portions opposite lid 2552) includes a second radius of curvature greater than the first radius of curvature.

Base 2450 includes one or more interior walls 2666 (e.g., two interior walls 2666, each extending substantially vertically from a floor and toward a top of base 2450. At least one of interior wall(s) 2666 is configured to prevent a rodent from climbing over the interior wall when lid 2552 is in the closed position. For example, at least one of interior wall(s) 2666 includes an upper surface 2670 configured to contact lid 2552 (e.g., one or more ridges 2674 thereof) when the lid is in the closed position. Lip 2662 of sidewall 2626 may be configured to engage at least a portion of lid 2552.

Base 2450 includes one or more interior protrusions 2678, such as ridges (e.g., two protrusions 2678, as shown) that each extend from floor and toward a top of base 2450. When lid 2552 is in the closed position, interior wall(s) 2646 and protrusion(s) 2678 may cooperate with the lid to define subchamber 2682 within chamber 2622. Protrusion(s) 2678 are located such that, when lid 2552 is in the closed position, at least a portion of chamber 24622 is accessible by passing over at least one of the protrusion(s) 2678. For example, one or more protrusions 2678 each extend between sidewall 2626 and an interior wall 2666 such that, for example, when lid 2552 is in the closed position, access to subchamber 2682 is possible by passing over one of the protrusion(s). As shown, one or more protrusions 2678 each include a height (e.g., extending in a direction perpendicular to floor) that is selected to allow a rodent to climb over the protrusion when lid 2552 is in the closed position, but to inhibit liquids from reaching at least a portion of chamber 2622, such as, for example, subchamber 2682.

Lid 2552 includes one or more ridges 2674 (e.g., two ridges 2674, as shown), each extending from an inner surface 2686 of lid 2552. When lid 2552 is in the closed position, each ridge 2674 is configured to contact a respective interior wall 2666 (e.g., upper surface 2670) of base 2450 such that, for example, the ridge(s) and interior wall(s) cooperate to define subchamber 2682. In at least this way, when lid 2552 is in the closed position, inner surface 2686, or a portion thereof, of the lid may be spaced apart from base 2450 by one or more ridges 2674, thereby providing for an increased volume within chamber 2622. In some implementations, such ridge(s) (e.g., 2674) may be configured to increase a stiffness of lid 2552.

As shown, lid 2552 is configured to be coupled to base 2450 via one or more hinges 2690 (e.g., two hinges 2690, as shown). For example, each hinge 2690 includes a hinge pin and one or more hooks, where the hinge pin is configured to be pivotally received within an interior channel of each of the hook(s). In other implementations, lid 2552 may be coupled to a base 2450 in any suitable fashion, such as, for example, being slidably coupled to the base, removably (e.g., detachably) coupled to the base (e.g., without hinges 2690), and/or the like.

At least one opening 2646 (e.g., two openings 2646, as shown) is configured to permit a rodent exterior to the apparatus to enter chamber 2622. As shown, each opening 2646 is defined by base 2450 alone (e.g., the entire outer perimeter of the entrance or opening is defined by the base); however, in other implementations, one or more openings 2646 may be defined by base 2450 and lid 2552, when the lid is in a closed position, and/or by the lid alone.

Lid 2552 includes a lip 2618 extending from (e.g., substantially all of or all of) a periphery thereof and configured to be received by base 2450 when the lid is in the closed position. More particularly, lip 2618 is configured to be received by a groove 2621 of base 2450, which may be defined by lip 2662. Lip 2618 may be configured to be closely or tightly received by groove 2621 such that, for example, an outer-most face of the lip is immediately adjacent or is in contact with an inner face of the groove (e.g., which may frustrate or prevent insertion of an implement between the lip and the groove in an attempt to pry lid 2552 from the closed position). When lid 2552 is in the closed position, access to subchamber 2682 through opening(s) 2646 using a human hand or implement is inhibited. To illustrate, subchamber 2682 is not visible through opening(s) 2646, and direct access to the subchamber through each opening is obstructed by a respective interior wall 2666.

Trap 122 may be included in subchamber 2682 as indicated by arrow 2699. In some implementations, base 2450 includes a fastener 2683 (e.g., a clip) configured to couple trap 122 to holder 190. For example, fastener 2683 may be configured to be inserted into channel 136 of trap 122. Detector device 104 is coupled to interior wall 2666 such that switch 116 included in detector device 104 is configured to detect operation of trap 122 based on magnet 132.

Thus, FIG. 26 describes a pest-management apparatus, such as a bait station, that provides increased speed and ease of deployment and a reduction in time and manpower for identification of an operated pest-management apparatus. To illustrate, components and devices of the pest-management apparatus are configured to be removably coupled from each other and, when coupled, enable proper function and interaction between different components. Additionally, the pest-management apparatus includes no exposed wires that can degrade or deteriorate because of environmental conditions or that can be chewed on and damaged by a pest.

Figure 27:
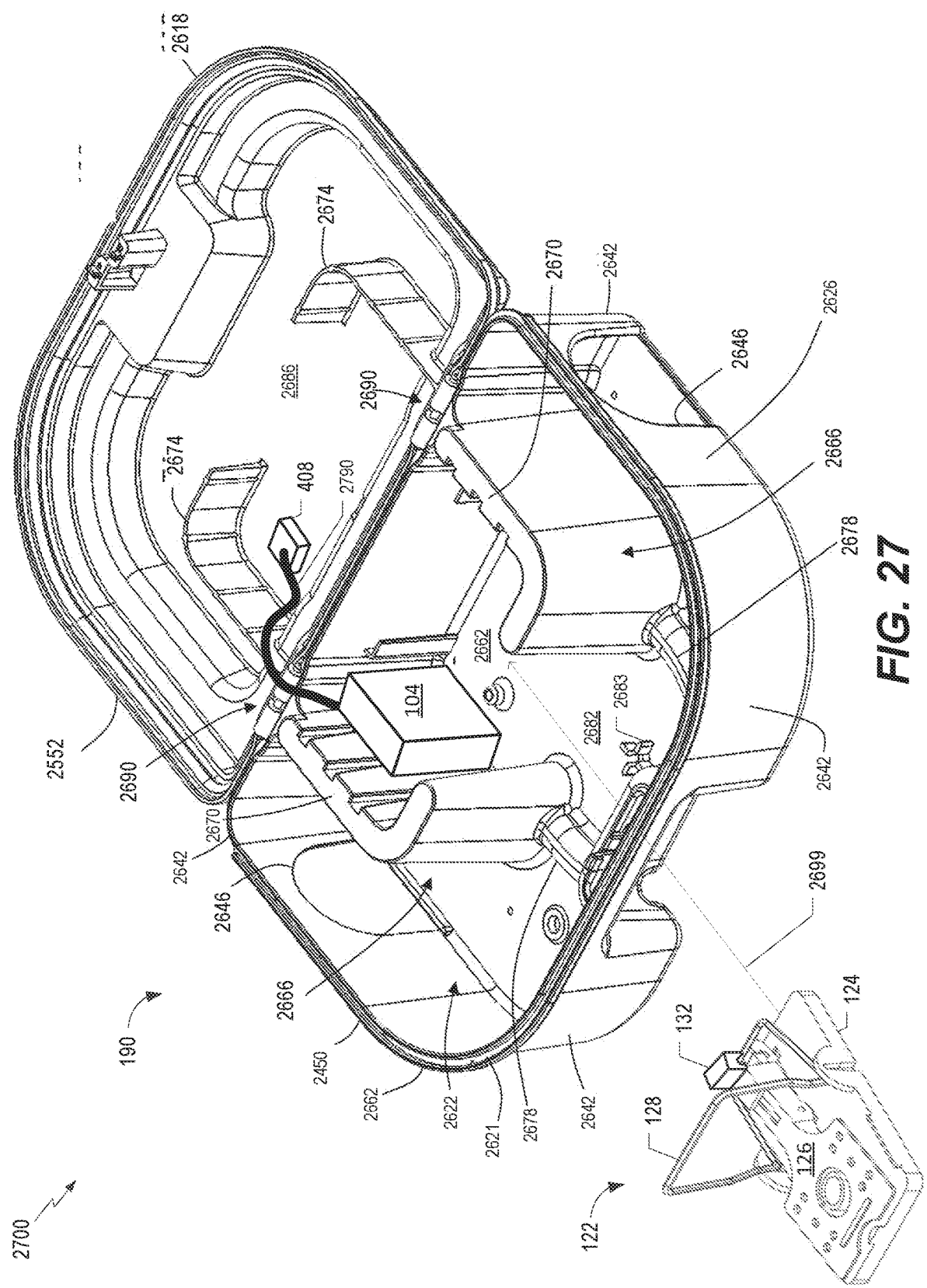
FIG. 27 is a diagram that that illustrates an isometric view of another example of a bait station.

Referring to FIG. 27, a diagram of an isometric view of another example 2700 of a pest-management apparatus is depicted that includes detector device 104, trap 122, and platform 190. In FIG. 27, platform 190 is configured as a station, such as a bait station, that includes base 2450 and lid 2552. In some implementations, trap 122 may be coupled to platform 190 of FIG. 27 via another platform (e.g., 190 of FIGS. 1, 20A, 22, 23, 29A, 30A). As compared to example 2600, example 2700 includes indicator device 408 coupled to lid 2552 via a conductor 2790, such as a wire. As shown, indicator device 408 is incorporated into lid 2552 and is viewable when lid 2552 is closed with respect to base 2450. Conductor 2790 is included in subchamber 2682 and is generally protected from being accessible by a rodent, such that a rodent cannot easily chew on conductor 2790. Accordingly, example 2700 is configured to provide a user an indication while protecting wires (e.g., conductor 2790) from being easily accessible to rodents. Thus, FIG. 27 describes a pest-management apparatus, such as a bait station, that provides increased speed and ease of deployment and a reduction in time and manpower for identification of an operated pest-management apparatus. Additionally, the pest-management apparatus of FIG. 27 provides a local indication, via the indicator device 408 that makes inspection of the pest-management apparatus (to determine whether trap 122 operated) quick and efficient.

Figures 28A, 28B:
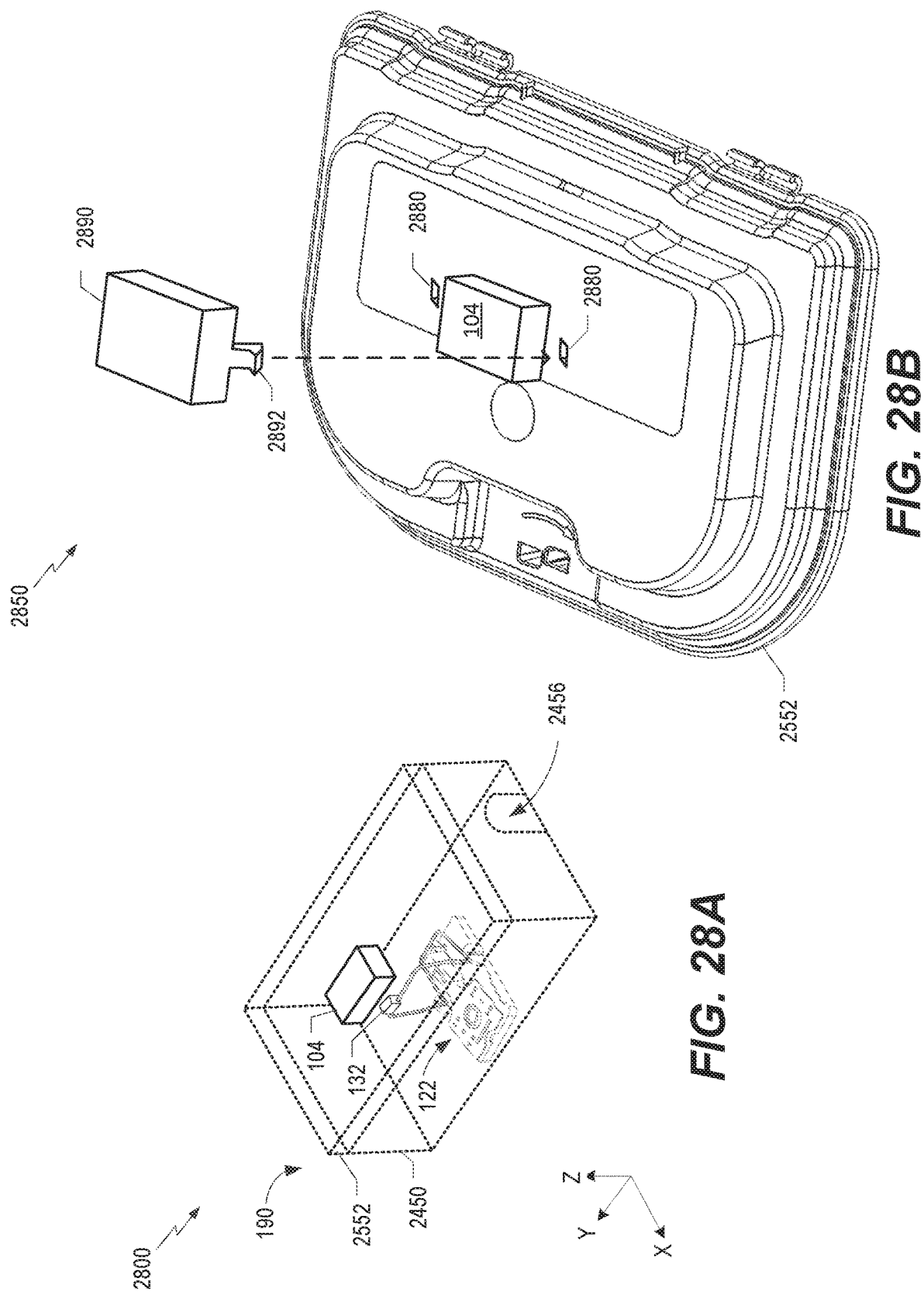
FIG. 28A is a diagram that that illustrates another example of a bait station.
FIG. 28B is a diagram that illustrates a perspective view of an illustrative lid of the bait station of FIG. 28A.

Referring to FIGS. 28A-B, FIG. 28A depicts an example 2800 of a pest-management apparatus (e.g., a bait station), and FIG. 28B depicts an example 2850 of an illustrative lid 2552 of the station of FIG. 28A. Referring to FIG. 28A, example 2800 includes platform 190, detector device 104, and trap 122. In FIG. 28A, platform 190 is depicted as dashed lines for ease of explanation of one or more aspects of the pest-management apparatus. Platform 190 is configured as a station, such as a bait station, that includes base 2450, lid 2552, and opening 2456. In example 2800, detector device 104 is coupled to lid 2552 and positioned above trap 122. For example, base 124 of trap 122 may be associated with a plane, such as an x-y plane, and detector device 104 may be positioned in a z-direction with respect to trap 122 in the x-y plane. In some implementations, detector device 104 is positioned on lid 2552, as described with reference to FIG. 28B. In other implementations, detector device 104 is incorporated in lid 2552.

Trap 122 includes magnet 132 positioned such that, when capture element 128 is in the set position or when capture element 128 is released from the set position, a magnetic field of magnet 132 changes a state of switch 116 included in detector device 104. In some implementations, trap 122 may be coupled to platform 190 of FIG. 228A via another platform (e.g., 190 of FIGS. 1, 20A, 22, 23, 29A, 30A).

Referring to FIG. 28B, detector device 104 is coupled to an exterior surface of lid 2552. Lid 2552 includes openings 2880 configured to receive tabs 2892 (e.g., connectors) of a cover 2890. Cover 2890 may be placed over detector device 104 such that detector device 104 is positioned between lid 2552 and cover 2890. To illustrate, tabs 2892 may be inserted into openings 2880 to couple cover 2890 to lid 2552, thus positioning detector device 104 with respect to trap 122 included in an interior chamber of platform 190 (e.g., base 2450 and lid 2552). Thus, FIGS. 28A and 28B describe an alternative pest-management apparatus as compared to FIGS. 24, 25, 26. The pest-management apparatus of FIGS. 28A and 28B advantageously includes at least the benefits described above with reference to FIGS. 24, 25, 26.

Figure 29A:
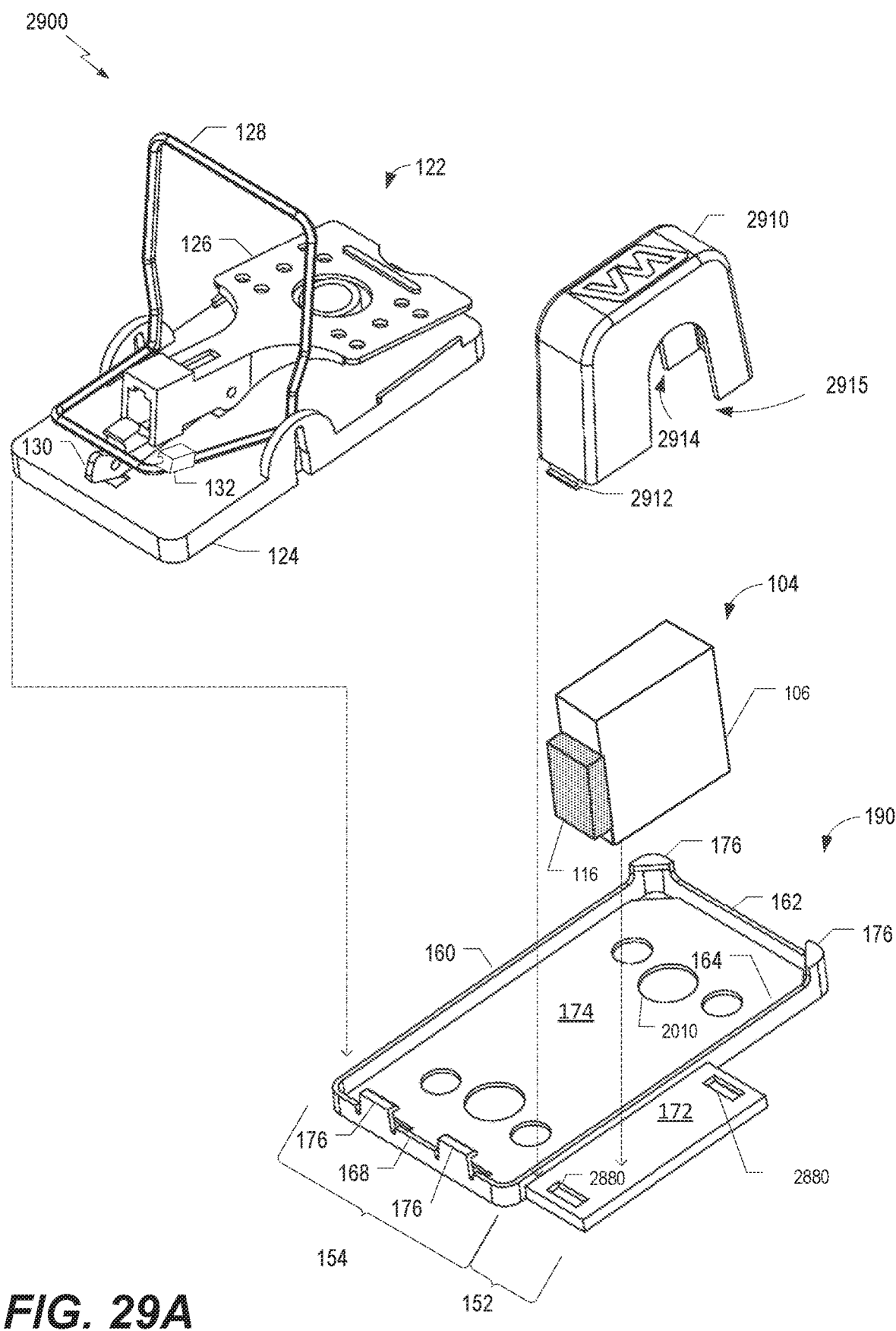
FIG. 29A is an assembly drawing of an example of a pest-management apparatus.
Figure 29B:
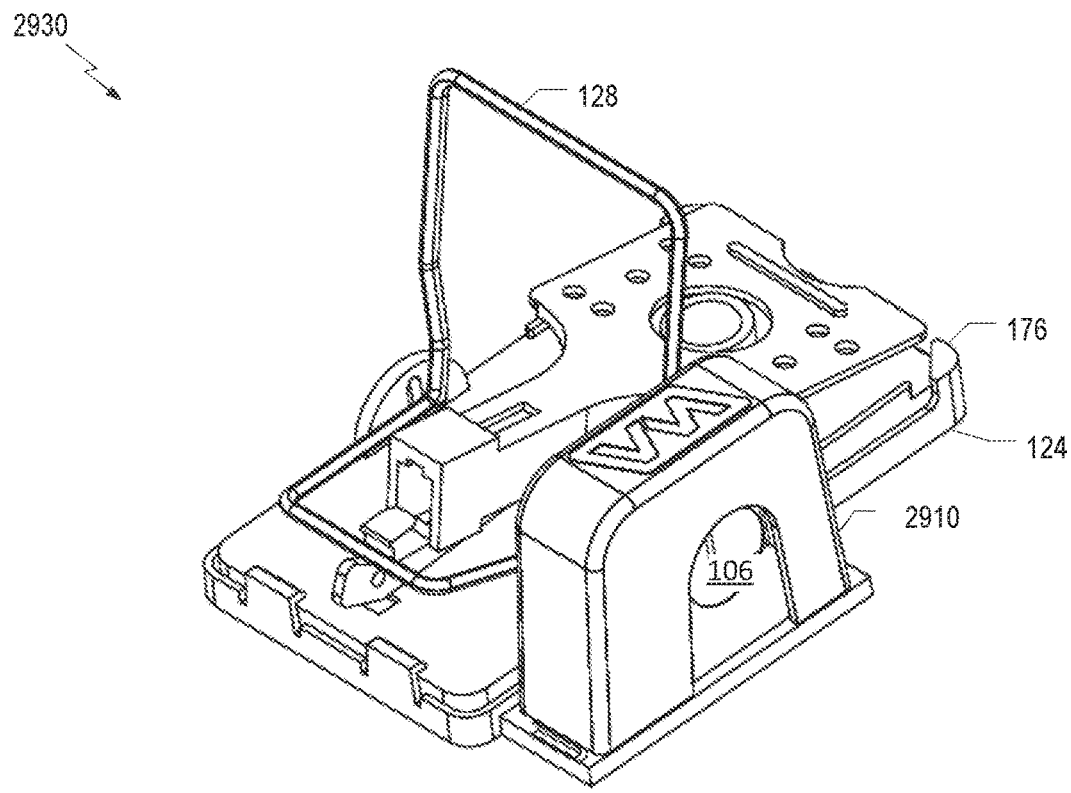
FIG. 29B is a diagram that that illustrates a perspective view of the example of the pest-management apparatus of FIG. 29A.
Figure 29C:
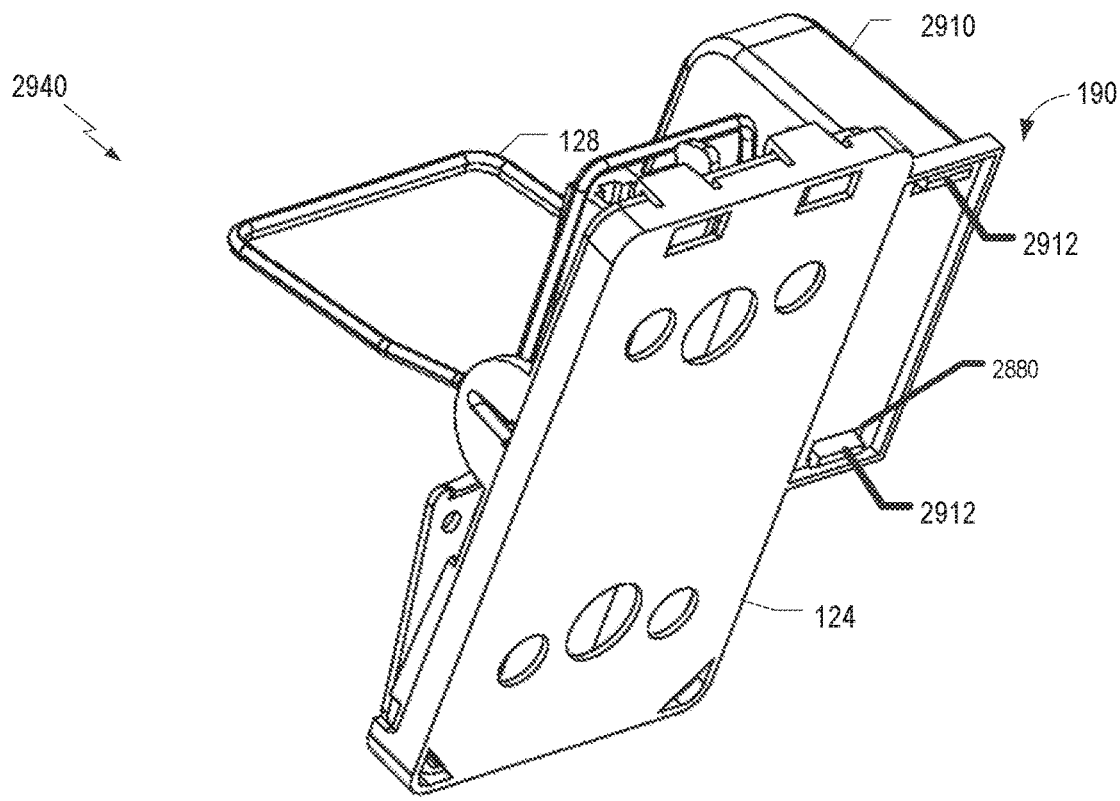
FIG. 29C is a diagram that illustrates a perspective view of the example of the pest-management apparatus of FIG. 29A

Referring to FIGS. 29A-29D, FIG. 29A depicts is an assembly drawing of an example 2900 of a pest-management apparatus, FIG. 29B depicts an example 2930 of the pest-management apparatus of FIG. 20A, FIG. 29C depicts an example 2940 of the pest-management apparatus of FIG.

Figure 29D:
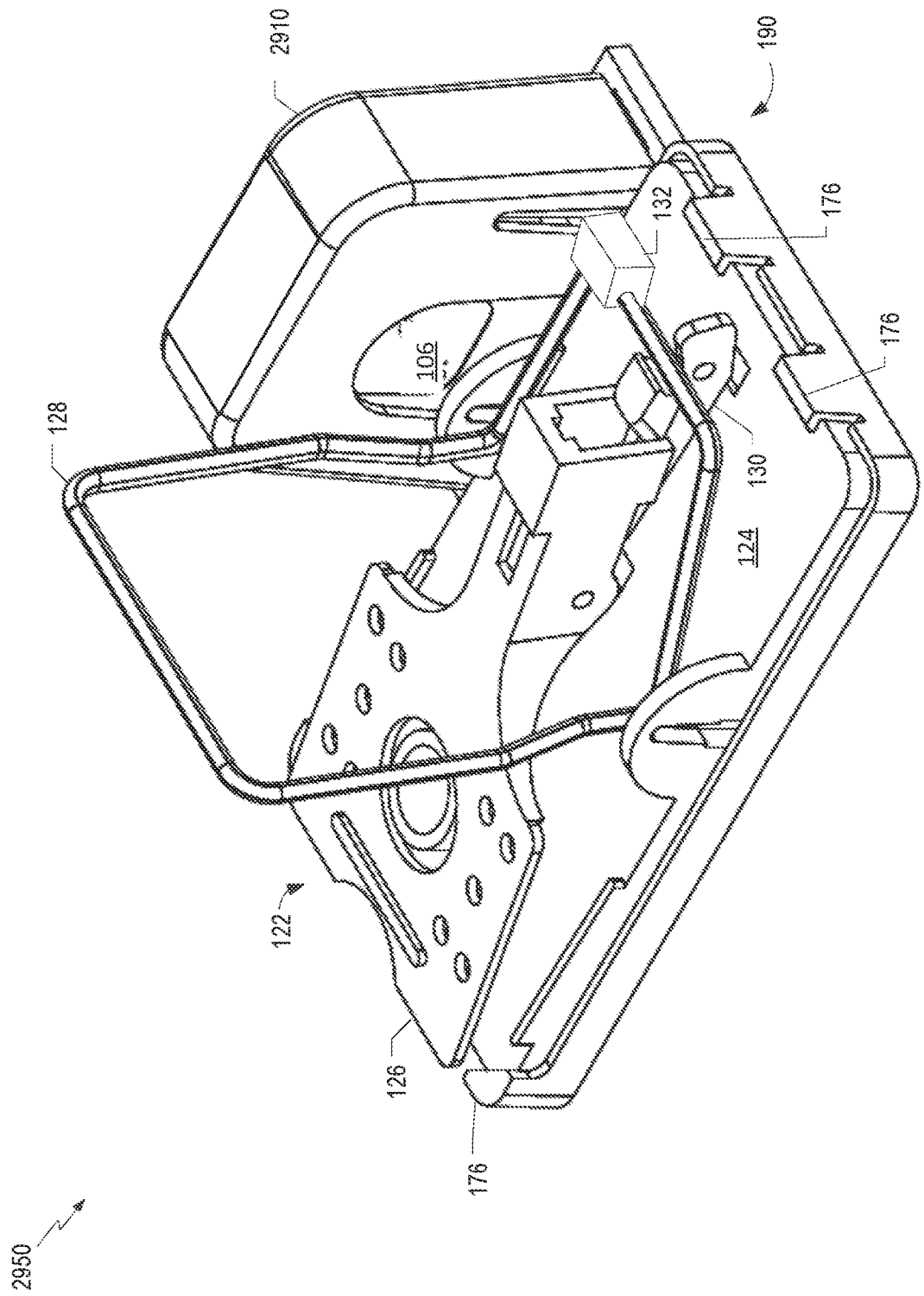
FIG. 29D is a diagram that that illustrates a perspective view of the example of the pest-management apparatus of FIG. 29A.

20A, and FIG. 29D depicts an example 2950 of the pest-management apparatus of FIG. 29A.

Referring to FIG. 29A, example 2900 includes trap 122, platform 190, detector device 104, and cover 2910. Trap 122 is configured to be coupled to platform 190 at second portion 154 of platform 190. For example, brackets 176 of platform 190 may engage a surface of base 124 to couple platform 190 to trap 122.

Cover 2910 includes tabs 2912 (e.g., connectors) and defines a cavity 2914. In some implementations, cover 2910 may include or correspond to holder 1610 which is configured to retain detector device within cavity 1616 to couple detector device 104 trap 122, platform 190, or both. Additionally, or alternatively, cover 2910 may include an opening 2915. For example, opening 2915 may enable access to an indicator (e.g., 408), an activation switch (e.g., 109, 509), or both, of a detector device (e.g., 104) coupled to cover 2910.

Detector device 104 is configured to be coupled to platform 190 at first portion 152 of platform 190. First portion 152 of platform 190 includes openings 2880 configured to receive tabs 2912 of cover 2910. To illustrate, detector device 104 may be placed in contact with surface 172 of first region 152. Cover 2910 may be placed over detector device 104 such that detector device 104 is positioned between surface 172 and cover 2910. Tabs 2912 of cover 2910 may be inserted into openings 2880 to couple detector device 104 to platform 190 such that detector device 104 is included in cavity 2914.

Referring to FIG. 29B, example 2930 depicts an isometric view of an assembled version of the pest-management apparatus of FIG. 29A. Referring to FIG. 29C, example 2940 depicts a perspective view with respect to a bottom of the assembled version of the pest-management apparatus of FIG. 29A. In example 2940, tabs 2912 are illustrated as engaged with openings 2880 to couple cover 2910 to platform 190. Referring to FIG. 29D, example 2950 depicts another view of the assembled version of the pest-management apparatus of FIG. 29A.

Accordingly, as depicted with reference to FIGS. 29A-29D, cover 1910 enables detector device 104 to be removably coupled to trap 122 via platform 190. For example, detector device 104 is removably coupled to platform 190 by cover 2910. Additionally, cover 2910 couples easily with platform 190 and ensures that switch 116 of detector device 104 is positioned with respect to magnet 132 to enable circuitry 118 to detect operation of trap 122.

Figure 30C:
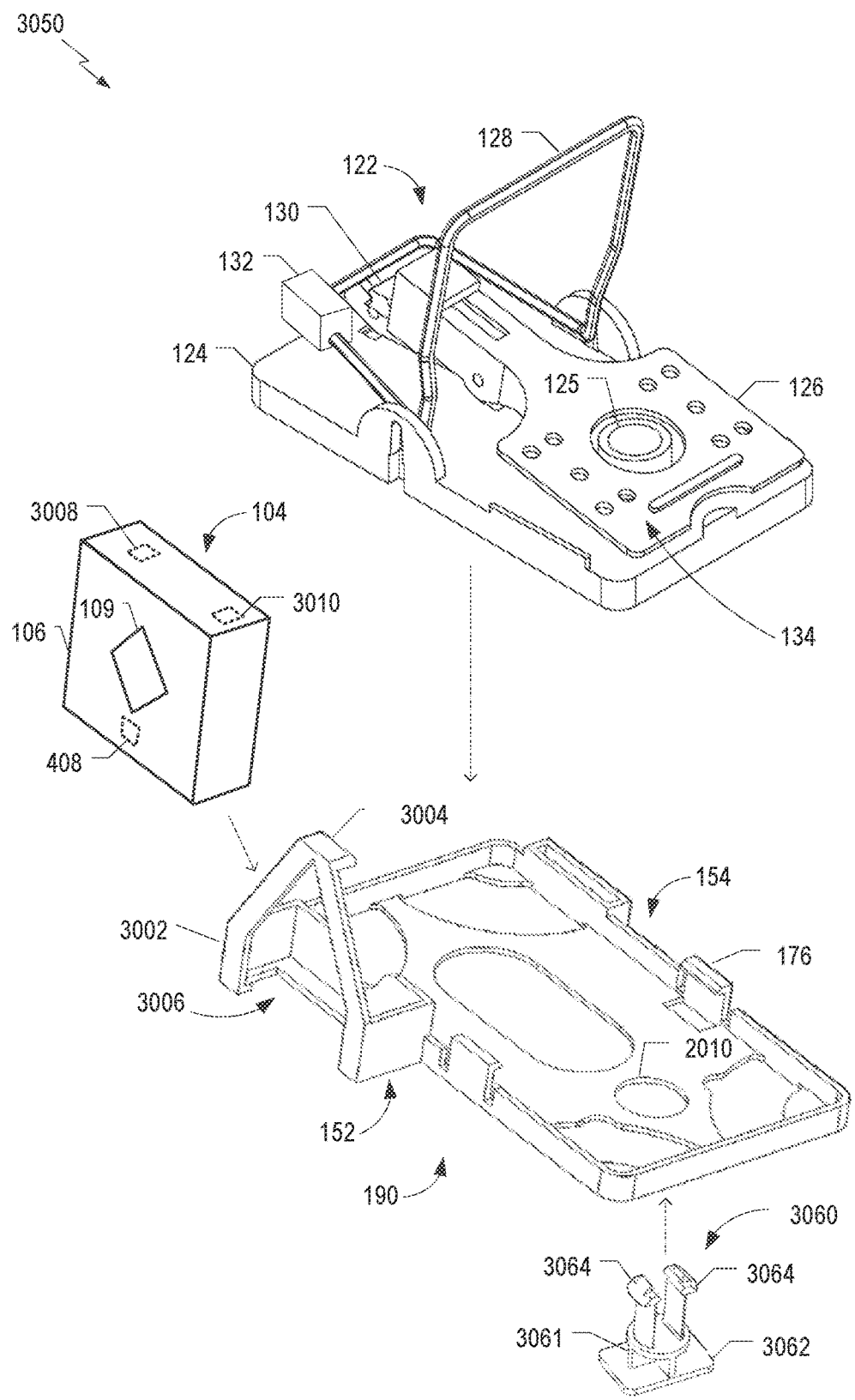
FIG. 30C is a diagram that illustrates another perspective view of the example of the pest-management apparatus of FIG. 30A

Referring to FIGS. 30A-30C, FIG. 30A depicts is an isometric view of an example 3000 of platform 190 of a pest-management system, FIG. 30B depicts another isometric view of example 3000 of platform 190 of FIG. 30A, and FIG. 30C depicts is an assembly drawing of an example 3050 of a pest-management apparatus that includes platform 190 of FIG. 30A.

Referring to FIGS. 30A and 30B, platform 190 includes walls 160, 162, 164, 168, brackets 176, and surface 174. Platform 190 includes a first portion 152 and a second portion 154. The second portion 154 of platform 190 includes region 184 configured to be coupled to trap 122. Surface 174 includes an opening 2010 that defines a channel 2012 through which a screw or other fastener can be inserted to secure trap 122 to platform 190 or to secure platform 190 to another structure. For example, opening 2010 and channel 2012 may include or correspond to through hole 175. The second portion 154 of platform 190 may also include bracket 2020 configured to engage a holder (e.g., 1610) or detector device (e.g., 104, 1990). Bracket 2020, in conjunction with wall 164 defines an opening 2024 to receive one or more brackets of the holder and/or the detector device. In other implementations, platform 190 may not include bracket 2020.

As shown, the first portion 152 of platform 190 includes a holder 3002 associated with detector device 104 of a pest-management system. For example, holder 3002 includes a structure that defines a cavity 3006 configured to receive at least a portion of housing 106 of detector device 104. Holder 3006 may include one or more brackets 3004 (e.g., clips) for retaining detector device 104 at least partially within holder 3002. As shown, holder 3002 is integrated in platform 190. However, in other implementations, holder 3002 may be configured to be removably coupled from platform 190, as described with reference to holder 1610. To illustrate, in such implementations, holder 3002 may include one or more brackets (e.g., 1630).

Referring to FIG. 30C, example 3050 includes trap 122, platform 190 of FIGS. 30A and 30B, detector device 104, and fastener 3060 (e.g., a clip). Trap 122 is configured to be coupled to platform 190 at second portion 154 of platform 190. For example, brackets 176 of platform 190 may engage a surface of base 124 to couple platform 190 to trap 122.

Additionally, or alternatively, trap 122 may be coupled to platform 190 via fastener 3060.

Fastener 3060 includes a body 3061, a flange 3062, and one or more extensions 3064 (e.g., one or more prongs). Flange 3062 is coupled to and/or extends from base 3061. In some implementations, body 3061 is coupled to a surface of flange 3062. Fastener 3060 is configured to be inserted through opening 2010 such that a portion of flange 3062 contacts a bottom surface of platform 190. The one or more extensions 3064 are coupled to and extend from body 3061. The one or more extensions 3064 are configured to be inserted through opening 125 (e.g., channel 136). To illustrate, a first end of the one or more extensions 3064 may be coupled to base 3061 and a second end of the one or more extensions 3064 may be configured to be coupled to opening 125. For example, the second end of the one or more extensions 3064 may include a ridge that is configured to engage a rim associated with opening 125.

Detector device 104 is configured to be coupled to holder 3002 at first portion 152. For example, detector device 104 is configured to positioned within cavity 3006 and to be secured in place by the one or more brackets 3004 (e.g., clips).

As shown, detector device 104 includes housing 106 and activation switch 109. In some implementations, detector device 104 may include indicator 408, an interface 3008, and a reset switch 3010. Interface 3008 may include or correspond to communication circuitry 526. For example, interface 3008 may be configured to couple (via a wired connection and/or a wireless connection) detector device 104 to another device. Reset switch 3010 may be configured to reset detector device 104 to a default configuration. Reset switch 3010 may include or correspond to reset switch 511. When detector device 104 is coupled to holder 3002, switch 109, indicator 408, interface 3008, and/or reset switch 3010 may be accessible.

Accordingly, as depicted with reference to FIGS. 30A-30C, detector device 104 and trap 122 are configured to be removably coupled to platform 190. For example, detector device 104 may be coupled to platform 190 such that detector device 104 is accessible and/or visible to a user.

Figure 31:
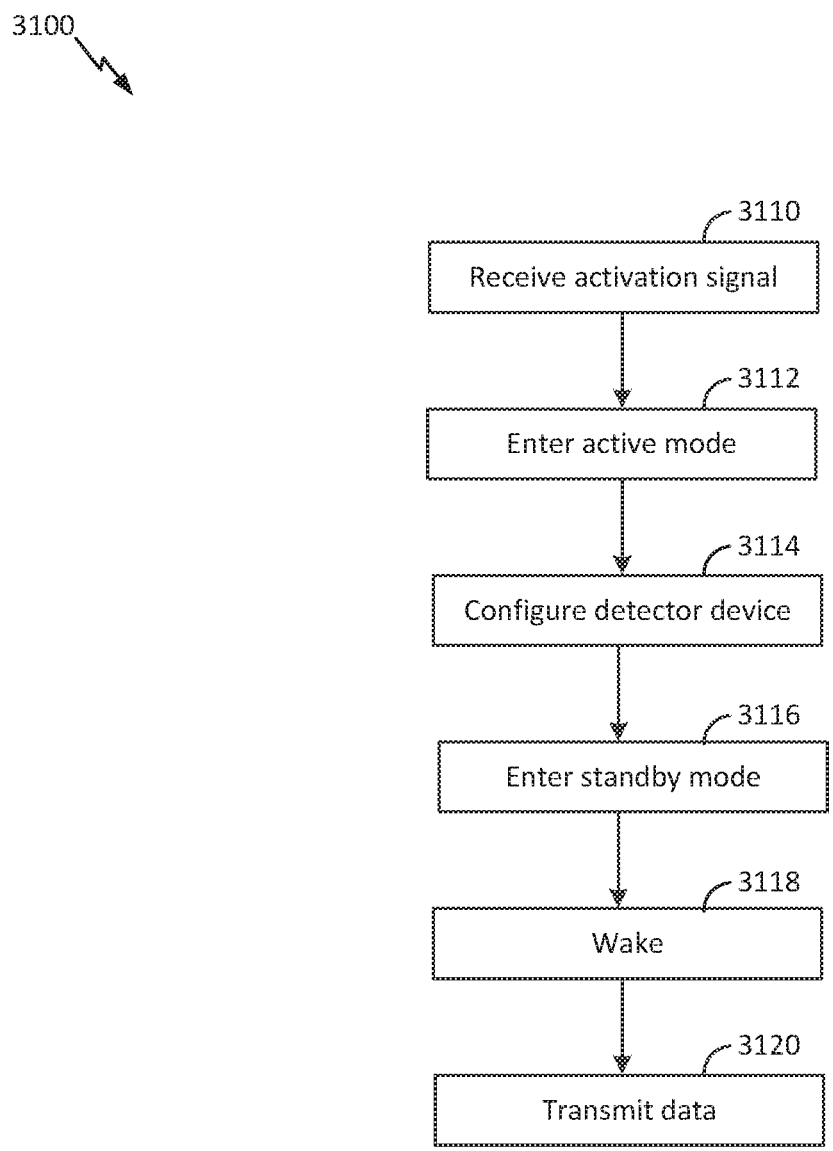
FIG. 31 is a flow diagram of an example of a method of operation of a device of a pest-management system.

Referring to FIG. 31, an example 3100 of a method of operation of a detector device is shown. For example, the detector device may include or correspond to detector device 104. The method 3100 may be executed by server 552, device 554, and/or detector device 104, such as controller 510.

The method 3100 may include receiving an activation signal, at 3110, and entering an active mode, at 3112. For example, the controller 510 may receive an activation from and/or responsive to operation of switch 509 (e.g., activation switch 109). In some implementations, the activation signal is received when the detector device is not configured for wireless communication.

The method 3100 may further including configuring the detector device, at 3114. For example, when in the active mode, the detector device 104 may be configured to couple to a wireless network, such as network 550. To couple the detector device 104 to the wireless network, the detector device 104 may be wirelessly coupled (e.g., directly coupled) to a device, such as device 554. For example, the detector device 104 may be placed into a discoverable state responsive, such as by activation of the switch 509 for a particular time period (e.g., 5 or more seconds). When in the discoverable state, the device 554 may discover and connect to the detector device 104. The device 554 may include software to configure (e.g., program) the detector device 104 to couple to the network 550, such as an access point coupled to the network 550.

The method 3100 may include, after configuring the detector device and coupling the detector device to the network, entering a standby mode, at 316. When in the standby mode, the method 3100 may include waking the detector device, at 3118, and transmitting data, at 3120. For example, the detector device may be configured to wake from the standby mode (into the active mode) periodically, responsive to operation of a switch (e.g., 109, 116, 509, 518, 519), responsive to detection of low power, responsive to sensor data from a sensor (e.g., 532), or a combination thereof. In response to waking, the detector device may transmit a notification that indicates a battery power status, a sensor status, a trap status, or a combination thereof. To illustrate, the detector device may transmit the notification to the server 552. After transmission of the notification, the detector device 104 may reenter the standby mode.

In some implementations, the method 3100 may optionally include resetting the detector device, at 3122. Resetting the detector device may restore the detector device to factory settings. To illustrate, restoring the factory settings may decouple the detector device from the network. In some implementations, to reset the detector device, the switch (e.g., 109, 509) may be operated concurrently with a reset switch, such as reset switch 3010.

Thus, the method 3100 describes operation of the detector device. To illustrate, the detector device of a pest-management apparatus may be configured to provide an indication of a status of the detector device and/or an indication of operation of a trap. Additionally, the method 3100 may enable increased speed and ease of deployment of a pest-management apparatus and a reduction in time and manpower to identify pest-management apparatuses that have operated.

The above specification and examples provide a complete description of the structure and use of illustrative embodiments. Although certain aspects have been described above with a certain degree of particularity, or with reference to one or more individual examples, those skilled in the art could make numerous alterations to aspects of the present disclosure without departing from the scope of the present disclosure. As such, the various illustrative examples of the methods and systems are not intended to be limited to the particular forms disclosed. Rather, they include all modifications and alternatives falling within the scope of the claims, and implementations other than the ones shown may include some or all of the features of the depicted examples. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one example or may relate to several examples. Accordingly, no single implementation described herein should be construed as limiting and implementations of the disclosure may be suitably combined without departing from the teachings of the disclosure.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A monitoring system for a rodent snap-trap having a base and a capture element pivotally coupled to the base such that a portion of the capture element is biased toward a capture portion of the base, the capture element configured to be pivoted away from the capture portion to a set position in which the portion of the capture element, upon release of the capture element from the set position, travels toward the capture portion, the monitoring system comprising:
- a housing that defines a cavity, where the housing is configured to be coupled to a platform;
- a magnetic switch physically coupled to the housing, the magnetic switch having an operational region bounded by a portion of the magnetic switch and configured to operate responsive to a magnetic field of a magnet; and
- circuitry disposed in the cavity and electrically coupled to the magnetic switch, the circuitry configured to detect operation of the rodent snap-trap responsive to an operation of the magnetic switch;
- where the housing is configured to be coupled to the base of the rodent snap-trap such that, upon the release of the capture element from the set position, the magnetic field causes the operation of the magnetic switch;
- where the platform is configured to be removably coupled to the base of the rodent snap-trap and to a detector device which includes the magnetic switch;
- where the platform is configured to be concurrently coupled to the base of the rodent snap-trap and the detector device such that operation of the portion of the capture element of the rodent snap-trap from the set position toward the capture portion of the rodent snap-trap changes a state of the magnetic switch detectable by the detector device; and
- where the platform includes a holder configured to be coupled to the detector device and includes at least one bracket configured to maintain the detector device within a cavity defined by the holder.

2. The monitoring system of claim 1, where the housing includes at least a first portion removably coupled to a second portion such that the first portion and the second portion cooperate to define the cavity of the housing.

3. The monitoring system of claim 1, where the housing includes one or more brackets configured to engage the base of the rodent snap-trap.

4. The monitoring system of claim 1, where the housing includes one or more brackets configured to be coupled to the platform that is configured to be engaged with the base of the rodent snap-trap.

5. The monitoring system of claim 1, further comprising:
the holder that is configured to receive at least a portion of the housing;
where the holder is further configured to be coupled to the rodent snap-trap.

6. The monitoring system of claim 5, where the holder is disposed in a chamber defined by a base portion of a bait station that also includes a lid movable relative to the base portion to cover the chamber.

7. The monitoring system of claim 1, further comprising:
an electrical wire connected to the magnetic switch and to the circuitry;
where the electrical wire is inaccessible from outside the housing when the magnetic switch is physically coupled to the housing.

8. The monitoring system of claim 1, where the magnetic switch is incorporated into the housing or included within the cavity of the housing, and the magnetic switch is electrically conductive when the operational region of the magnetic switch receives the magnet field of the magnet.

9. The monitoring system of claim 1, where the circuitry comprises:
a memory storing instructions;
a processor coupled to the memory and to the magnetic switch, the processor configured to execute the instructions to detect the release of the capture element from the set position, activate an indicator responsive to detection of the release, or both; and
one or more components selected from the group of components consisting of: a power supply, a processor, a memory, communication circuitry, a transmitter, a sensor device, and an indicator device.

10. The monitoring system of claim 1, further comprising an electrical connection port incorporated into the housing, where the magnetic switch is physically coupled to the housing via the electrical connection port, and where the magnetic switch is removably coupled to the housing.

11. The monitoring system of claim 1, further comprising a second magnetic switch physically coupled to the housing, where the circuitry is further configured to detect operation of a second rodent snap-trap responsive to an operation of the second magnetic switch.

12. The monitoring system of claim 1, where the rodent snap-trap further includes a magnet coupled to the capture element, and where the magnetic switch is configured to change states responsive to a change in a magnetic field caused by the magnet.

13. The monitoring system of claim 1, where operation of the portion of the capture element from the set position toward the capture portion of the rodent snap-trap changes the state of the magnetic switch from an open state to a closed state.

14. The monitoring system of claim 1, where operation of the portion of the capture element from the set position toward the capture portion of the rodent snap-trap changes the state of the magnetic switch from a closed state to an open state.

15. An apparatus comprising:
a platform configured to be removably coupled to:
a base of a rodent snap-trap having a capture element pivotally coupled to the base such that a portion of the capture element is biased toward a capture portion of the base; and
a detector device including a first magnetic switch;
where the platform is configured to be concurrently coupled to the base and the detector device such that operation of the portion of the capture element from a set position toward the capture portion of the rodent snap-trap changes a state of the first magnetic switch detectable by the detector device;
where the platform includes a holder configured to be coupled to the detector device and includes at least one bracket configured to maintain the detector device within a cavity defined by the holder.

16. The apparatus of claim 15, where operation of the portion of the capture element from the set position toward the capture portion of the rodent snap-trap changes the state of the first magnetic switch from an open state to a closed state.

17. The apparatus of claim 15, where operation of the portion of the capture element from the set position toward the capture portion of the rodent snap-trap changes the state of the first magnetic switch from a closed state to an open state.

18. The apparatus of claim 15, further comprising a bait station including a base portion and a lid portion coupled to the base portion, the base portion including the platform.

19. The apparatus of claim 15, further comprising a cover configured to be removably coupled to the platform, where, to removably couple the detector device to the platform, the detector device is configured to be included within a cavity of the cover and positioned between the cover and the platform.

20. A pest-management apparatus comprising:
a first rodent snap-trap having a base and a capture element pivotally coupled to the base such that a portion of the capture element is biased toward a capture portion of the base;
a second rodent snap-trap having a base and a capture element pivotally coupled to the base such that a portion of the capture element is biased toward a capture portion of the base;
a detector device including:
a first magnetic switch, where the detector device is configured to be coupled to the first rodent snap-trap such that operation of the portion of the capture element of the first rodent snap-trap from a first set position toward the capture portion of the first rodent snap-trap changes a state of the first magnetic switch;
a second magnetic switch, where the detector device is configured to be coupled to the second rodent snap-trap such that operation of the portion of the capture element of the second rodent snap-trap from a second set position toward the capture portion of the second rodent snap-trap changes a state of the first magnetic switch; and
circuitry configured to detect a change in the state of the first magnetic switch, the second magnetic switch, or both; and a platform configured to be removably coupled to the base of the first rodent snap-trap, the base of the second rodent snap-trap, and the detector device;

where the platform is configured to be concurrently coupled to the base of the first rodent snap-trap and the detector device such that operation of the portion of the capture element of the first rodent snap-trap from a set position toward the capture portion of the first rodent snap-trap changes a state of the first magnetic switch detectable by the detector device;

where the platform includes a holder configured to be coupled to the detector device and includes at least one bracket configured to maintain the detector device within a cavity defined by the holder.

* * * * *